(12) United States Patent
Ikenuma

(10) Patent No.: US 11,967,710 B2
(45) Date of Patent: Apr. 23, 2024

(54) ELECTRODE, MANUFACTURING METHOD THEREOF, STORAGE BATTERY, AND ELECTRONIC DEVICE

(71) Applicant: SEMICONDUCTOR ENERGY LABORATORY CO., LTD., Atsugi (JP)

(72) Inventor: Tatsuya Ikenuma, Shizuoka (JP)

(73) Assignee: SEMICONDUCTOR ENERGY LABORATORY CO., LTD., Kanagawa-ken (JP)

( * ) Notice: Subject to any disclaimer, the term of this patent is extended or adjusted under 35 U.S.C. 154(b) by 375 days.

(21) Appl. No.: 17/152,830

(22) Filed: Jan. 20, 2021

(65) Prior Publication Data
US 2021/0143419 A1    May 13, 2021

Related U.S. Application Data

(62) Division of application No. 15/247,175, filed on Aug. 25, 2016, now abandoned.

(30) Foreign Application Priority Data

Aug. 27, 2015    (JP) .................................. 2015-168082

(51) Int. Cl.
*H01M 4/505*    (2010.01)
*H01M 4/04*    (2006.01)
(Continued)

(52) U.S. Cl.
CPC ......... *H01M 4/505* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS 8,470,477 B2    6/2013    Miwa et al.
8,476,510 B2    7/2013    Swager et al.
(Continued)

FOREIGN PATENT DOCUMENTS

CN    104617300 A    5/2015
EP    2950374 A    12/2015
(Continued)

OTHER PUBLICATIONS

Yoon.D et al., "Hydrogen-Enriched Reduced Graphene Oxide with Enhanced Electrochemical Performance in Lithium Ion Batteries", Chem. Mater. (Chemistry of Materials), Dec. 15, 2014, vol. 27, No. 1, pp. 266-275.
(Continued)

*Primary Examiner* — Robert S Carrico
(74) *Attorney, Agent, or Firm* — NIXON PEABODY LLP; Jeffrey L. Costellia

(57) ABSTRACT

As a positive electrode active material of a secondary battery, a lithium-manganese composite oxide containing lithium, manganese, and an element represented by M, and oxygen is used, and the lithium-manganese composite oxide is covered with reduced graphene oxide. An active material layer including the active material, graphene oxide, a conductive additive, and a binder is formed and soaked in alcohol, and then heat treatment is performed, whereby an electrode with reduced graphene oxide is fabricated.

10 Claims, 34 Drawing Sheets

(51) Int. Cl.
H01M 4/131 (2010.01)
H01M 4/1391 (2010.01)
H01M 4/36 (2006.01)
H01M 4/62 (2006.01)
H01M 10/0525 (2010.01)

(52) U.S. Cl.
CPC ......... *H01M 4/131* (2013.01); *H01M 4/1391* (2013.01); *H01M 4/366* (2013.01); *H01M 4/622* (2013.01); *H01M 4/625* (2013.01); *H01M 10/0525* (2013.01); *H01M 2220/30* (2013.01); *Y02E 60/10* (2013.01); *Y02P 70/50* (2015.11)

(56) References Cited

U.S. PATENT DOCUMENTS

| | | |
|---|---|---|
| 8,685,569 B2 | 4/2014 | Oguni et al. |
| 8,685,570 B2 | 4/2014 | Miwa et al. |
| 8,709,654 B2 | 4/2014 | Takeuchi et al. |
| 8,883,351 B2 | 11/2014 | Todoriki et al. |
| 9,225,003 B2 | 12/2015 | Yukawa |
| 9,478,807 B2 | 10/2016 | Yukawa |
| 9,490,472 B2 | 11/2016 | Nanba et al. |
| 10,038,177 B2 | 7/2018 | Yukawa |
| 10,347,905 B2 | 7/2019 | Nanba et al. |
| 10,347,916 B2 | 7/2019 | Sun et al. |
| 10,374,223 B2 | 8/2019 | Tamaki et al. |
| 10,454,102 B2 | 10/2019 | Ikenuma et al. |
| 10,593,940 B2 | 3/2020 | Ogino et al. |
| 2002/0102459 A1 | 8/2002 | Hosoya et al. |
| 2010/0178464 A1 | 7/2010 | Choi et al. |
| 2011/0292570 A1 | 12/2011 | Ivanovici et al. |
| 2012/0328956 A1 | 12/2012 | Oguni et al. |
| 2013/0045418 A1 | 2/2013 | Oguni et al. |
| 2013/0052547 A1 | 2/2013 | Ogino et al. |
| 2013/0065120 A1 | 3/2013 | Miwa et al. |
| 2013/0084384 A1 | 4/2013 | Yamakaji |
| 2013/0134051 A1 | 5/2013 | Takahashi et al. |
| 2013/0156942 A1 | 6/2013 | Yamakaji et al. |
| 2013/0157034 A1 | 6/2013 | Choi et al. |
| 2013/0164619 A1 | 6/2013 | Yamakaji et al. |
| 2013/0190449 A1 | 7/2013 | Kinloch et al. |
| 2013/0212879 A1 | 8/2013 | Ogino |
| 2013/0266859 A1 | 10/2013 | Todoriki et al. |
| 2013/0337320 A1 | 12/2013 | Yukawa |
| 2014/0004412 A1 | 1/2014 | Ogino |
| 2014/0166946 A1 | 6/2014 | Miwa et al. |
| 2014/0184172 A1 | 7/2014 | Momo et al. |
| 2014/0234700 A1 | 8/2014 | Moriwaka et al. |
| 2014/0295068 A1 | 10/2014 | Nanba et al. |
| 2014/0332715 A1 | 11/2014 | Kawakami et al. |
| 2014/0370184 A1 | 12/2014 | Takemura. et al. |
| 2015/0064565 A1 | 3/2015 | Todoriki et al. |
| 2015/0086860 A1 | 3/2015 | Yokoi et al. |
| 2015/0093648 A1 | 4/2015 | Son et al. |
| 2015/0099178 A1 | 4/2015 | Kawakami et al. |
| 2015/0099179 A1 | 4/2015 | Ikenuma et al. |
| 2015/0111107 A1 | 4/2015 | Oguni et al. |
| 2015/0132649 A1 | 5/2015 | Ogino et al. |
| 2015/0166348 A1 | 6/2015 | Ikenuma et al. |
| 2015/0325855 A1 | 11/2015 | Kawakami et al. |
| 2015/0333320 A1 | 11/2015 | Tamaki et al. |
| 2016/0064726 A1 | 3/2016 | Ikenuma et al. |
| 2016/0118646 A1 | 4/2016 | Ikenuma |
| 2018/0315993 A1 | 11/2018 | Yukawa |

FOREIGN PATENT DOCUMENTS

| | | |
|---|---|---|
| JP | 11-025983 A | 1/1999 |
| JP | 2003-297428 A | 10/2003 |
| JP | 2014-143038 A | 8/2014 |
| JP | 2014-199793 A | 10/2014 |
| JP | 2014-209472 A | 11/2014 |
| JP | 2015-088482 A | 5/2015 |
| JP | 2015-092468 A | 5/2015 |
| JP | 2015-109270 A | 6/2015 |
| JP | 2015-118924 A | 6/2015 |
| JP | 2015-134706 A | 7/2015 |
| JP | 2015-143162 A | 8/2015 |
| TW | 201530876 | 8/2015 |
| WO | WO-2013/181994 | 12/2013 |
| WO | WO-2014/115669 | 7/2014 |
| WO | WO-2015/050176 | 4/2015 |

OTHER PUBLICATIONS

Chinese Office Action (Application No. 201610736693.X) dated Sep. 18, 2020.

Geim.A et al., "The rise of graphene", Nature Materials, Mar. 1, 2007, vol. 6, No. 3, pp. 183-191.

Wang. W et al., "Measurement of the cleavage energy of graphite", Nature Communications, Aug. 28, 2015, vol. 6, pp. 7853-1-7853-7.

FIG. 14A
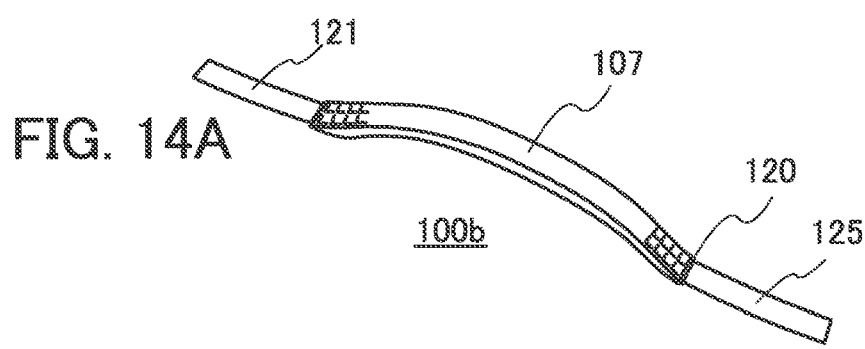
FIG. 14B
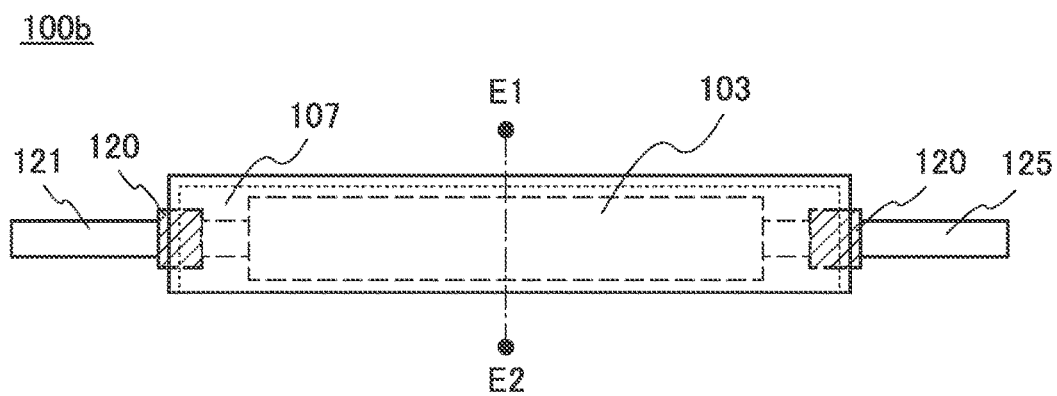
FIG. 14C1
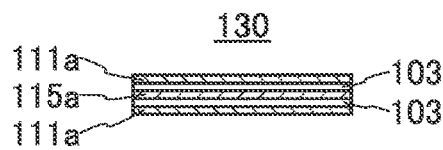
FIG. 14C2
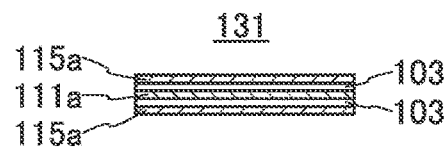
FIG. 14D
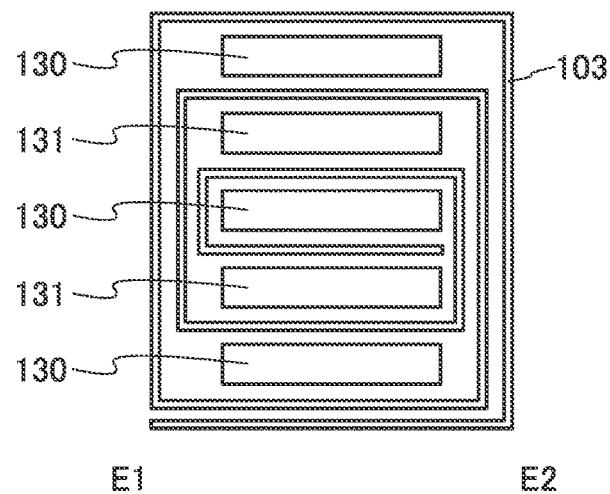

FIG. 19A
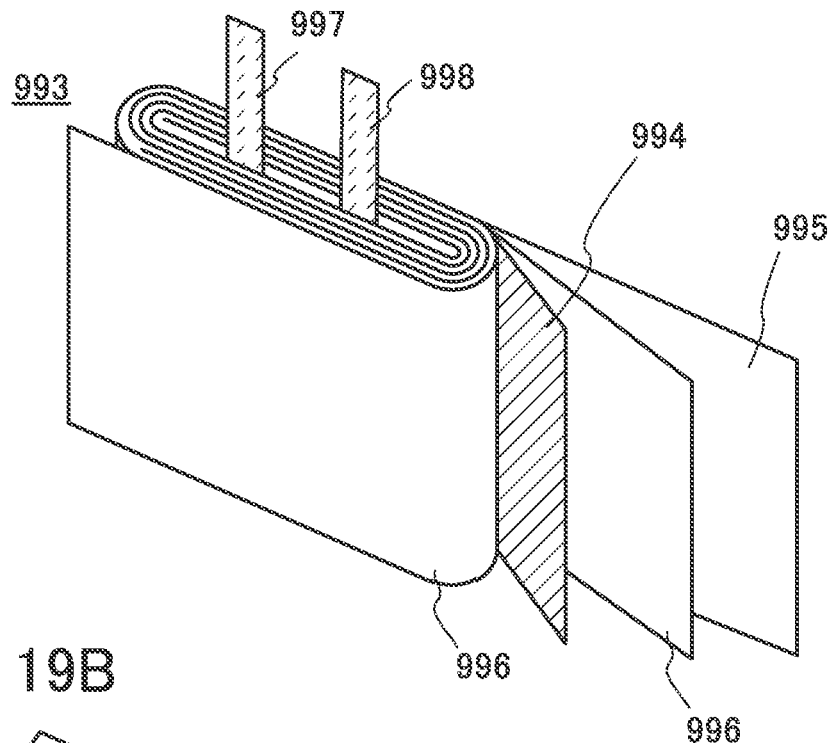
FIG. 19B
FIG. 19C
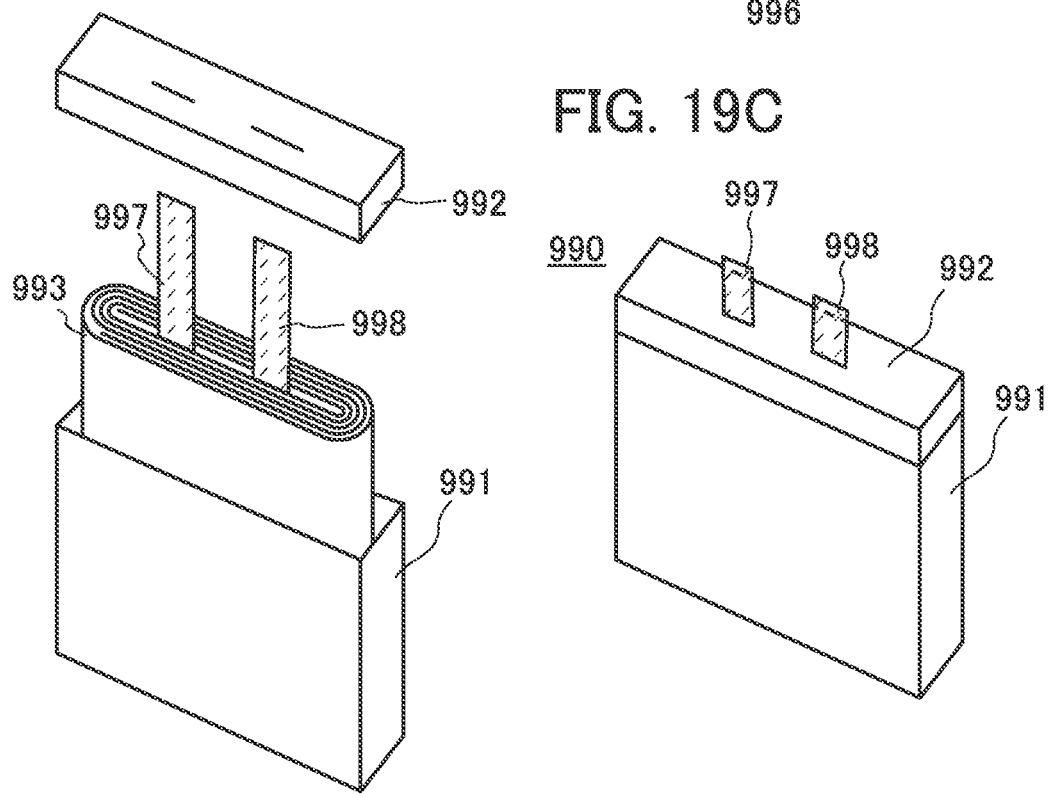

FIG. 21A1
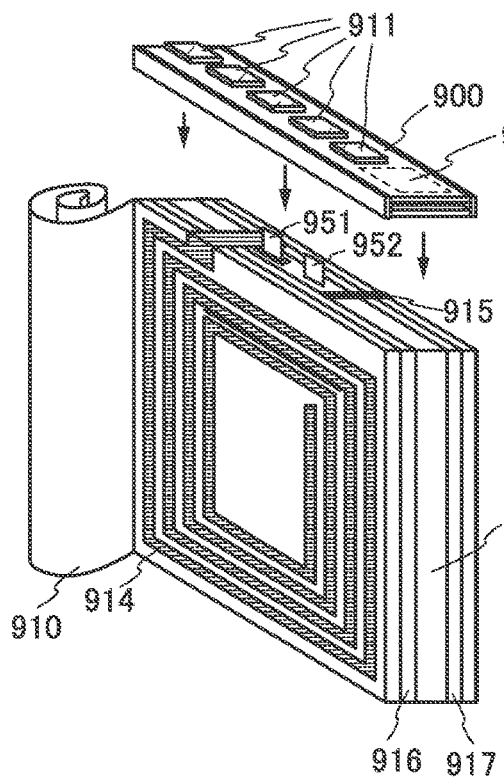
FIG. 21A2
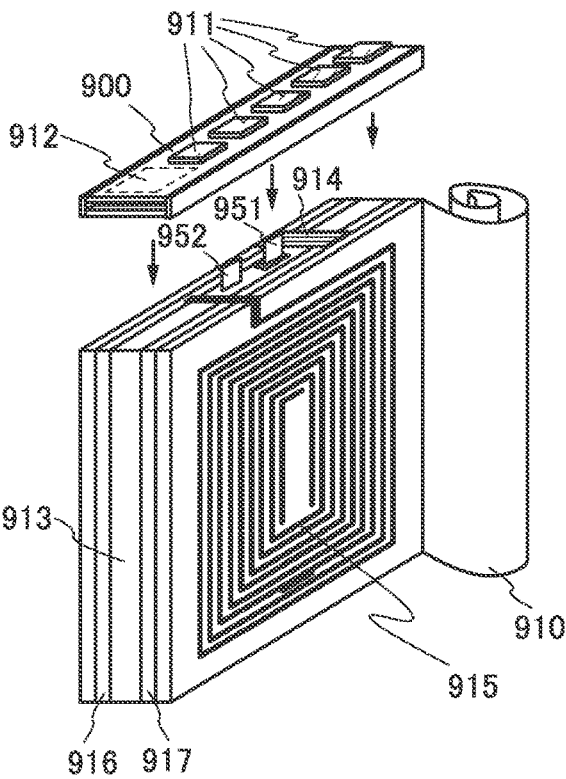
FIG. 21B1
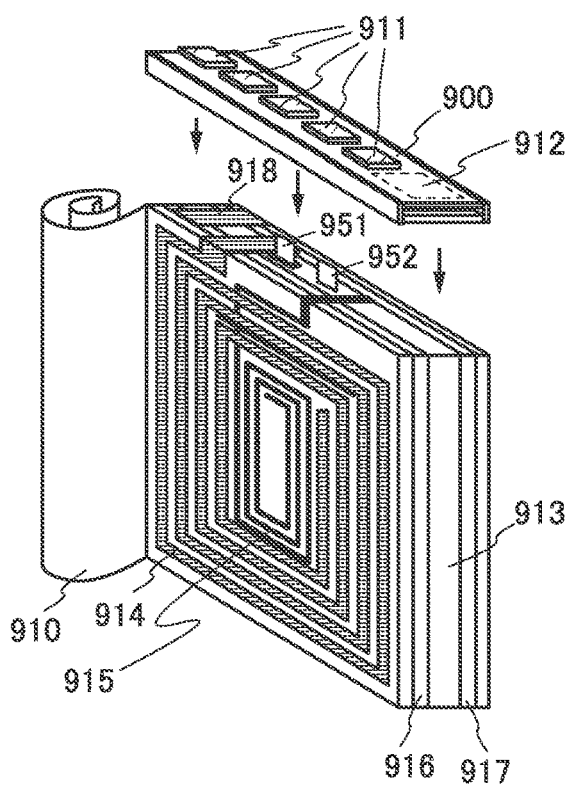
FIG. 21B2
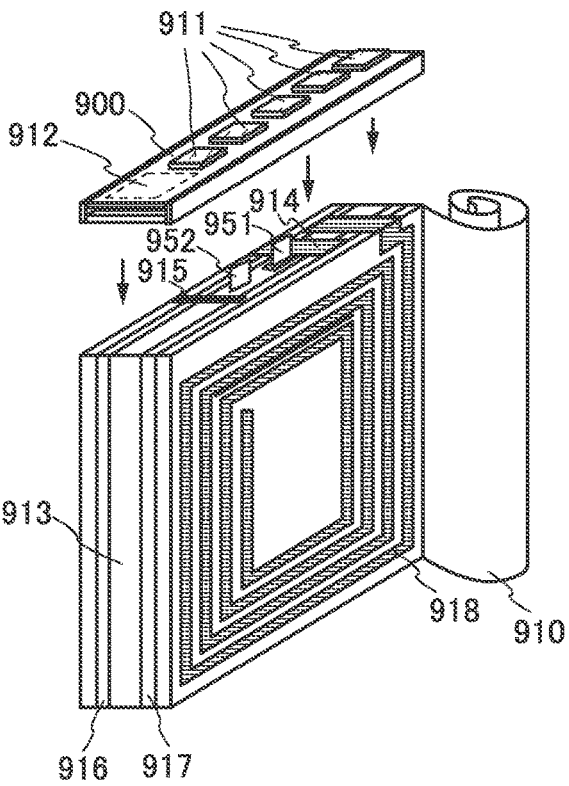

ELECTRODE, MANUFACTURING METHOD THEREOF, STORAGE BATTERY, AND ELECTRONIC DEVICE

BACKGROUND OF THE INVENTION

1. Field of the Invention

One embodiment of the present invention relates to a semiconductor device, a display device, a light-emitting device, an imaging device, a power storage device, a memory device, a driving method thereof, or a manufacturing method thereof. In particular, one embodiment of the present invention relates to a structure of a storage battery and a method for manufacturing the storage battery. In particular; one embodiment of the present invention relates to a positive electrode active material and a positive electrode active material layer of a lithium-ion storage battery.

2. Description of the Related Art

In recent years, portable electronic devices such as smartphones and tablets have spread rapidly. Furthermore, hybrid cars and electric cars have attracted attention with growing interest in the environment. Thus, the importance of storage batteries increases. Examples of storage batteries include a nickel-metal hydride battery, a lead-acid battery, and a lithium-ion storage battery. In particular, lithium-ion storage batteries have been actively developed because the capacity thereof can be increased and the size thereof can be reduced.

The basic structure of a storage battery includes a positive electrode, a negative electrode, and an electrolyte provided therebetween. Examples of an electrolyte-containing object include a solid electrolyte and an electrolytic solution. Typically, the positive electrode and the negative electrode each include a current collector and an active material layer provided over the current collector. In the case of a lithium-ion storage battery, a material capable of receiving and releasing lithium ions is used as active materials for a positive electrode and a negative electrode.

As examples of positive electrode active materials of a lithium-ion storage battery, phosphate compounds disclosed in Patent Document 1, such as lithium iron phosphate ($LiFePO_4$), lithium manganese phosphate ($LiMnPO_4$), lithium cobalt phosphate ($LiCoPO_4$), and lithium nickel phosphate ($LiNiPO_4$), each of which has an olivine structure and contains lithium (Li) and iron (Fe), manganese (Mn), cobalt (Co), or nickel (Ni), are known.

REFERENCE

Patent Document

[Patent Document 1] Japanese Published Patent Application No. H11-25953

SUMMARY OF THE INVENTION

To improve the performance of a storage battery, a manufacturing method for an electrode with a sufficient capacity is required to be developed. Furthermore, development of storage batteries has room for improvement in charge and discharge characteristics, cycle performance, reliability, safety, cost, and the like.

An object of one embodiment of the present invention is to increase the capacity per volume and/or weight of a power storage device. Another object of one embodiment of the present invention is to increase the capacity per volume and/or weight of an electrode.

Another object of one embodiment of the present invention is to increase the capacity per volume and/or weight of a particle containing a positive electrode active material. Another object of one embodiment of the present invention is to increase the amount of lithium ions per volume and/or weight of a particle containing a positive electrode active material to achieve high energy density.

Another object of one embodiment of the present invention is to cause a battery reaction stably at a high potential in a positive electrode containing a positive electrode active material.

Another object of one embodiment of the present invention is to provide a power storage device in which a decrease in capacity in charge and discharge cycles is inhibited. Another object of one embodiment of the present invention is to provide a positive electrode active material that can be formed at low cost.

A positive electrode active material of a lithium-ion storage battery preferably has high ionic conductivity and high electrical conductivity. Thus, another object of one embodiment of the present invention is to provide a positive electrode active material having high ionic conductivity and/or high electrical conductivity.

Another object of one embodiment of the present invention is to provide a method for manufacturing an electrode of a power storage device. Another object of one embodiment of the present invention is to provide a method for forming a positive electrode active material of a secondary battery.

Another object of one embodiment of the present invention is to provide a novel substance, a novel positive electrode active material, or a novel positive electrode active material layer. Another object of one embodiment of the present invention is to provide a novel particle containing a positive electrode active material. Another object of one embodiment of the present invention is to provide a novel power storage device, a novel battery, or a novel lithium-ion storage battery.

Note that the descriptions of these objects do not disturb the existence of other objects. In one embodiment of the present invention, there is no need to achieve all the objects. Other objects can be derived from the descriptions of the specification, the drawings, the claims, and the like.

One embodiment of the present invention is a method for manufacturing an electrode. The method includes a step of forming an active material layer over a current collector and a step of performing heat treatment after the active material layer is impregnated with alcohol. The active material layer includes an active material particle covered with a film containing carbon, a conductive additive, graphene oxide, and a binder.

Another embodiment of the present invention is a method for manufacturing an electrode. The method includes a step of forming an active material layer over a current collector and a step of performing heat treatment after the active material layer is impregnated with alcohol. The active material layer includes an active material particle covered with a film containing carbon, a conductive additive, graphene oxide, and a binder. The film containing carbon includes reduced graphene oxide.

Another embodiment of the present invention is an electrode including a current collector and an active material layer over the current collector. The active material layer includes an active material particle, a conductive additive, first reduced graphene oxide, second reduced graphene oxide, and a binder. The first reduced graphene oxide is in contact with a first region of the active material particle. The second reduced graphene oxide is in contact with a second region of the active material particle and includes a region covering at least part of the first reduced graphene oxide.

In each of the above structures, the active material particle is preferably a lithium-manganese composite oxide represented by $Li_aMn_bM_cO_d$. In that case, the element M is preferably any one of chromium, cobalt, aluminum, nickel, iron, magnesium, molybdenum, zinc, indium, gallium, copper, titanium, niobium, silicon, and phosphorus.

In each of the above structures, the alcohol is any one of methanol, ethanol, 1-propanol, 2-propanol, 1-butanol, 2-butanol, isobutyl alcohol, and tert-butyl alcohol.

Another embodiment of the present invention is a storage battery including the above electrode and a negative electrode.

Another embodiment of the present invention is an electronic device including the above storage battery, and a display panel, an operation key, a speaker, or a microphone.

One embodiment of the present invention can increase the capacity per volume and/or weight of a power storage device. One embodiment of the present invention can increase the capacity per volume and/or weight of an electrode.

One embodiment of the present invention can increase the capacity per volume and/or weight of a particle containing a positive electrode active material. One embodiment of the present invention can increase the amount of lithium ions per volume and/or weight of a particle containing a positive electrode active material to achieve high energy density.

One embodiment of the present invention can cause a battery reaction stably at a high potential in a positive electrode containing a positive electrode active material.

One embodiment of the present invention can provide a power storage device in which a decrease in capacity in charge and discharge cycles is inhibited. One embodiment of the present invention can provide a positive electrode active material that can be formed at low cost One embodiment of the present invention can provide a positive electrode active material having high ionic conductivity and/or high electrical conductivity.

One embodiment of the present invention can provide a method for manufacturing an electrode of a power storage device. One embodiment of the present invention can provide a method for forming a positive electrode active material of a secondary battery.

One embodiment of the present invention can provide a novel substance, a novel positive electrode active material, or a novel positive electrode active material layer. One embodiment of the present invention can provide a novel particle containing a positive electrode active material. One embodiment of the present invention can provide a novel power storage device, a novel battery, or a novel lithium-ion storage battery.

Note that the descriptions of these effects do not disturb the existence of other effects. One embodiment of the present invention does not necessarily have all the effects listed above. Other effects can be derived from the descriptions of the specification, the drawings, the claims, and the like.

BRIEF DESCRIPTION OF THE DRAWINGS

FIGS. 7A and 78 illustrate a thin storage battery.

FIGS. 3A and 8B illustrate a thin storage battery.

FIGS. 14A, 148, 14C1, 14C2, and 14D are a perspective view, a top view, and cross-sectional views illustrating a structure example of a secondary battery.

FIGS. 19A to 19C illustrate an example of a power storage device.

FIGS. 21A1, 21A2, 21B1, and 21B2 each illustrate an example of a power storage device.

DETAILED DESCRIPTION OF THE INVENTION

Figure 1:
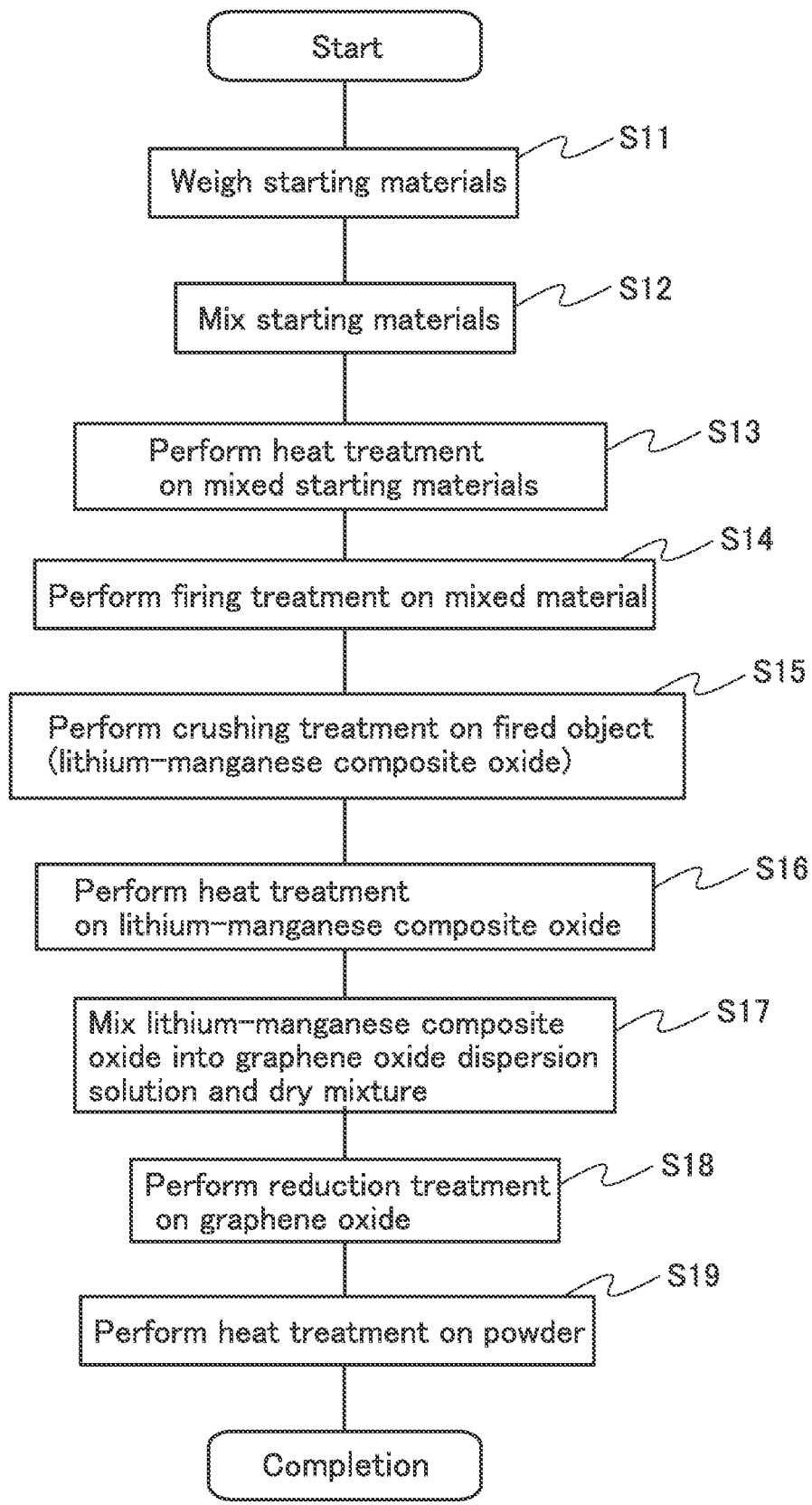
FIG. 1 is a flow chart showing a method for forming an active material.

Embodiments of the present invention will be described in detail below with the reference to the drawings. However, the present invention is not limited to the description below, and it is easily understood by those skilled in the art that modes and details disclosed herein can be modified in various ways. Furthermore, the present invention is not construed as being limited to the description of the embodiments. In describing structures of the present invention with reference to the drawings, common reference numerals are used for the same portions in different drawings. Note that the same hatched pattern is applied to similar parts, and the similar parts are not especially denoted by reference numerals in some cases.

Note that the size, the thickness of films (layers), or regions in drawings is sometimes exaggerated for simplicity.

Note that the ordinal numbers such as "first" and "second" are used for the sake of convenience and do not denote the order of steps or the stacking order of layers. Therefore, for example, description can be given even when "first" is replaced with "second" or "third", as appropriate. In addition, the ordinal numbers in this specification and the like are not necessarily the same as those which specify one embodiment of the present invention.

Note that an active material generally refers only to a material that is involved in intercalation and deintercalation of ions functioning as carriers; however, an active material described in this specification and the like also includes a layer that covers an "active material" in some cases.

Embodiment 1

In this embodiment, a "particle containing a lithium-manganese composite oxide" of one embodiment of the present invention will be described. Furthermore, an active material layer including the particle and an electrode including the active material layer will also be described.

A lithium-manganese composite oxide of one embodiment of the present invention can be represented by a composition formula $Li_aMn_bM_cO_d$. Here, the element M is preferably silicon, phosphorus, or a metal element other than lithium and manganese. Furthermore, it is preferable to satisfy the following: $0 \leq a/(b+c) < 2$; $c > 0$; and $0.26 \leq (b+c)/d < 0.5$. Note that the lithium-manganese composite oxide is an oxide containing at least lithium and manganese, and may contain at st one element selected from chromium, cobalt, aluminum, nickel, iron, magnesium, molybdenum, zinc, indium, gallium, copper, titanium, niobium, silicon, phosphorus, and the like. The lithium-manganese composite oxide preferably has a layered rock-salt crystal structure. The lithium-manganese composite oxide may have a layered rock-salt crystal structure and a spinel crystal structure. The average diameter of a primary particle of the lithium-manganese composite oxide is preferably greater than or equal to 5 nm and less than or equal to 50 μm, for example.

Furthermore, in the case where a whole particle of a lithium-manganese composite oxide is measured, it is preferable to satisfy the following at the time of discharging: $0<a/(b+c)<2$; $c>0$; and $0.26 \leq (b+c)/d<0.5$. To achieve a high capacity, a surface portion and a center portion of the lithium-manganese composite oxide are preferably different in crystal structure, crystal orientation, or oxygen content. In order that such a lithium-manganese composite oxide can be obtained, the following is preferably satisfied: $1.6 \leq a \leq 1.848$; $0.19 \leq c/b \leq 0.935$; and $2.5 \leq d \leq 3$.

<Synthesis>

Next, a method for forming the "particle containing the lithium-manganese composite oxide" of one embodiment of the present invention will be described. In this embodiment, the lithium-manganese composite oxide is synthesized first. Then, a coating layer is formed on the lithium-manganese composite oxide, so that a particle including a first region, a second region, and a third region is obtained.

A manganese compound and a lithium compound can be used as raw materials of the lithium-manganese composite oxide. In addition to the manganese compound and the lithium compound, a compound containing at least one element selected from chromium, cobalt, aluminum, nickel, iron, magnesium, molybdenum, zinc, indium, gallium, copper, titanium, niobium, silicon, phosphorus, and the like can be used as a raw material. Examples of the manganese compound are manganese dioxide, manganese sesquioxide, trimanganese tetroxide, hydrous manganese oxide, manganese carbonate, and manganese nitrate. Examples of the lithium compound are lithium hydroxide, lithium carbonate, and lithium nitrate.

In this embodiment, $MnCO_3$ (manganese compound), $Li_2CO_3$ (lithium compound), and NiO are used as starting materials.

First, the materials are weighed as shown in Step S11 in FIG. 1.

In the case where $Li_2CO_3$, $MnCO_3$, and NiO are used as starting materials ratio for weighing (molar ratio) of 1:0.7:0.3, for example, a lithium-manganese composite oxide $Li_2Mn_{0.7}Ni_{0.3}O_3$ is formed as a final product. In this case, the atomic ratio of Li to (Mn+Ni) in the lithium-manganese composite oxide is 2:1.

In this embodiment, the ratio for weighing (molar ratio) of the starting materials is adjusted so that the atomic ratio of Li to (Mn+Ni) in the lithium-manganese composite oxide is slightly different from 2:1.

In this embodiment, the starting materials are weighed so that the ratio for weighing (molar ratio) of $Li_2CO_3$ to $MnCO_3$ and NiO is 0.84:0.8062:0.318.

Next, the starting materials ($Li_2CO_3$, $MnCO_3$, and NiO) are mixed as shown in Step S12 in FIG. 1. There is no particular limitation on a method for mixing the starting materials, and a known crusher or a known mill such as a ball mill, a bead mill, a jet mill, or a roller mill can be used. A crushing and grinding method can be either a dry method or a wet method. There is no particular limitation on a solvent that is used in a wet method, and water, alcohol, or acetone can be used as the solvent, for example.

When the starting materials are mixed by a wet method, heat treatment shown in Step S13 in FIG. 1 for evaporating or vaporizing a solvent contained in the mixed starting materials is performed. The heat treatment is performed at higher than or equal to 50° C. and lower than or equal to 150° C. The solvent contained in the mixed starting materials is evaporated by the heat treatment, whereby a mixed material is obtained.

Then, the mixed material is put in a crucible and firing treatment shown in Step S14 in FIG. 1 is performed at higher than or equal to 800° C. and lower than or equal to 1000° C. The faring treatment is performed for longer than or equal to 5 hours and shorter than or equal to 20 hours in dry air at a flow rate of 10 L/min, for example. The firing atmosphere may be an air atmosphere or an atmosphere containing an oxygen gas. Owing to the firing treatment of the mixed material, a fired object. (lithium-manganese composite oxide) is formed.

Figure 2A:
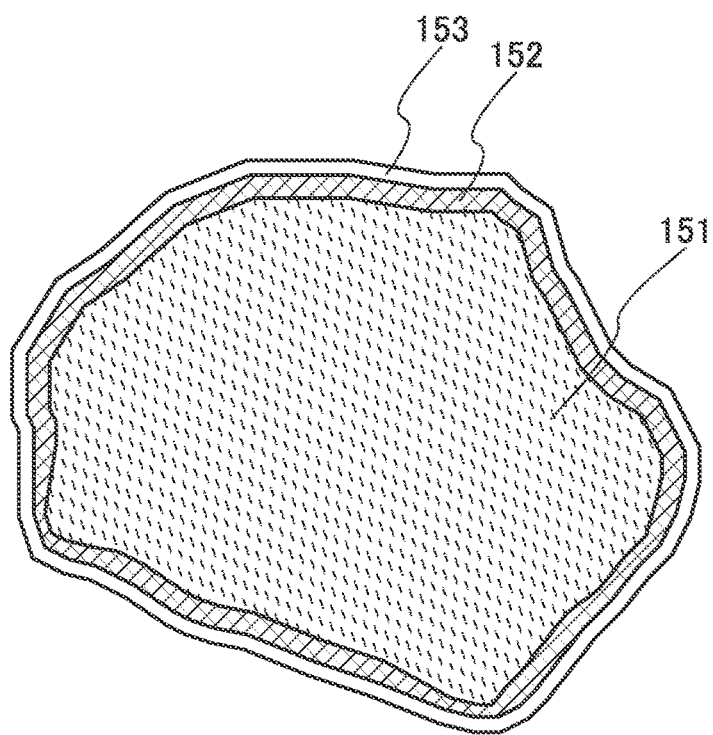
FIGS. 2A and 2B each illustrate a particle of one embodiment of the present invention.

As shown in FIG. 2A, the lithium-manganese composite oxide which is synthesized by firing and in which a plurality of primary particles are sintered is in a state where the plurality of primary particles are sintered and a large secondary particle is formed. Therefore, crushing treatment shown in Step S15 in FIG. 1 is performed on the lithium-manganese composite oxide in which the plurality of primary particles are sintered. By performing the crushing treatment on the fired object, the fired object is crushed into the primary particles or powder as small as the primary particles. The crushing treatment in this specification and the like includes an operation of grinding a sintered object. Note that grinding means further crushing of the primary particles. As in the case of mixing the starting materials, a known crusher or a known mill such as a ball mill or a bead mill can be used for the crushing treatment. A crushing and grinding method can be either a dry method or a wet method. There is no particular limitation on a solvent that is used in a wet method, and water, alcohol, or acetone can be used as the solvent, for example.

The size of the particle subjected to crushing and grinding can be estimated by measuring the specific surface area of the particle, for example. By increasing the specific surface area of the particle containing the lithium-manganese composite oxide, for example, the area of contact between the particle and an electrolyte solution can be increased in the case of manufacturing a storage battery including a positive electrode in which the particle containing the lithium-manganese composite oxide is used. The increase in their contact area can increase the reaction rate of the storage battery and increase the output characteristics, for example.

It is preferable to perform the crushing treatment because the specific area of the particle is increased in some cases. The specific surface area of the particle containing the lithium-manganese composite oxide is preferably greater than or equal to 0.1 m$^2$/g, for example. If the specific surface area of the particle is excessively large, lei the amount of binder in the electrode containing the particle with respect to the specific surface area is insufficient, and this reduces the strength of the electrode in some cases. When the amount of binder is increased in this case, the capacity of the electrode per unit weight and unit volume is reduced in some cases. Therefore, the specific surface area of the particle containing the lithium-manganese composite oxide is preferably greater than or equal to 1 m$^2$/g and less than or equal to 50 m$^2$/g, more preferably greater than or equal to 5 m$^2$/g and less than or equal to 30 m$^2$/g.

In this embodiment, the crushing treatment of the lithium-manganese composite oxide in which primary particles are sintered is performed with a bead mill by a wet method using acetone.

When the crushing treats is performed by a wet method, heat treatment for evaporating a solvent is performed after the crushing treatment. The heat treatment may be performed in a manner similar to that of the heat treatment in Step S13. After that, vacuum drying is performed, whereby powdery lithium-manganese composite oxide is obtained.

Next, heat treatment is performed. The heat treatment shown in Step S16 in FIG. 1 is performed in the following manner: the lithium-manganese composite oxides subjected to the crushing treatment are put in a crucible and heated at higher than or equal to 300° C. and lower than or equal to 1000° C., preferably higher than or equal to 600° C. and lower than or equal to 900° C. The heat treatment is performed for longer than or equal to 5 hours and shorter than or equal to 20 hours in dry air at a flow rate of 10 L/min, for example. The atmosphere may be an air atmosphere or an atmosphere containing an oxygen gas.

Through the above steps, the lithium-manganese composite oxide represented by the composition formula $Li_aMn_bM_cO_d$ can be formed. In this embodiment, the raw materials are weighed so that the ratio for weighing (molar ratio) of $Li_2CO_3$ to $MnCO_3$ and NiO is 0.84:0.8062:0.318, whereby a lithium-manganese composite oxide represented by a composition formula $Li_{1.68}Mn_{0.8062}M_{0.318}O_3$ can be formed.

The crystallinity of the lithium-manganese composite oxides subjected to the crushing treatment shown in Step S15 might be disordered by the impact of the crushing treatment. In addition, oxygen vacancies might be formed in the lithium-manganese composite oxide. Thus, heat treatment is preferably performed again on the powdery lithium-manganese composite oxide subjected to the vacuum drying.

The heat treatment performed on the lithium-manganese composite oxides subjected to the crushing treatment can repair oxygen vacancies and compensate the crystal disorder caused by the crushing treatment. Note that another crushing treatment may be performed on the powdery lithium-manganese composite oxide subjected to the heat treatment, in which case the crushing treatment can be performed in a manner similar to that of the crushing treatment in Step S15 in FIG. 1.

The atomic ratio Li to (Mn+Ni) in the lithium-manganese composite oxide described in this embodiment is slightly different from 2:1. Thus, the electrode containing such a lithium-manganese composite oxide can increase the voltage and the discharge capacity compared with that containing a lithium-manganese composite oxide whose atomic ratio of. Li to (Mn+Ni) is 2:1.

Through the above steps, the lithium-manganese composite oxide in the form of particles can be obtained. Here, the lithium-manganese composite oxide preferably includes the first region and the second region. The second region is in contact with at least a part of a surface of the first region and is located on the outside of the first region. Here, the term "outside" refers to the side closer to the surface of a particle.

The first region and the second region contain lithium and oxygen. At least one of the first region and the second region contains manganese. At least one of the first region and the second region contains the element M. Here, the element M is preferably silicon, phosphorus, or a metal element other than lithium and manganese, more preferably Si, P, or a metal element selected from Ni, Ga, Fe, Mo, In, Nb, Nd, Co, Sin, Mg, Al, Ti, Cu, and Zn, still more preferably nickel.

<Coating Layer>

Next, the coating layer is formed on the lithium-manganese composite oxide obtained through the above process. The coating layer preferably contains carbon. Since carbon has high conductivity, the particle coated with carbon in the electrode of the storage battery can reduce the resistance of the electrode, for example. The coating layer may contain graphene oxide or reduced graphene oxide.

The coating layer may contain a metal compound. Examples of the metal include cobalt, aluminum, nickel, iron, manganese, titanium, zinc, and lithium. Examples of the metal compound include an oxide of the metal and a fluoride of the metal.

In this embodiment, a layer containing carbon is provided as the coating layer. It is preferred that a graphene compound be used as the layer containing carbon. in particular, graphene or reduced graphene oxide is preferably used. Graphene or reduced graphene oxide may be a single layer or a stack of two or more and a hundred or less layers. Graphene and reduced graphene oxide have am excellent electrical characteristic of high conductivity and excellent physical properties of high flexibility and high mechanical strength.

The thickness of the layer containing carbon is preferably greater than or equal to 1 nm and less than or equal to 50 nm.

Graphene compounds, graphene, or graphene oxide will be described below. Graphene has carbon atoms arranged in one atomic layer. A π bond exists between the carbon atoms.

Compounds including graphene as a basic skeleton are red to as graphene compounds.

Graphene compounds will be detailed below.

Among graphene compounds, those with two to a hundred layers of graphene are referred to as multilayer graphene in some cases. Graphene and multilayer graphene have a length in the longitudinal direction of greater than or equal to 50 nm and less than or equal to 100 μm or greater than or equal to 800 nm and less than or equal to 50 μm.

Graphene compounds may be compounds where graphene or multilayer graphene is modified with an atom other than carbon or an atomic group with an atom other than carbon. Graphene compounds may be compounds where graphene or multilayer graphene is modified with an atomic group composed mainly of carbon, such as an alkyl group. An atomic group is sometimes referred to as a substituent group, a functional group, a characteristic group, or the like.

The top and rear surfaces of a graphene compound may be modified with different atoms or atomic groups. When a graphene compound has multilayer graphene, those layers may be modified with different atoms or atomic groups.

An example of the above-mentioned graphene modified with an atomic group is graphene a multilayer graphene modified with oxygen. Alternatively, graphene or multilayer graphene modified with a functional group containing oxygen may be used. Examples of functional groups containing oxygen include an epoxy group, a carbonyl group such as a carboxyl group, and a hydroxyl group. Graphene modified with oxygen is referred to as graphene oxide in some cases.

Graphene oxide can be formed by various synthesis methods such as a Hummers method, a modified Hummers method, and oxidation of graphite.

For example, the Hummers method is a method for forming graphite oxide by oxidizing graphite such as flake graphite. The obtained graphite oxide is graphite that is oxidized in places and thus to which a functional group such as a carbonyl group, a carboxyl group, or a hydroxyl group is bonded. In the graphite oxide, the crystallinity of the graphite is lost and the distance between layers is increased. Therefore, the layers can be easily separated by ultrasonic treatment or the like to obtain graphene oxide.

Reducing graphene oxide provides a graphene compound with high conductivity. A graphene compound that can be obtained by reducing graphene oxide is referred to as reduced graphene oxide or RGO in some cases. In reduced graphene oxide or RGO, in some cases, oxygen contained in the graphene oxide is not entirely extracted. In some cases, oxygen or an atomic group containing oxygen in the state of being bonded to carbon remains in reduced graphene oxide or RGO. In some cases, RGO includes a functional group, e g., an epoxy group, a carbonyl group such as a carboxyl group, or a hydroxyl group.

A graphene compound may have one sheet-like shape where a plurality of graphene compounds partly overlap with each other. Such a graphene compound is referred to as a graphene compound sheet in sonic cases. The graphene compound sheet has, for example, an area with a thickness larger than or equal to 0.33 nm and smaller than or equal to 50 μm, or preferably larger than or equal to 0.34 nm and smaller than or equal to 10 μm. The graphene compound sheet may be modified with an atom other than carbon, atomic group containing an atom other than carbon, an atomic group mainly composed of carbon, such as an alkyl group, or the like. A plurality of layers in the graphene compound sheet may be modified with different atoms or atomic groups.

A graphene compound nay have a five-membered ring composed of carbon atoms or a poly-membered ring that is a seven or more-membered ring composed of carbon atoms, in addition to a six-membered ring composed of carbon atoms. In the neighborhood of a poly-membered ring except a six-membered ring, a region through which lithium ions can pass may be generated.

A plurality of graphene compounds may be gathered to form a sheet-like shape.

A graphene compound has a planar shape, thereby enabling surface contact.

A graphene compound such as graphene, multilayer graphene, or reduced graphene oxide has an excellent electrical characteristic of high conductivity and excellent physical properties of high flexibility, high mechanical strength, and the like graphene compound has a planar shape, thereby enabling low-resistant surface contact. Furthermore, a graphene compound has extremely high conductivity even with a small thickness in some cases and thus allows a conductive path to be formed in an active material layer efficiently even with a small amount. Thus, a conductive graphene compound is preferably used as a conductive additive, in which case the area where an active material and the conductive additive are in contact with each other can be increased and electrical resistance may be reduced.

In the case where active materials with a small average particle diameter (e.g., 1 μm or less) used, the specific surface area of the active material is large and thus more conductive paths for the active materials are needed. In such a case, it is particularly preferred that a graphene compound that can efficiently form a conductive path even in a small amount be used.

Some graphene compounds can be used as insulators. For example, a graphene compound sheet can be used as a sheet-like insulator. Graphene oxide, for example, has a more excellent insulation property than graphene in some cases. A graphene compound modified with an atomic group may have an improved insulation property, depending on the type of the modifying atomic group.

The graphene compound of one embodiment of the present invention may include a precursor of graphene. The precursor of graphene may contain the above-mentioned graphene oxide, graphite oxide, or the like.

Graphene containing an alkali metal or an element other than carbon, such as oxygen, is referred to as a graphene analog in some cases. Examples of the graphene compound of one embodiment of the present invention include graphene analogs.

The graphene compound of one embodiment of the present invention may include an atom, an atomic group, and ions of them between the layers. For example, the graphene compound may include a lithium compound or lithium ions between graphene layers. The physical properties, such as electric conductivity and ionic conductivity, of a graphene compound sometimes change when an atom, an atomic group, and ions of them exist between layers of the graphene compound. In such a case, a distance between the layers may be large than that of multilayer graphene, for example.

In the case where the graphene compound is reduced graphene oxide, the distance between adjacent reduced graphene oxide layers is preferably greater than or equal to 0.335 nm and less than or equal to 0.700 nm.

The interlayer distance of reduced graphene oxide can be measured by observing a cross section of the reduced graphene oxide with a transmission electron microscope (TEM). The interlayer distance of reduced graphene oxide can be calculated from interplanar spacing information ire various directions that can be measured by X-ray diffraction (XRD), for example.

As the graphene compound of one embodiment of the present invention, reduced graphene oxide is used. The oxygen concentration in the whole reduced graphene oxide that is measured by XPS is, for example, preferably higher than or equal to 0.3 atomic % and lower than or equal to 20 atomic %, more preferably higher than or equal to 1 atomic % and lower than or equal to 11 atomic %, still more preferably higher than or equal to 3 atomic % and lower than or equal to 10 atomic %.

In the case where a graphene compound is analyzed by XPS and the spectrum of binding energy of carbon corresponding to C1s is subjected to waveform separation, the proportion of peaks indicating $sp^2$ with respect to the whole spectrum of C1s can be estimated as an area ratio. The proportion of $sp^2$ in the graphene compound of one embodiment of the present invention is preferably higher than or equal to 50% and lower than or equal to 90% of the whole spectrum of C1s. Increasing the proportion of $sp^2$ can heighten the conductivity of the graphene compound, for example.

Note that physical values such as the interplanar spacing and the oxygen concentration given above are only examples, and those of the graphene compound of one embodiment of the present invention are not limited thereto.

Next, a method for covering the lithium-manganese composite oxide with the layer containing carbon will be described.

The length of one side (also referred to as a flake size) of the graphene oxide is greater than or equal to 50 nm and less than or equal to 100 μm, preferably greater than or equal to 800 nm and less than or equal to 50 μm. It is preferable that the flake size be as large as possible to cover surfaces of the lithium-manganese composite oxides with ease.

First, graphene oxide and water are put in a mixer to form a dispersion solution of graphene oxide. At this time, graphene oxide at greater than or equal to 0.5 wt % and less than or equal to 5 wt % is preferably used. Graphene oxide at less than 0.5 wt % is insufficient to cover the surfaces of the lithium-manganese composite oxides, whereas graphene oxide at greater than 5 wt % causes an increase in the volume and weight of the electrode.

Next, the lithium-manganese composite oxides are mixed into the dispersion solution and kneading is performed as shown in Step S17 in FIG. 1. Note that kneading means mixing something until it has a high viscosity. The kneading can separate aggregation of lithium-manganese composite oxide powder; thus, the graphene oxide and the lithium-manganese composite oxides can be uniformly dispersed.

Then, the mixture of the graphene oxide and the lithium-manganese composite oxides is dried under a reduced pressure in a bell jar and then is ground in a mortar, so that the lithium-manganese composite oxides coated with graphene oxide are obtained.

Subsequently, reduction treatment is performed on the graphene oxide covering the surfaces of the lithium-manganese composite oxides as shown in Step S18 in FIG. 1. The reduction treatment of the graphene oxide may be performed by heat treatment or by causing a reaction in a solvent containing a reducing agent. In this embodiment, the graphene oxide is reacted in a solvent containing a reducing agent.

When the graphene oxide is reacted in the solvent containing a reducing agent, the graphene oxide covering the surfaces of the lithium-manganese composite oxides is reduced to give reduced graphene oxide. Note that oxygen in the graphene oxide is not necessarily entirely released and may remain partly in the reduced graphene oxide. In the case where the reduced graphene oxide contains oxygen, the proportion of oxygen in the reduced graphene oxide, which is measured by XPS, is higher than or equal to 0.3 atomic % and lower than or equal to 2.0 atomic %, preferably higher than or equal to 3 atomic % and lower than or equal to 15 atomic %. This reduction treatment with the reducing agent is preferably performed at a temperature higher than or equal to room temperature and lower than or equal to 150° C., more preferably a temperature higher than or equal to room temperature and lower than or equal to 80° C. The reduction treatment with heating can promote the reduction reaction. The reduction treatment time is preferably longer than or equal to 3 minutes and shorter than or equal to 10 hours.

Examples of the reducing agent include ascorbic acid, hydrazine, dimethyl hydrazine, hydroquinone, sodium boron hydride ($NaBH_4$), lithium aluminum hydride ($LiAlH_4$), N,N-diethylhydroxylamine, and a derivative thereof. For example, ascorbic acid and hydroquinone are preferable to hydrazine and sodium tetrahydroborate in that they are safe owing to low reducing ability and utilized industrially with ease.

A polar solvent can be used as the solvent of a reducing solution. Any material can be used for the solvent as long as it can dissolve the reducing agent. Examples of the material for the solvent include water, methanol, ethanol, acetone, tetrahydrofuran (THF), dimethylformamide (DMF), N-methyl-2-pyrrolidone (NMP), dimethyl sulfoxide (DMSO), ethylene glycol, diethylene glycol, glycerin, and a mixed solution of any two or more of the above.

As the reducing solution containing a reducing agent and a solvent, a liquid in which ethanol and ascorbic acid are mixed, or a liquid in which water, ascorbic acid, and lithium hydroxide are mixed can be used. In this embodiment, a reducing solution containing ascorbic acid, water, ethanol, and lithium hydroxide is used.

When the graphene oxide covering the lithium-manganese composite oxide is reacted in the reducing solution, protons of ascorbic acid are added to the graphene oxide and then $H_2O$ is released, whereby the graphene oxide is reduced.

After the reduction treatment, the reducing solution is filtered. A substance obtained in this step is referred to as a substance A. The filtration can be suction filtration or the like. Alternatively, the substance A and a liquid may be separated from each other by centrifugation.

Next, the obtained substance A is washed. The washing is preferably performed using a solvent given as the solvent contained in the reducing solution. The solvent can be either the same as or different from the solvent contained in the reducing solution.

Next, heat treatment performed as shown in Step S19 in FIG. 1. The heat treatment step is performed, for example, at a temperature higher than or equal to 50° C. and lower than 500° C., preferably higher than or equal to 120° C. and lower than or equal to 400 for longer than or equal to 1 hour and shorter than or equal to 48 hours. The heat treatment sufficiently evaporates or vaporizes and removes the polar solvent and moisture. The heat treatment step can also promote the reduction of graphene oxide. The heat treatment may be performed under a reduced pressure (in vacuum), under an atmospheric pressure, or in a reducing atmosphere. As an atmosphere for the heating, air or an inert gas such as a nitrogen gas may be used.

Here, in the case where e substance A is in the form of particles, the particles preferably form secondary particles.

In the case where the substance A forms secondary particles, the average value of the particle diameters of the secondary particles is preferably less than or equal to 50 μm, more preferably less than or equal to 30 μm, still more preferably greater than or equal to 1 μm and less than or equal to 20 μm. The particle diameter refers to, for example, a particle diameter measured with a particle size analyzer. The particle diameter may refer to the diameter of the secondary particle of the substance A. The diameter of the secondary particle can also be obtained by observation of the particle with a microscope, for example, as well as measurement with a particle size analyzer Alternatively, the diameter of a particle can be obtained by calculating the diameter of a circle whose area is equal to the area of the cross section of the particle.

Note that another method may be used in which, after the substance A is washed, a liquid is formed by dispersing the substance A in a solvent, and the solution is subjected to spray dry treatment and dried, for example. By the spray dry treatment, the substance A forms secondary particles, for example, so that the particle diameter is changed in some cases.

In the case where the substance A is subjected to spray dry treatment after being washed, heat treatment shown in Step S19 is preferably performed after the spray dry treatment.

Through the above steps, the graphene oxide is reduced, so that reduced graphene oxide can be formed on the surfaces of the lithium-manganese composite oxides.

Note that as described above, oxygen in the graphene oxide is not necessarily entirely released and may partly remain in the reduced graphene oxide.

In some cases, the heat treatment after the reduction treatment can increase electrical conductivity of reduced graphene oxide compared with that before the heat treatment.

Also, a particle in which reduced graphene oxide is provided on at least part of the surface of the lithium-manganese composite oxide can be formed.

Reduced graphene oxide has an excellent electrical characteristic of high conductivity and excellent physical properties of high flexibility and high mechanical strength. Therefore, the use of the electrode containing the particle in a battery can improve the electrical conductivity of the electrode, for example.

Through the above steps, the particle of one embodiment of the present invention can be obtained. The particle of one embodiment of the present invention contains the lithium-manganese composite oxide. The particle of one embodiment of the present invention preferably includes the first to third regions.

In the case where be second region includes a layered region, the thickness of the layered region is preferably greater than or equal to 0.1 nm and less than or equal to 30 nm, more preferably greater than or equal to 1 nm and less than or equal to 15 nm.)

The first region and the second region contain lithium and oxygen. At least one of the first region and the second region contains manganese. At least one of the first region and the second region contains the element M.

More preferably, the first region and the second region contain both manganese and the element M.

The third region preferably includes a surface of a particle containing the lithium-manganese composite oxide of one embodiment of the present invention.

In the case where the third region includes a layered region, the thickness of the layered region is preferably greater than or equal to 0.1 nm and less than or equal to 30 nm, more preferably greater than or equal to 1 nm and less than or equal to 20 nm, much more preferably greater than or equal to 2 nm and less than or equal to 10 nm.

FIG. 2A shows an example in which a. particle includes a region 151 as the first region, a region 152 as the second region, and a region 153 as the third region.

As shown in FIG. 2A, at least a part of the region 152 is in contact with a surface of the region 151, At least a part of the region 153 is in contact with a surface of the region 152.

Figure 2B:
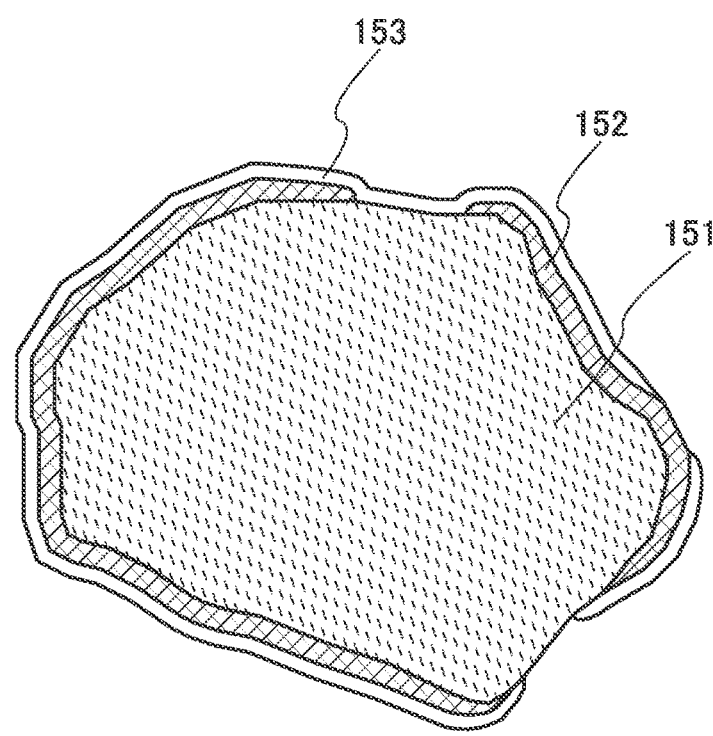

As shown in FIG. 2B, the region 151 may include a region not covered with the region 152. The region 152 may include a region not covered with the region 153. For example, the region 151 may include a region in contact with the region 153. The region 151 may include a region covered with neither the region 152 nor the region 153.

In the case where a power storage device s fabricated using the particle containing the lithium-manganese composite oxide of one embodiment of the present invention, the third region is preferably more stable than the first region and the second region against a battery reaction, e.g., charging and discharging.

The second region may include a crystal structure different from that of the first region. The second region may include a crystal whose orientation is different from that of the first region.

It is preferable that the second region have a spinel structure and that the first region have a layered rock-salt structure, for example.

Alternatively, it is preferable that the first region and the second region have a layered rock-salt structure and that a first plane of a crystal included in the first region be parallel to a second plane of a crystal included in the second region, for example.

Here, in the case where the first plane is a {0 0 1} plane of the layered rock-salt structure, the {0 0 1} plane of the layered rock-salt structure is preferably parallel to at least one of a {1 0 0} plane, a {1 3 −1} plane, and a {−1 3 1} plane of a crystal included in the second region. Alternatively, in the case where the first plane is a {1 0 0} plane of the layered rock-salt structure, the {1 0 0} plane of the layered rock-salt structure is preferably at least parallel to at least one of a {0 0 1} plane, a {1 3 −1} plane, and a {−1 3 1} plane of a crystal included in the second region. Alternatively, in the case where the first plane is a {1 3 −1} plane of the layered rock-salt structure, the {1 3 −1} plane of the layered rock-salt structure is preferably parallel to at least one of a {0 0 1} plane, a {1 0 0} plane, and a {−1 3 1} plane of a crystal included in the second region. Alternatively, in the case where the first plane is a {−1 3 1} plane of the layered rock-salt structure, the {−1 3 1} plane of the layered rock-salt structure is preferably parallel to at least one of a {0 0 1} plane, a {1 0 0} plane, and a {1 3 −1} plane of a crystal included in the second region.

Next, crystal orientations of the crystal included in the first region and the crystal included in the second region will be described.

Here, a first, group includes three crystal orientations of <1 1 0>, <1 1 0>, and <−1 1 0>, a second group includes <0 0 1>. <0 1 1>, and <0 1 −1>, a third group includes <−3 2 3>, <3 1 6>, and <6 −1 3>, and a fourth group includes <3 2 −3>, <3 −1 6>, and <6 1 3>.

The crystal included in the first region has an orientation selected from the orientations in one of the first to fourth groups. The crystal included in the second region has an orientation selected from the orientations in one of three groups other than the group from which the orientation of the crystal included in the first region is selected.

The second region preferably has composition different from that of the first region.

For example, the case is described where the first contains lithium, manganese, the element M, and oxygen; the second region contains lithium, manganese, the element M, and oxygen; the atomic ratio of lithium to manganese, the element M, and oxygen in the first region is represented by $a1:b1:c1:d1$; and the atomic ratio of lithium to manganese, the element M, and oxygen in the second region is represented by $a2:b2:c2:d2$. Here, $d1/(b1+c1)$ is preferably greater than or equal to 2.2, more preferably greater than or equal to 2.3, much more preferably greater than or equal to 2.35 and less than or equal to 3. Furthermore, $d2/(b2+c2)$ is preferably less than 2.2, more preferably less than 2.1, much more preferably greater than or equal to 1.1 and less than or equal to 1.9.

The valence of manganese in the second region may be different from that of manganese in the first region. The valence of the element M in the second region may be different from that of the element M in the first region.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region and the first region. Here, the transition layer is a region where composition is changed continuously or gradually, a region where a crystal structure is changed continuously or gradually, or a region where the lattice constant of a crystal is changed continuously or gradually.

A mixed layer may be provided between the second region and the first region. The mixed layer is a layer in which, for example, two or more crystals having different crystal orientations are mixed, two or more crystals having different crystal structures are mixed, or two or more crystals having different compositions are mixed.

Here, the first region preferably has a layered rock-salt structure, and the second region preferably has at least one of a spinel structure and a layered rock-salt structure.

In the case where a storage battery or the like is fabricated using the "particle containing the lithium-manganese composite oxide" of one embodiment of the present invention, the first to third regions may be formed in any of the steps before the completion of the storage battery.

For example, the first to third regions may be formed before the formation of the electrode, e.g., after the synthesis of the particle. Alternatively, the first to third regions may be formed in forming the electrode. The thickness, the composition, the crystal structure, and the like of the first to third regions which are formed after the synthesis of the particle, for example, may be changed in the formation of the electrode.

By performing the heat treatment after the reduction treatment, the first to third regions are formed in the "particle containing the lithium-manganese composite oxide" of one embodiment of the present invention, for example, in some cases. The first to third regions in the "particle containing the lithium-manganese composite oxide" may be formed before the heat treatment or in the heat treatment. The thickness, the composition, the crystal structure, and the like of the first to third regions which are formed, for example, before the formation of the coating layer, after the formation of the coating layer, and after the reduction treatment may be changed in the heat treatment.

In a process for form the lithium-manganese composite oxide, a crushing step of the lithium-manganese composite oxide (Step S15, for example) in which primary particles are sintered is important because the step influences the characteristics of a battery. In the crushing step, a shear (grinding stress) is applied to the lithium-manganese composite oxide in which the primary particles are sintered, whereby a powdery lithium-manganese composite oxide is formed. In the case where the lithium-manganese composite oxide has a layered rock-salt crystal structure, a primary particle might be cleaved and cracked along a plane parallel or perpendicular to the layer at this time. The cleaved and cracked primary particle is called a particle having a cleavage plane or a particle with a cleavage plane exposed, in this specification and the like. Note that some cracked primary particles do not have a cleavage plane.

Such cleavage and cracking of the primary particle of the lithium-manganese composite oxide as the active material cause a decrease in the discharge capacity and cycle performance of a battery.

Also in the above-described case, a layer containing carbon is preferably formed on a cleavage plane of the lithium-manganese composite oxide. The layer containing carbon may cover the entire cleavage plane or the whole lithium-manganese composite oxide having a cleavage plane. Here, "cleavage plane" includes a plane exposed by cleavage, for example.

In one embodiment of the present invention, reduced graphene oxide is formed so as to cover the lithium-manganese composite oxide. The reduced graphene oxide may be formed on either the whole or part of the surface of the lithium-manganese composite oxide. The reduced graphene oxide is preferably formed so as to cover an exposed cleavage plane of a particle. The reduced graphene oxide needs to be formed on at least part of a cleavage plane of the lithium-manganese composite oxide.

Reduced graphene oxide may have excellent physical properties of high flexibility and high mechanical strength. For this reason, in a battery including an electrode containing the active material, which is the lithium-manganese composite oxide whose cleavage plane is at least partly covered with the reduced graphene oxide, the lithium manganese composite oxide can be prevented from further cleaving and cracking due to the volume change even when the lithium manganese composite oxide repeats expansion and contraction accompanying repeated charge and discharge of the battery. This can prevent a decrease in the voltage and discharge capacity of the battery. Accordingly, the charge-discharge cycle performance of the battery can be improved.

<Manufacturing Method for Electrode>

Next, a method for manufacturing the electrode of one embodiment of the present invention will be described with reference to FIG. 3.

Figure 3:
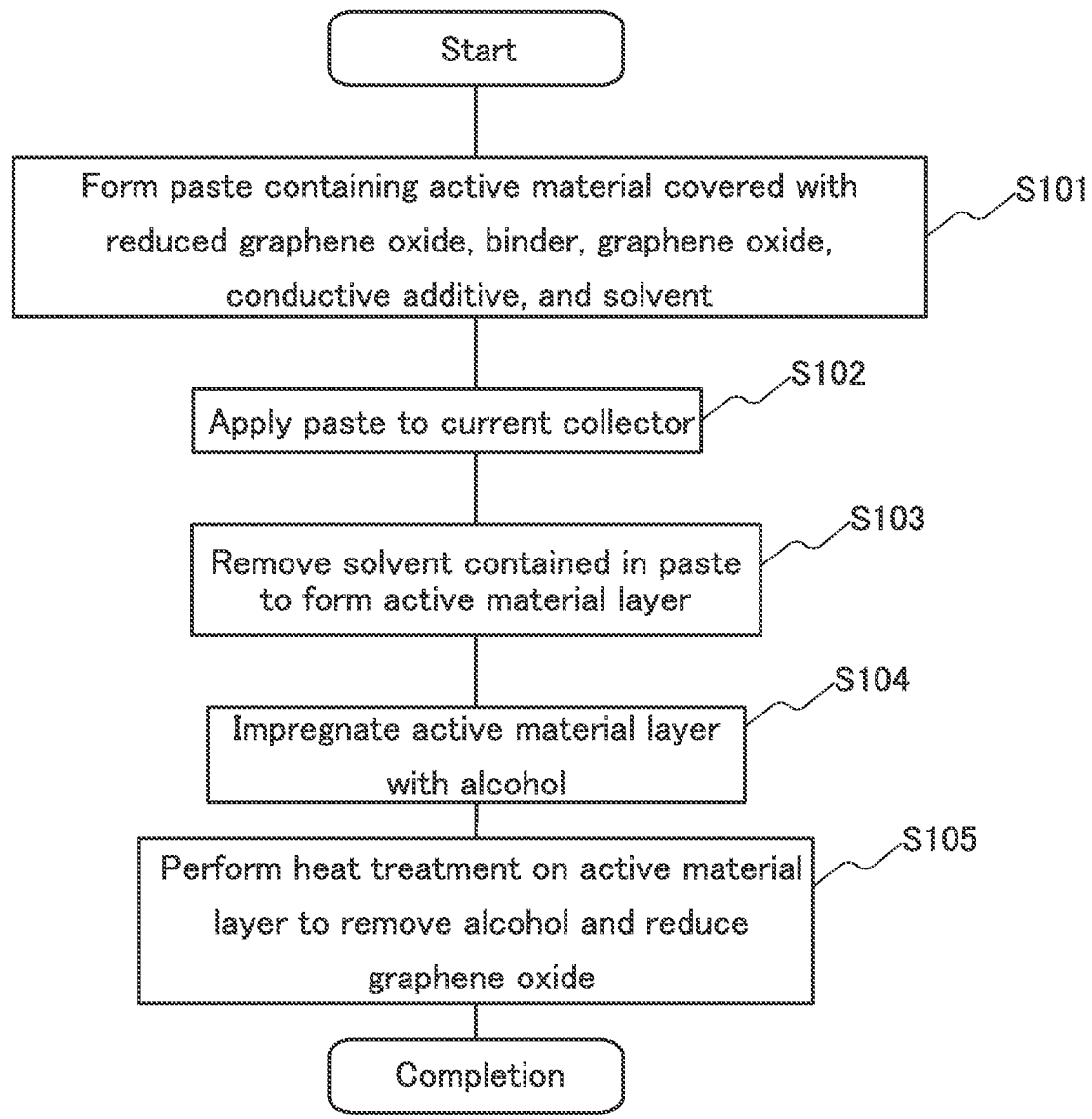
FIG. 3 is a flow chart showing a method for manufacturing an electrode.

First, an electrode mixture paste is formed as shown in Step S101 in FIG. 3. An example of a method for forming the electrode mixture paste will be described below. The electrode mixture paste can be formed in such a manner that the above-described active material covered with the reduced graphene oxide, graphene oxide, a binder, a conductive additive, and the like are mixed together and the mixture is kneaded with a solvent, for example. The electrode mixture paste can be either in a slurry form or a paste form.

The case where the electrode positive electrode of a storage battery will be described as an example. Here, an example will be described in which the lithium-manganese composite oxide covered with the reduced graphene oxide is used as an active material, acetylene black (AB) is used as a conductive additive, polyvinylidene fluoride (PVdF) is used as a binder, NMP is used as a solvent, and graphene oxide is further added.

First, graphene oxide is dispersed into the solvent. When the ratio of the weight of the graphene oxide to the total weight of the electrode mixture paste (the total weight of the active material, the graphene oxide, the conductive additive, and the binder) is lower than 0.2 wt %, the conductivity is decreased when the active material layer is formed. When the weight ratio of the graphene oxide exceeds 16 wt %, the viscosity of the paste is increased although it depends on the particle diameter of the active material. In a drying step after the paste is applied to the current collector, convection might be generated in the paste by heating and thin and lightweight graphene oxide moves or is aggregated, in which case the active material layer might be cracked or separated from the current collector. Thus, the weight ratio of the graphene oxide to the paste is preferably higher than or equal to 0.2 wt % and lower than or equal to 16 wt %. Note that the graphene oxide is reduced by a later heat treatment step, so that the weight is decreased by almost half, and consequently the weight ratio of the reduced graphene oxide in the active material layer becomes higher than or equal to 0.1 wt % and lower than or equal to 8 wt %.

A polar solvent can be used as the solvent. For example, a mixed solution containing one of methanol, ethanol, acetone, THF, DMF, NMP, and DMSO or a mixed solution of two or more of the above can be used. It is particularly preferable to use NMP because graphene oxide can be well dispersed therein.

Next, the active material and the conductive additive are added. As the active material, the above-described active material can be used. Here, for example, the lithium-manganese composite oxide of one embodiment of the present invention is used as the active material.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt %, more preferably greater than or equal to 1 wt % and less than or equal to 5 wt %.

A network for electric conduction can be formed in the electrode by the conductive additive. The conductive additive also allows maintaining of a path for electric conduction between the positive electrode active materials. The addition of the conductive additive to the active material layer increases the electric conductivity of the active material layer.

Next, a mixture of the above is kneaded, so that the cohesion of the graphene oxide and the active material can be weakened. Since oxygen in a functional group of the graphene oxide is negatively charged in the polar solvent, different flakes of graphene oxide are unlikely to be aggregated. In addition, the graphene oxide strongly interacts with the active material. Hence, the graphene oxide can be further uniformly dispersed in the active material layer.

Then, a binder is added to the mixture. The amount of the binder is determined depending on the amount of graphene oxide and that of the active material; the binder is added so that the weight ratio of the binder to the paste is higher than or equal to 1 wt % and lower than or equal to 5 wt %. The binder is added while the graphene oxide is uniformly dispersed to be in surface contact with a plurality of the active material particles, so that the active material particles and the graphene oxide can be bound to each other with the graphene oxide kept dispersed. Although the binder is not necessarily added depending on the proportions of the active material and the graphene oxide, adding the binder can enhance the strength of the electrode.

Next, the solvent is added to the mixture until the mixture has a predetermined degree of viscosity and kneading is performed, whereby the paste can be formed. Through the above steps, the paste in which the graphene oxide, the active material, the conductive additive, and the binder are uniformly mixed can be formed.

Then, the electrode mixture paste is applied to one or both surfaces of the current collector as shown in Step S102 in FIG. 3. For example, a coating method such as a roll coating method using an applicator roll or the like, a screen printing method, a doctor blade method, a spin coating method, or a bar coating method can be employed. The thickness of the electrode mixture paste to be applied is adjusted in accordance with the desired loading of the active material in the electrode.

Here, an undercoat may be formed over the current collector. Note that the undercoat is a coating layer provided to reduce contact resistance or to improve adhesion between the current collector and the active material layer. Examples of the undercoat include a carbon layer, a metal layer, a layer containing carbon and a high molecular compound, and a layer containing metal and a high molecular compound. Forming the undercoat over the current collector can reduce the contact resistance between the current collector and the active material layer formed later, and/or can increase adhesion between the active material layer and the current collector. In addition, the adhesion between the current collector and the active material layer can be increased. In the case of using graphene as the conductive additive, the undercoat is preferably not dissolved in a reducing solution in the process of reducing graphene oxide.

As the undercoat, for example, an aqueous solution in which graphite, acetylene black, and the like are dispersed or the aqueous solution into which a high molecular compound is mixed can be used. Examples of the undercoat include a mixture of graphite and sodium polyacrylate (PAA) and a mixture of AB and PVdF. The weight ratio of black lead to PAA is preferably in a range of 95:5 to 50:50, and the weight ratio of AB to PVdF is preferably in a range of 70:30 to 50:50.

Note that if there is no problem with the adhesion between the current collector and the active material layer, the electrode strength, and the contact resistance, it is not necessary to apply the undercoat to the current collector.

Next, the solvent contained in the electrode mixture paste provided on the current collector is vaporized by a method such as ventilation drying or reduced pressure (vacuum) drying to form the active material layer in Step S103. The vaporization is preferably performed using a hot wind with a temperature higher than or equal to 50° C. and lower than or equal to 180° C. Note that there is no particular limitation on the atmosphere.

The active material layer may be pressed by a compression method such as a roll press method or a flat plate press method to increase the density of the active material layer. When the pressing is performed while being heated at higher than or equal to 90° C. and lower than or equal to 180° C., preferably lower than or equal to 120° C., the binder (e.g., PVdF) contained in the undercoat or the active material layer is softened to such an extent that the characteristics of the electrode are not changed, further increasing the adhesion between the current collector and the active material layer.

Next, in Step S104, the active material layer is impregnated with alcohol. To impregnate the active material layer with alcohol, the current collector, together with the active material layer, may be soaked in the liquid or a surface of the active material layer may be sprayed with alcohol. The liquid is preferably at a temperature higher than or equal to the melting point of alcohol and lower than or equal to the boiling point thereof, more preferably higher than or equal to 40° C. and lower than or equal to 70° C. Time for the soak is preferably longer than or equal to 1 minute and shorter than or equal to 2 hours, more preferably longer than or equal to 30 minutes and shorter than or equal to 1 hour.

Examples of alcohol include methanol, ethanol, 1-propanol, 2-propanol, 1-butanol, 2-butanol, isobutyl alcohol, and tert-butyl alcohol. Alcohol with a low boiling point is preferable because it is easily removed by vaporization. Alcohol having a high reducing property is also preferable because the graphene oxide can be easily reduced. Thus, ethanol, 1-propanol, 1-butanol, or the like is preferably used.

A mixed solution containing alcohol and water, a stabilizer, or the like can be used as the liquid with which the active material layer is impregnated. The liquid may be a mixed solution of two or more kinds of alcohol or a mixed solution containing an organic solvent other than alcohol.

If the active material layer is soaked in a solution containing a reducing agent (also referred to as a reducing solution) in this step, the graphene oxide can be reduced.

Note that in the case where the graphene oxide is reduced using the reducing solution, the active material layer might be unintentionally damaged. For example, the reducing agent might react with a material other than the graphene oxide in the active material layer, or a compound that is formed as a result of the reduction of the solvent by the reducing agent might react with a material contained in the active material layer.

In the case of using the reducing solution, the solution becomes acidic or basic depending on the property of the reducing agent. Thus, a pH adjuster needs to be added to adjust the pH of the solution, in which case a process becomes complicated. In some cases, it is difficult to keep the pH of the solution constant. When the pH of the solution cannot be kept constant, a material contained in the active material layer might be damaged. For example, in the case of using an acidic reducing solution, the active material layer is likely to be damaged when it contains a material unstable to acid or a material that easily reacts with acid. In the case of using a basic reducing solution, for example, the active material layer is likely to be damaged when it contains a material unstable to a base or a material that easily reacts with a base. In addition, the use of the above-described strong reducing agent might cause an unexpected reaction or damage in the active material layer. Note that examples of an active material unstable to acid include a positive electrode active material, and examples of a binder that easily reacts with a base include PVdF.

When the active material layer is soaked in the reducing solution, the binder contained in the active material layer absorbs the solvent, resulting in expansion or deformation. A reducing solution whose solvent is water is easily absorbed by the binder because the water molecules are small. A reducing solution whose solvent is an aprotic polar solvent such as NMP is easily absorbed by the binder such as PVdF because of its high affinity for the binder. Thus, the expansion or deformation of the binder is significant when the solvent of the reducing solution is water, NMP or the like. The expansion or deformation of the hinder might cause cut or breakage of the network by the binder that binds the active material and the graphene oxide in the active material layer. In that case, the active material layer might expand as the binder expands or changes its shape. The reduction of the graphene oxide in the expanded active material layer makes it difficult to construct a three-dimensional electric conduction network in the active material layer in some cases. Even when a three-dimensional electric conduction network is constructed in the active material layer despite the reduction of the graphene oxide in the swelled active material layer, the active material layer shrinks in the subsequent step for evaporating the solvent, in which case the electric conduction network might be damaged.

When the active material layer damaged by the above factors is soaked in the electrolyte solution or the like, the active material layer expands or changes its shape and the electric conduction network constructed in the active material layer is easily cut.

In view of the above, in one embodiment of the present invention, the active material layer is impregnated with alcohol in Step S104 and then the graphene oxide is reduced by heating the active material layer in Step S105 described later; thus, the active material layer does not need to be soaked in the reducing solution. Alcohol can promote the reduction of graphene oxide, which is easily reduced; on the other hand, alcohol is less likely to promote the reduction of a material for the active material, the binder, or the like or to react with the material, for example. Accordingly, the active material layer is less likely to be damaged. Furthermore, since alcohol is neutral, the active material layer is less likely to be damaged even when the active material layer contains a material unstable to acid or a base or a material that easily reacts with acid or a base. In addition, the liquid containing alcohol does not require the pH adjustment or the like; thus, Step S104 is simple.

The binder is less likely to absorb alcohol, or less likely to expand even when absorbing alcohol. Accordingly, the expansion of the binder due to absorption of a solvent can be prevented. As a result, the network constructed by the binder can be prevented from being cut or broken before the reduction of the graphene oxide. In addition, the active material layer can be prevented from expanding or contracting. Accordingly, the three-dimensional electric conduction network constructed by graphene can be prevented from being broken by the expansion or contraction of the active material layer.

Next, in Step s105, excess alcohol with which the active material layer is impregnated in Step s104 is removed by heat treatment. The heat treatment is preferably performed under a reduced pressure (in vacuum) or in a reducing atmosphere at a temperature higher than or equal to 50° C. and lower than or equal to 300° C. for longer than or equal to 1 hour and shorter than or equal to 48 hours. The heat treatment allows efficient evaporation or vaporization of the polar solvent and moisture in the active material layer.

Furthermore, the graphene oxide is reduced by the heat treatment. The t collector as well as the active material layer may be heated at this time. Since remaining alcohol promotes the reduction of the graphene oxide by heating in this step, the reduction efficiency of the graphene oxide can be increased. As a result, an electrode having low internal resistance can be fabricated.

As described in this embodiment, one embodiment of the present invention allows the reduction of the graphene oxide without soaking the active material layer in the reducing solution. In other words, the graphene oxide can be reduced under mild reaction conditions. Accordingly, damage to the active material layer due to the reduction reaction can be reduced. As a result, an electrode in which electric conduction paths are less likely to be cut even when soaked in an electrolyte solution can be fabricated. In addition, since alcohol promotes the reduction of the graphene oxide by heat, the reduction efficiency of the graphene oxide by heat can be increased. As a result, an electrode having low internal resistance can be fabricated. Thus, when a storage battery is fabricated using the manufacturing method of an electrode described in this embodiment, the cycle performance of the storage battery can be improved. Furthermore, the rate characteristics of the storage battery can be improved.

In one embodiment of the present invention, a cleavable active material, such as the lithium-manganese composite oxide having a layered rock-salt crystal structure, which is the active material used in this embodiment, is covered with graphene in the aforementioned manner, and cleavage due to pressure is inhibited. However, when pressure is applied to the electrode mixture paste or the electrode in a formation process of the electrode (e.g., in Step S101 or in Step S102), the active material might be further cracked because the active material or the active material layer are pressurized. Furthermore, when the active material is pressurized, the reduced graphene oxide covering the surface of the active material in formation of particles of the active material might be separated from the surface of the active material.

Such cleavage and cracking of primary particles of the active material and separation of the graphene covering the surface of the active material result in a decrease in the discharge capacity of the battery and a decrease in the cycle performance of the battery.

In this embodiment, graphene oxide is added in formation of the electrode mixture paste in Step S101, whereby the surface of the active material not covered with the reduced graphene oxide formed in the step in FIG. 1 (e.g., the cracked portion of the active material or a portion of the surface of the active material from which the reduced graphene oxide is separated) can be covered with the graphene oxide. Furthermore, reducing the graphene oxide in Step S105 allows the surface of the active material to be covered with newly formed reduced graphene oxide. In this manner, coverage of the surface of the active material with reduced graphene oxide can be increased. This can inhibit a decrease in the voltage of the battery and a decrease in the discharge capacity of the battery. Furthermore, the charge-discharge cycle performance of the battery can be improved. In this embodiment, reduced graphene oxide covering the active material can be either a single layer or a stack including two or more and 100 or less layers. In addition, the surface of the active material needs to be covered with and in contact with at least part of the reduced graphene oxide formed in Step S105, and the reduced graphene oxide may partly overlap with the reduced graphene oxide formed in the step in FIG. 1.

Reduced graphene oxide has an excellent electrical characteristic of high conductivity and excellent physical properties of high flexibility and high mechanical strength. For this reason, in a battery including the electrode, the lithium-manganese composite oxide can be prevented from being further cleaved and cracked because of the volume change even when the lithium-manganese composite oxide repeats expansion and contraction accompanying repeated charge and discharge of the battery.

In addition, pressure applied to the active material can be alleviated owing to the mechanical strength of the reduced graphene oxide. This can inhibit further cleavage and cracking of the cleavable lithium-manganese composite oxide.

Moreover, even eaten a great stress is caused at the time of winding an electrode of a wound battery or even when an outward stress from an axis of winding is applied to an electrode all the time in the case where a wound body of the electrode is housed in a housing, further cleavage and cracking of the lithium-manganese composite oxide can be inhibited.

Here, in the case where an electrode is fabricated using the "particle containing the lithium-manganese composite oxide" of one embodiment of the present invention and a storage battery is fabricated using the electrode, the first to third regions included in the "particle containing the lithium-manganese composite oxide" are formed in either the formation process of the "particle containing the lithium-manganese composite oxide" or the fabrication process of the storage battery.

Note that the first to third regions in the "particle containing the lithium-manganese composite oxide" may be formed before the formation of the electrode, e.g., after the synthesis of the particle. Alternatively, the first to third regions may be formed in forming the electrode. The thickness, the composition, the crystal structure, and the like of the first to third regions which are formed after the synthesis of the particle, for example, may be changed in the formation of the electrode. The first to third regions may be formed in heat treatment any of steps in a process for fabricating the storage battery or the like.

Furthermore, by the heat treatment, are element included in the binder reacts with a particle containing the lithium-manganese composite oxide in some cases. For example, the case where PVdF is used as the binder is described. PVdF is a high molecular compound containing fluorine. The use of the high molecular compound containing fluorine as the binder causes a bond between a material of the electrode other than the binder, e.g., the active material, the conductive additive, and the current collector, and fluorine in some cases. Here, "having a bond" refers to a state where a bond can be observed by XPS analysis or the like, or refers to including a material having the bond, for example. Examples of such a material having a bond include metal fluoride. In some cases, metal fluoride is formed using lithium, manganese, and the element M, which are metals included in the lithium-manganese composite oxide of one embodiment of the present invention, for example. A bond with a metal used in the current collector can be formed.

An element contained in the coating layer of the lithium-manganese composite oxide and fluorine may form a bond. In the case where the coating layer is the layer containing carbon, a compound containing fluorine and carbon may be formed. Here, the coating layer may correspond to the third region included in the "particle containing the lithium-manganese composite oxide" or include the third region and part of the lithium manganese composite oxide. The second region included in the "particle containing the lithium-manganese composite oxide" may include part of the coating layer, for example.

The formation of such a bond cats further increase the strength of the electrode in some cases, for example. When the bond is formed in advance, for example, an irreversible reaction after fabrication of the storage battery can be inhibited in some cases.

The temperature of the heat treatment which is suitable for the bond formation is preferably higher than or equal to 120° C., more preferably higher than or equal to 160° C., much more preferably higher than or equal to 200° C., still much more preferably higher than or equal to 250° C.

A gas such as oxygen, air, nitrogen, or a rare gas can be used as an atmosphere of the heat treatment. The heat treatment may be performed under an atmospheric pressure or a reduced pressure. For example, in the case where a gas containing oxygen is used, a reaction between materials of the electrode, such as the particle containing the lithium-manganese composite oxide and the binder, can be promoted. Here, "a reaction with the binder is promoted" means that, for example, a bond between an element in the binder and an element in the particle containing the lithium-manganese composite oxide is observed by XP S analysis or the like. In the case where an inert gas such as nitrogen or a rare gas is used, a change in the quality of materials of the electrode, such as the current collector, can be inhibited in some cases. In the case where the heat treatment is performed under a reduced pressure, a change in the quality of materials of the electrode, such as the current collector, can be inhibited in some cases.

When the temperature of the heat treatment is too high, a material of the electrode might be decomposed, for example. For example, a decomposition reaction might occur in the particle containing the lithium-manganese composite oxide. If such a particle is used in a storage battery, the capacity of the storage battery might be reduced. Therefore, the heat treatment temperature is preferably lower than or equal to 600° C., more preferably lower than or equal to 500° C., much more preferably lower than or equal to 400° C.

The current collector over which the active material layer is formed may be further pressed. Thus, the adhesion between the current collector and the active material layer can be increased. In addition, the density of the active material layer can be increased. Further, by applying heat at higher than or equal to 90° C., and lower than or equal to 180° C., preferably lower than or equal to 120° C. when the pressing is performed, the binder (es., PVdF) contained in the undercoat or the active material layer is softened to the extent that the characteristics of the electrode are not changed; thus, the adhesion between the current collector and the active material layer is further increased.

Lastly, the current collector and the active material layer are stamped to have a predetermined size, whereby the electrode is fabricated.

<Structure of Electrode>

Next, an electrode using the particle of one embodiment of the present invention will be described.

Figure 4A:
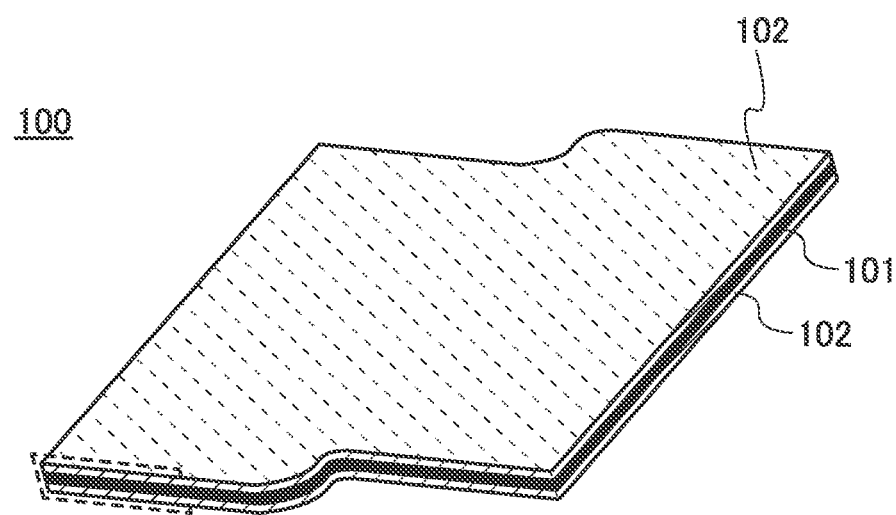
FIGS. 4A and 4B are schematic views illustrating an electrode.
Figure 4B:
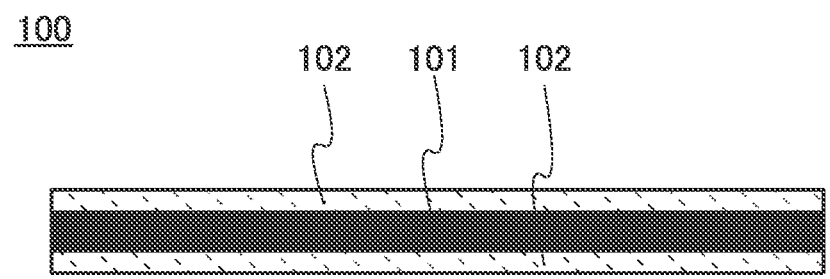

FIG. 4A is an overhead view of an electrode 100, and FIG. 4B is a cross-sectional view of a portion surrounded by a broken line in FIG. 4A. The electrode 100 has a structure in which an active material layer 102 is provided over a current collector 101 Although the active material layers 102 are provided such that the current collector 101 is sandwiched therebetween in FIG. 4A, the active material layer 102 may be formed over only one surface of the current collector 101.

There is no particular limitation on the current collector 101 as long as it has high conductivity without causing a significant chemical change in a power storage device. For example, the current collector 101 can be formed using a metal such as stainless steel, gold, platinum, zinc, iron, nickel, copper, aluminum, titanium, tantalum, or manganese, an alloy thereof, sintered carbon, or the like. Alternatively, copper or stainless steel that is coated with carbon, nickel, titanium, or the like can be used. Alternatively, the current collector 101 can be formed using an aluminum alloy to which an element that improves heat resistance, such as silicon, neodymium, scandium, or molybdenum, is added. Still alternatively, a metal element that forms silicide by reacting with silicon can be used. Examples of the metal element that forms silicide by reacting with silicon include zirconium, titanium, hafnium, vanadium, niobium, tantalum, chromium, molybdenum, tungsten, cobalt, nickel, and the like. The current collector 101 can have any of various shapes including a foil-like shape, a plate-like shape (sheet-like shape), a net-like shape, a cylindrical shape, a coil shape, a punching-metal shape, an expanded-metal shape, a porous shape, and a shape of non-woven fabric as appropriate. The current collector 101 may be formed to have micro irregularities on the surface thereof in order to enhance adhesion to the active material layer, for example. The current collector 101 preferably has a thickness of 5 μm to 30 μm inclusive.

The active material layer 102 includes an active material. An active material refers only to a material that relates to insertion and extraction of ions serving as carriers. In this specification and the like, a layer including the active material is referred to as an active material layer. The active material layer may include a conductive additive and a binder in addition to the active material.

In the case where the active material is a negative electrode active material, for example, a carbon-based material, an alloy-based material, or the like can be used.

Examples of the carbon-based material include graphite, graphitizing carbon (soft carbon), non-graphitizing carbon (hard carbon), a carbon nanotube, graphene, and carbon black.

Examples of the graphite include artificial graphite such as meso-carbon microbeads (MCAB), coke-based artificial graphite, or pitch-based artificial graphite and natural graphite such as spherical natural graphite.

Graphite has a low potential substantially equal to that of a lithium metal (higher than or equal to 0.1 V and lower than or equal to 0.3 V vs. Li/Li$^+$) when lithium ions are intercalated into the graphite (while a lithium-graphite intercalation compound is formed). For this reason, a lithium-ion storage battery can have a high operating voltage. Furthermore, graphite is preferred because of its advantages, such as relatively high capacity per unit volume, small volume expansion, low cost, and safety greater than that of a lithium metal.

For the negative electrode active material, an alloying material can be used. Here, as the alloying material, a material which enables charge and discharge reactions by being alloyed with a metal that serves as a carrier ion can be used. A material containing at least one of Ga, Si, Al, Si, Ge, SD, Pb, Sb, Bi, Ag, Zn, Cd, In, and the like can be used, for example. Such elements have higher capacity than carbon. In particular, silicon has a significantly high theoretical capacity of 4200 mAh/g, and therefore, the capacity of the power storage device can be increased. Examples of an alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

It is particularly preferable to use, as the negative electrode active material, a material containing silicon, such as silicon or SiO, to increase the capacity of the power storage device.

Still alternatively, for the negative electrode active materials, $Li_{3-x}M_xN$ (M=CO, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/$cm^3$).

A nitride containing lithium and a transition metal is preferably used, in which case lithium ions are contained in the negative electrode active materials and thus the negative electrode active materials can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used for the negative electrode active materials; for example, a transition metal oxide which is not alloyed with lithium, such as cobalt oxide (CoO), nickel oxide (NiO), (and iron oxide (FeO), may be used. Other examples of the material which causes a conversion reaction include oxides such as $Fe_2O$, CuO, $Cu_2O$, $RuO_2$, and $Cr_2O_3$, sulfides such as $CoS_{0.89}$, NiS, and CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the active material is a positive electrode active material, a material into and from which lithium ions can be inserted and extracted can be used as the positive electrode active material; for example, a material having an olivine crystal structure, a layered rock-salt crystal structure, a spinel crystal structure, or a NASICON crystal structure, or the like can be used.

Although the case of using the particle containing the lithium-manganese composite oxide as the positive electrode active material is described in this embodiment, a different active material may be used. Examples of the different active material include compounds such as $LiFeO_2$, $LiCoO_2$, $LiNiO_2$, $LiMn_2O_4$, $V_2O_5$, $Cr_2O_5$, and $MaO_2$.

Alternatively, lithium-contai.ninng complex phosphate ($LiMPO_4$ (general formula) (M is one or more of Fe(II), Mn(II), Co(II), and Ni(II))) can be used. Typical examples are lithium metal phosphate compounds such as $LiFePO_4$, $LiNiPO_4$, $CoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, lithium-containing complex silicate such as $Li_{(2-j)}MSiO_4$ (general formula) (M is one or more of Fe(II), Mn(II), Co(II), and Ni(II);0≤j≤2) may be used. Typical examples are lithium silicate compounds such as $Li_{(2-j)}FeSiO_4$, $Li_{(2-j)}CoSiO_4$, $Li_{(2-j)}FMnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l≤1), $Li_{(2-j)}Fe_mN i_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a NASICON compound expressed by $A_xM_2(XO_4)_3$ (general formula) (A=Li, Na, or Mg, M=Fe, Mn, Ti, P,Nb, or Al, X=S, P, Mo, W, As, or Si) can be used for the positive electrode active material. Examples of the NASICON compound are $Fe_2(MnO_4)_3$, $Fe_2(SO_4)_3$, and $Li_3Fe_2(PO_4)_3$, Further alternatively, a compound expressed by $Li_2MPO_4F$, $Li_2MP_2O_7$, or $Li_5MO_4$ (general formula) (M=Fe or Mn), a perovskite fluoride such as $FeF_3$, a metal chalcogenide (a sulfide, a selenide, or a telluride) such as $TiS_2$ and $MoS_2$, a material with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a compound containing carriers such as an alkali metal (e.g., sodium and potassium) or an alkaline-earth metal (e.g., calcium, strontium, barium, beryllium, and magnesium) instead of lithium of the lithium compound, the lithium-containing complex phosphate, or the lithium-containing complex silicate may be used as the positive electrode active material.

The average particle size of the positive electrode active material is preferably, for example, greater than or equal to 5 Erin and less than or equal to 50 μm The active material layer 102 may include a conductive additive. As the conductive additive, a material which is itself an electron conductor and does not cause a chemical reaction with other materials in a battery device may be used. Examples of the conductive additive include natural graphite, artificial graphite such as mesocarbon microbeads, and carbon fiber. Examples of carbon fiber include mesophase pitch-based carbon fiber, isotropic pitch based carbon fiber, carbon nanofiber, and carbon nanotube. Carbon nanotube can be formed by, for example, a vapor-grown carbon fiber (VGCF (registered trademark)). Other examples of the conductive additive include carbon materials such as carbon black (e.g., acetylene black (AB)), graphite (black lead) particles, fullerene, and graphene. Alternatively, metal powder or metal fibers of copper, nickel, aluminum, silver, gold, or the like, a conductive ceramic material, or the like can be used. In this embodiment, acetylene black (AB) is used, for example.

Flaky graphene has an excellent electrical characteristic of high conductivity and excellent physical properties of high flexibility and high mechanical strength. Thus, the use of graphene as the conductive additive can increase electrical conductivity between the active materials or between the active material and the current collector.

Alternatively, reduced graphene oxide obtained by reducing graphene crude can be used as the conductive additive. For example, an active material layer in which graphene oxide is dispersed is subjected to heat treatment, whereby the graphene oxide is reduced to form reduced graphene oxide. Reduced graphene oxide has a planar shape, thereby enabling surface contact. Furthermore, reduced graphene oxide may have an excellent electrical characteristic of high conductivity and excellent physical properties of high flexibility and high mechanical strength. Thus, the use of reduced graphene oxide as the conductive additive can increase electrical conductivity between the active materials or between the active material and the current collector.

The active material layer 102 preferably includes a binder, more preferably a binder that contains a water-soluble high molecular compound. The active material layer 102 may include a plurality of kinds of binders.

As the binder, a material such as PVdF, polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, or polyacrylonitrile (PAN) is preferably used.

As the binder, a rubber material such as styrene-butadiene rubber (SBR), styrene-isoprene-styrene rubber, acrylonitrile-butadiene rubber, butadiene rubber, fluororubber, or ethylene-propylene-diene copolymer can be used. Any of these rubber materials is preferably used in combination with the water-soluble high molecular compound. Since these rubber materials have rubber elasticity and easily expand and contract, it is possible to obtain a highly reliable electrode that is resistant to stress due to expansion and contraction of an active material by charging and discharging, bending of the electrode, or the like. On the other hand, the rubber materials have a hydrophobic group and thus are unlikely to be soluble in water in some cases. In such a case, particles are dispersed in an aqueous solution without being dissolved in water, so that increasing the viscosity of a composition containing a solvent used for the formation of the active material layer 102 (also referred to as an electrode mixture paste) up to the viscosity suitable for application might be difficult. A water-soluble high molecular compound having excellent viscosity modifying properties, such as a polysaccharide, can moderately increase the viscosity of the solution and can be uniformly dispersed together with a rubber material. Thus, a favorable electrode with high uniformity (e.g., an electrode with uniform electrode thickness or electrode resistance) can be obtained.

A single binder may be used or two or more kinds of binders may be used in combination.

Note that one embodiment of the present invention is not d thereto. Although an example of application to a lithium-ion storage battery is described as one embodiment of the present invention, one embodiment of the present invention is not limited to this example. One embodiment of the present invention can be used for a variety of storage batteries such as a lead storage battery, a lithium-ion polymer storage battery, a nickel-hydrogen storage battery, a nickel-cadmium storage battery, a nickel-iron storage battery, a nickel-zinc storage battery, and a silver oxide-zinc storage battery, a solid-state battery, an air battery, a primary battery, and capacitors such as an electric double layer capacitor, an ultracapacitor, a supercapacitor, and a lithium-ion capacitor. In one embodiment of the present invention, graphene or reduced graphene oxide may be used for the following components: an electrode for a supercapacitor that has extremely high capacitance; an oxygen-reduction electrode catalyst; a material of a dispersion liquid with lower friction than a lubricant; a transparent electrode for a display device or a solar cell; a gas-barrier material; a polymer material with high mechanical strength and lightweight; a material for a sensitive nanosensor for sensing uranium or plutonium contained in radiation-tainted water; and a material used for removing a radioactive material.

This embodiment can be implemented in appropriate combination with any of the structures described in the other embodiments.

Embodiment 2

Described in this embodiment will be an example of a power storage device using the electrode of one embodiment of the present invention.

Note that the power storage device in this specification and the like indicates all elements and devices that have the function of storing electric power. For example, a storage battery such as a lithium-ion secondary battery, a lithium-ion capacitor, and an electric double layer capacitor are included in the category of the power storage device.

<Thin Storage Battery>

[Thin Storage Battery 1]

Figure 5:
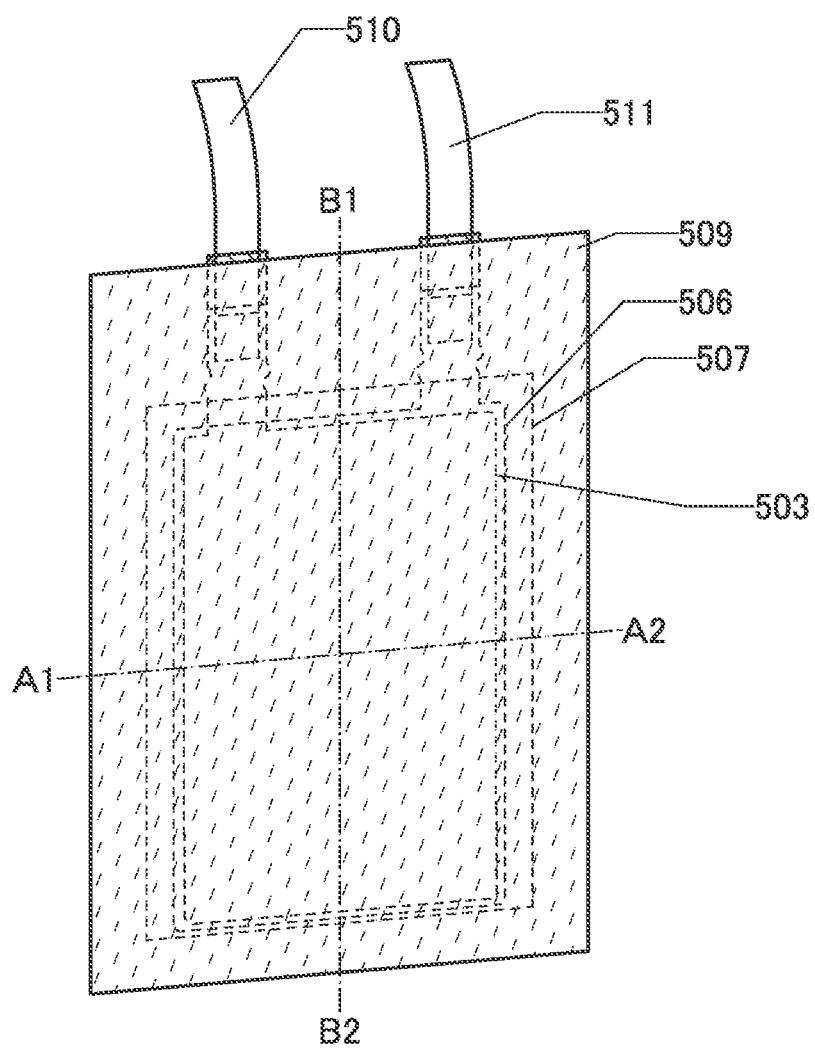
FIG. 5 illustrates a thin storage battery.

FIG. 5 illustrates a thin storage battery as an example of a storage device. FIG. 5 illustrates an example of a thin storage battery. When a flexible thin storage battery is used in an electronic device at least part of which is flexible, the storage battery can be bent as the electronic device is bent.

Figure 6A:
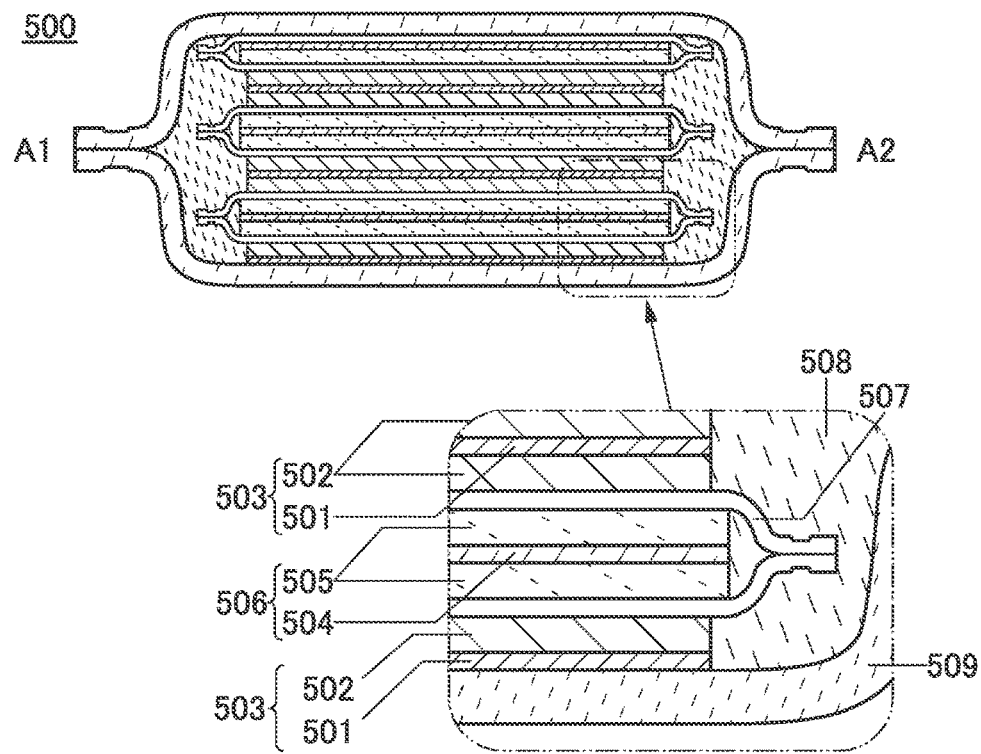
FIGS. 6A and 6B are each a cross-sectional view of an electrode.

FIG. 5 is an external view of a thin storage battery 500. FIG. 6A is a cross-sectional view along dashed-dotted line A1-A2 in FIG. 5, and FIG. 68 is a cross-sectional view along dashed-dotted line B1-B2 in FIG. 5. The thin storage battery 500 includes a positive electrode 503 including a positive electrode current collector 501 and a positive electrode active material layer 502, a negative electrode 506 including a negative electrode current collector 504 and a negative electrode active material layer 505, a separator 507, an electrolytic solution 508, and an exterior body 509. The separator 507 is provided between the positive electrode 503 and the negative electrode 506 that are provided in a region surrounded by the exterior body 509. The region surrounded by the exterior body 509 is filled with the electrolytic solution 508.

As at least one of the positive electrode 503 and the negative electrode 506, the electrode of one embodiment of the present invention is used. The electrode of one embodiment of the present invention may be used as each of the positive electrode 503 and the negative electrode 506.

First, the structure of the positive electrode 503 will be described. The electrode of one embodiment of the present invention is preferably used as the positive electrode 503. Here, an example of using the electrode 100 described in Embodiment 1 as the positive electrode 503 will be described.

As a solvent of the electrolytic solution 508, an aprotic organic solvent is preferably used. For example, one of ethylene carbonate (EC), propylene carbonate (PC), butylene carbonate, chloroethylene carbonate, vinylene carbonate (VC), γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a high-molecular material that undergoes gelation is used as a solvent of the electrolytic solution, safety against liquid leakage and the like is improved. Furthermore, a secondary battery can be thinner and more lightweight. Typical examples of the high-molecular material that undergoes gelation include a silicone gel, an acrylic gel, an acrylonitrile gel, a polyethylene oxide-based gel, a polypropylene oxide-based gel, a fluorine-based polymer gel, and the like.

Alternatively, the use of one or more kinds of ionic liquids (room temperature molten salts) which have features of non-flammability and non-volatility as a solvent of the electrolytic solution can prevent a power storage device from exploding or catching fire even when a power storage device internally shorts out or the internal temperature increases owing o overcharging or the like. An ionic liquid contains a cation and an anion. The ionic liquid of one embodiment of the present invention contains an organic cation and an anion. Examples of the organic cation used for the electrolytic solution include aliphatic onium cations such as a quaternary ammonium cation, a tertiary sulfonium cation, and a quaternary phosphonium cation, and aromatic cations such as an imidazolium cation and a pyridinium cation. Examples of the anion used for the electrolytic solution include a monovalent amide-based anion, a monovalent methide-based anion, a fluorosulfonate anion, a perfluoroalkylsulfonate anion, a tetrafluoroborate anion, a perfluoroalkylborate anion, a hexafluorophosphate anion, and a perfluoroalkylphosphate anion.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

The electrolytic solution used for a power storage device is preferably highly purified and contains a small amount of dust particles and elements other than the constituent elements of the electrolytic solution (hereinafter, also simply referred to as impurities). Specifically, the weight ratio of impurities to the electrolytic solution is less than or equal to 1%, preferably less than or equal to 0.1%, and more preferably less than or equal to 0.01%.

Furthermore, an additive agent such as vinylene carbonate (VC), propane sultone (PS), tert-butylbenzene (TBB), fluoroethylene carbonate (FEC), or lithium bis(oxalatoborate) (LiBOB) may be added to the electrolytic solution. The concentration of such an additive agent in the whole solvent is, for example, higher than or equal to 0.1 wt % and lower than or equal to 5 wt %.

Alternatively, a polymer gelled electrolyte obtained in such a manner that a polymer is swelled with an electrolytic solution may be used.

Examples of host polymers include a polymer having a polyalkylene oxide structure, such as polyethylene oxide (PEO); PVdF; polyacrylonitrile; and a copolymer containing any of them. For example, PVdF-HFP, which is a copolymer of PVdF and hexafluoropropylene (HFP) can be used. The polymer may be porous.

Instead of the electrolytic solution, a solid electrolyte including an inorganic material such as a sulfide-based inorganic material or an oxide-based inorganic material, or a solid electrolyte including a macromolecular material such as a polyethylene oxide (PEO)-based macromolecular material may alternatively be used. When the solid electrolyte is used, a separator and a spacer are not necessary. Furthermore, the battery can be entirely solidified; therefore, there is no possibility of liquid leakage and thus the safety of the storage battery is dramatically increased.

As the separator 507, paper; nonwoven fabric; glass fiber; ceramics; synthetic fiber containing nylon (polyamide), vinylon (polyvinyl alcohol-based fiber), polyester, acrylic, polyolefin, or polyurethane; or the like can be used.

Figure 7A:
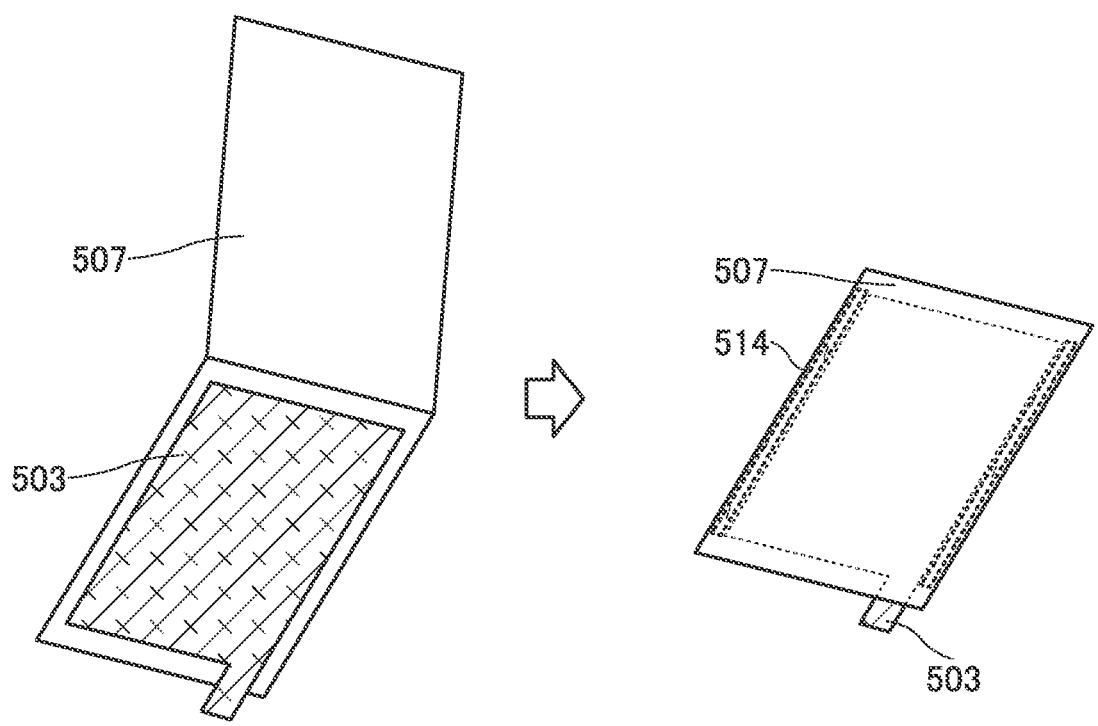
Figure 7B:
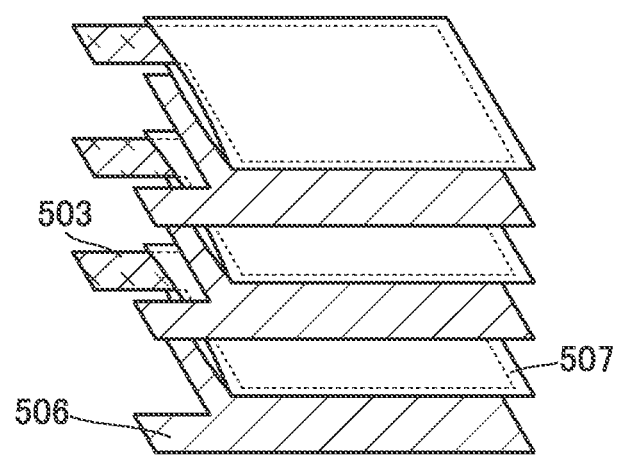

The separator 507 is preferably formed to have a bag-like shape to surround one of the positive electrode 503 and the negative electrode 506. For example, as illustrated in FIG. 7A, the separator 507 is folded in two so that the positive electrode 503 is sandwiched, and sealed with a sealing member 514 in a region outside the region overlapping with the positive electrode 503; thus, the positive electrode 503 can be reliably supported inside a portion enclosed by the separator 507 formed to have a bag-like shape. Then, as illustrated in FIG. 7B, the positive electrodes 503 wrapped by the separators 507 and the negative electrodes 506 are alternately stacked and provided inside the portion enclosed by the exterior body 509, whereby the thin storage battery 500 can be formed.

Described here is an example in which a particle containing the lithium-manganese composite oxide described in Embodiment 1 is used as the positive electrode active material, the electrode described in Embodiment 1 is used as the positive electrode 503, and an active material containing silicon is used as the negative electrode active material.

The capacity per unit weight and volume of the active material containing silicon, such as silicon or SiO, is high, and accordingly, the capacity per unit weight and volume of the storage battery can be increased.

In some cases, in charging and discharging of the storage battery, a decomposition reaction of the electrolytic solution occurs as well as intercalation and deintercalation of carrier ions. The decomposition reaction occurs also in the positive electrode and the negative electrode in some cases. In particular, in the negative electrode, the electrolytic solution does not have tolerance to a low potential of its battery reaction and is decomposed in many cases. Such a decomposition reaction is an irreversible reaction in many cases and thus might lead to the low charge and discharge efficiency and the loss of the capacity of the power storage device.

In view of such a case, an irreversible reaction is caused in advance in a battery including the negative electrode 506 or the positive electrode 503, a counter electrode, and an electrolytic solution, and then, the negative electrode 506 or the positive electrode 503 is taken out of the battery and used for fabricating a storage battery. The storage battery fabricated in this manner is preferable because a decrease in the capacity of the storage battery due to an irreversible reaction can be inhibited. As the counter electrode, a material containing carrier ions may be used. For example, metal containing carrier ions and a compound containing carrier ions can be used. Examples of the metal containing carrier ions include lithium. Examples of the compound containing carrier ions include the materials given as the positive electrode active material and the negative electrode active material in Embodiment 1.

Next, aging after fabrication of a storage battery will be described. Aging is preferably performed after fabrication of a storage battery. The aging can be performed under the following conditions, for example. Charge is performed at a rate of 0.001 C or more and 0.2 C or less at a temperature higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased. Furthermore, the particle containing the lithium-manganese composite oxide of one embodiment of the present invention has a high reaction potential when used as the positive electrode active material. The high reaction potential of the positive electrode active material is preferable, because the voltage of the storage battery can be increased and the energy density of the storage battery can be increased.

In some cases, the electrolytic solution does not have tolerance to such a high reaction potential. In some cases, for example, the electrolytic solution is decomposed on the surface of the positive electrode to generate gas. In such cases, the gas is preferably released.

An excessive increase in the resistance decreases the potential of the negative electrode, resulting in lithium intercalation into graphite and lithium deposition on the surface of graphite. The lithium deposition might reduce capacity. For example, if a coating film or the like is grown on the surface after lithium deposition, lithium deposited on the surface cannot be dissolved again. Thus, the amount of lithium which does not contribute to capacity is increased. In addition, when deposited lithium physically collapses and conduction with the electrode is lost, the lithium also cannot contribute to capacity. Therefore, the gas is preferably released before the potential of the negative electrode reaches the potential of lithium because of an increase in charging voltage.

Aging may be performed while pressing is performed. For example, after a thin storage battery is fabricated, charging and discharging may be performed while pressing is performed with a press machine.

The lithium-manganese composite oxide of one embodiment of the present invention is preferable because of having a high discharge capacity. Furthermore, the lithium-manganese composite oxide of one embodiment of the present invention has a high battery reaction potential and high energy density and is therefore preferable.

When an active material having a high battery reaction potential is used for the positive electrode of the storage battery, the electrolytic solution is easily decomposed in some cases. By the decomposition of the electrolytic solution, gas is generated in the vicinity of the surface of the positive electrode in some cases.

Performing aging while pressing is performed is preferable, in which case the generated gas can be released to a region except a region subjected to the pressing, e.g., a peripheral portion of storage battery.

Here, pressing may be performed while heating is performed, for example. Pressing may be performed before and after aging, but performing aging while pressing is performed is more preferable.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, longer than or equal to 1 hour and shorter than or equal to 100 hours. In the initial charge, an electrolytic solution decomposed on the surface forms a coating film on the surface of graphite. The formed coating film may thus be densified when the charging state is held at a temperature higher than room temperature after the release of the gas, for example.

Figure 8A:
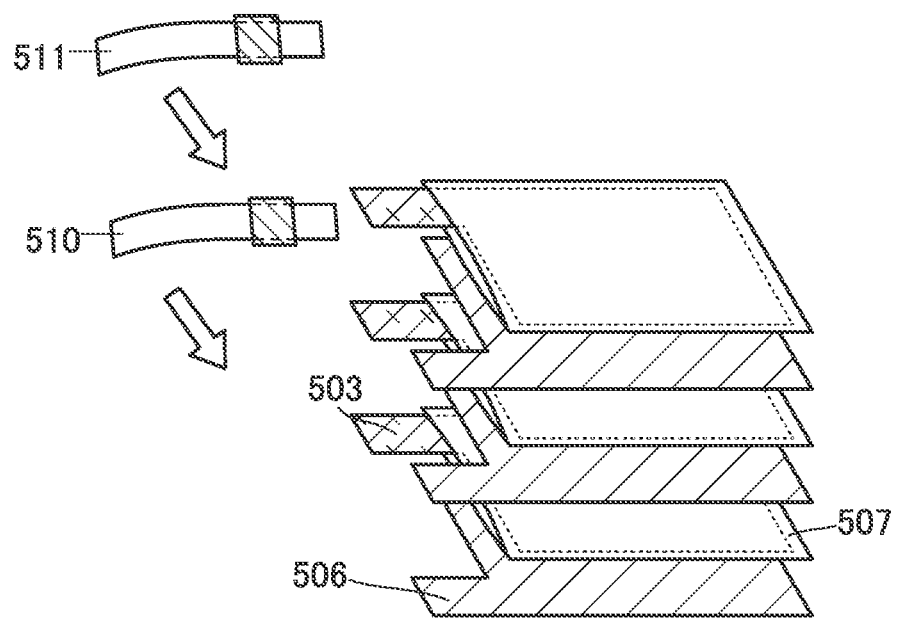
Figure 8B:
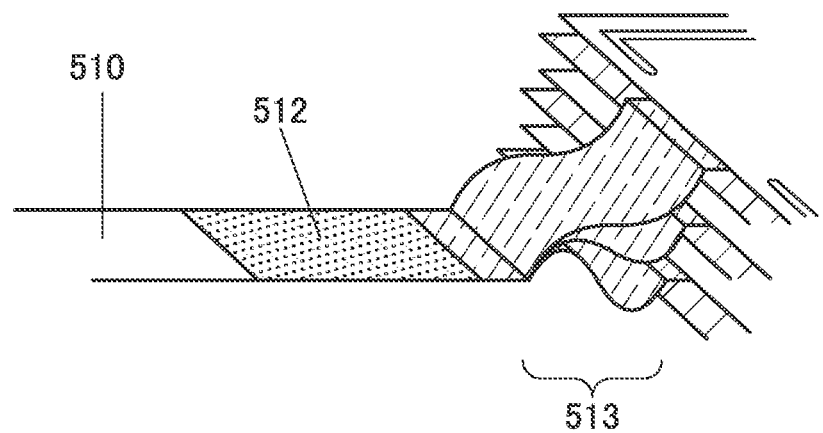

As shown in FIG. 8A, the positive electrode current collectors in the positive electrodes 503 are welded to the positive electrode lead electrode 510 in a welding region 512 by ultrasonic welding or the like. The negative electrode current collectors in the negative electrodes 506 are welded to the negative electrode lead electrode 511. FIG. 8B illustrates an example in which current collectors are welded to the positive electrode lead electrode 510. The positive electrode current collector includes a bent portion 513 as illustrated in FIG. 8B, and it is therefore possible to relieve stress due to external force applied after fabrication of the storage battery 500. Thus, the storage battery 500 can have high reliability.

Figure 6B:
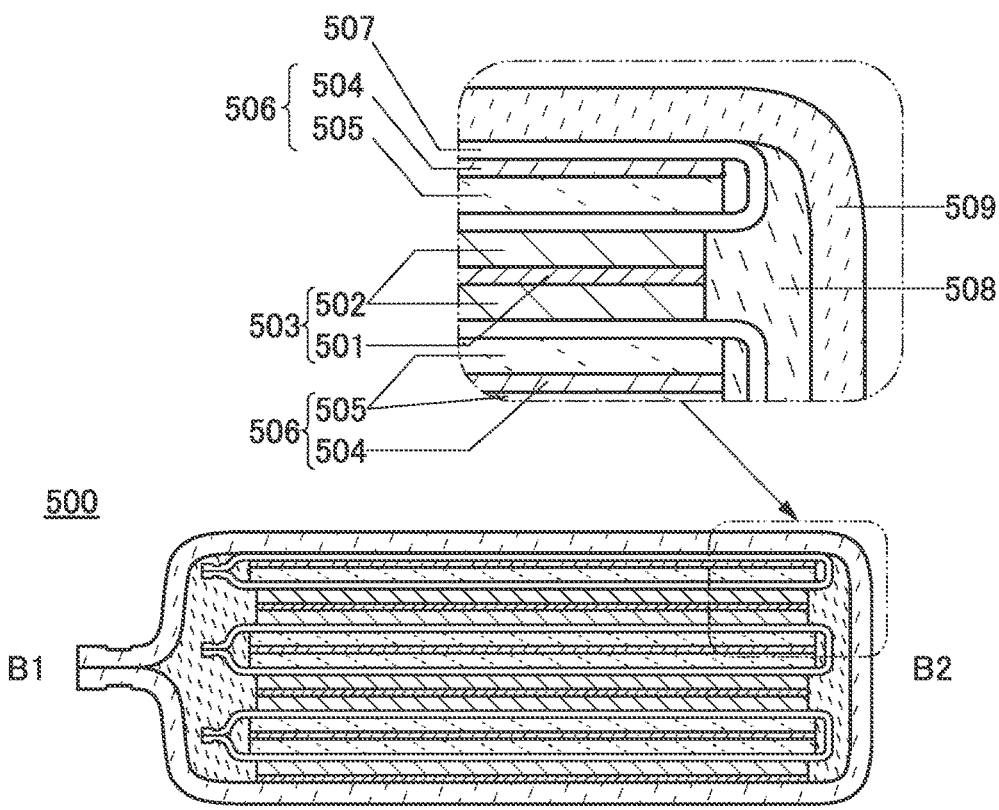

In the thin storage battery 500 shown in FIG. 5 and FIGS. 6A and 6B, the positive electrode lead electrode 510 and a negative electrode lead electrode 511 are welded to the positive electrode current collectors 501 in the positive electrodes 503 and the negative electrode current collectors 504 in the negative electrodes 506, respectively, by ultrasonic welding. The positive electrode current collector 501 and the negative electrode current collector 504 can double as terminals for electrical contact with the outside. In that case, lead electrodes are not used, and the positive electrode current collectors 501 and the negative electrode current collectors 504 may be arranged so that part of the positive electrode current collectors 501 and part of the negative electrode current collectors 504 are exposed to the outside of the exterior body 509.

Figure 9:
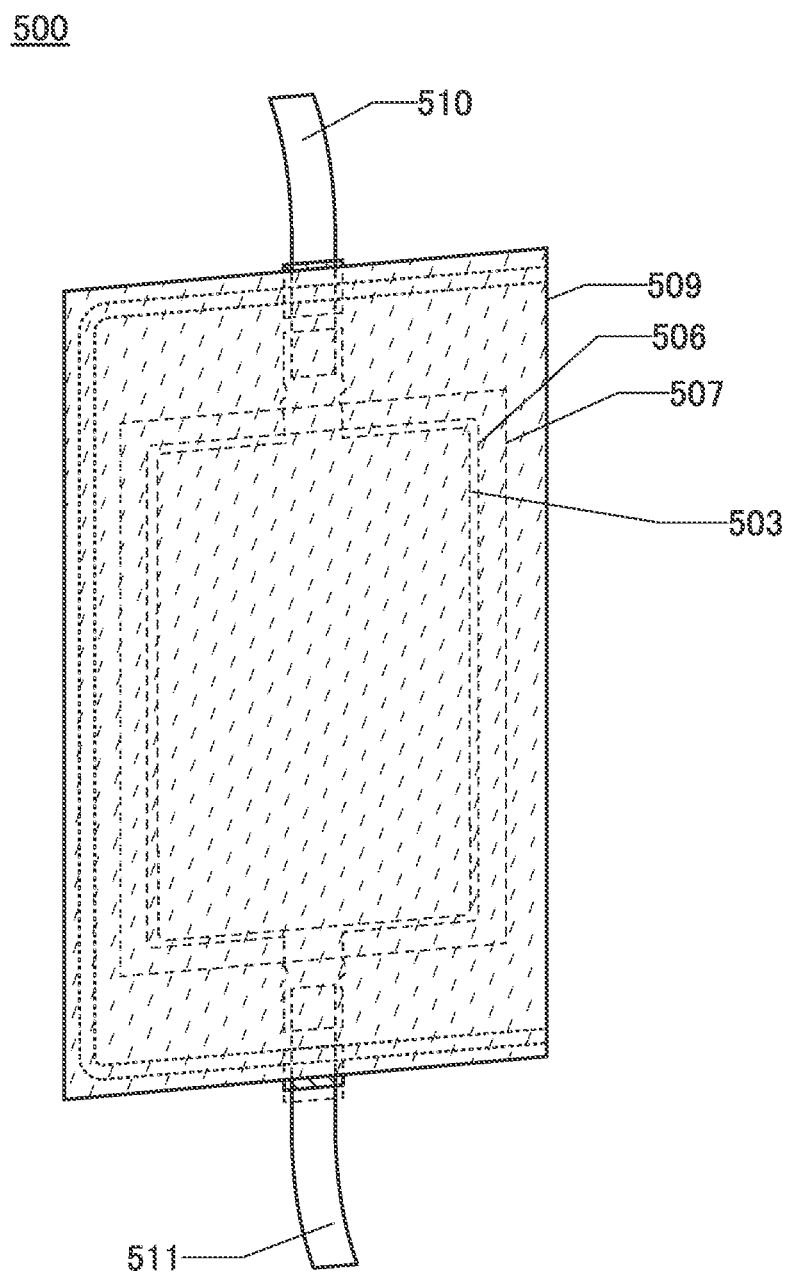
FIG. 9 illustrates a thin storage battery.

Although the positive electrode lead electrode 510 and the negative electrode lead electrode 511 are provided on the same side in FIG. 5, the positive electrode lead electrode 510 and the negative electrode lead electrode 511 may be provided on different sides as illustrated in FIG. 9. The lead electrodes of a storage battery of one embodiment of the present invention can be freely positioned as described above; therefore, the degree of freedom in design is high. Accordingly, a product including a storage battery of one embodiment of the present invention can have a high degree of freedom in design. Furthermore, a yield of products each including a storage battery of one embodiment of the present invention can be increased.

As the exterior body 509 in the thin storage battery 500, for example, a film having a three-layer structure in which a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide-based resin, a polyester-based resin, or the like is provided as the outer surface of the exterior body over the metal thin film can be used.

Although the examples in FIGS. 6A and 6B each include five positive electrode active material layer-negative electrode active material layer pairs (the positive and negative electrode active material layers of each pair face each other), it is needless to say that the number of pairs of active material layers is not limited to five, and may be more than five or less than five. In the case of using a large number of active material layers, the storage battery can have a high capacity. In contrast, in the case of using a small number of active material layers, the storage battery can have a small thickness and high flexibility.

In the above structure, the exterior body 509 of the thin storage battery 500 can change its form such that the curvature radius is greater than or equal to 3 mm and less than or equal to 30 mm, preferably greater than or equal to 30 mm, more preferably greater than or equal to 10 mm. One or two films are used as the exterior body of the storage battery. In the case where the storage battery has a layered structure, the storage battery has a cross section sandwiched by two curved surfaces of the films when it is bent.

Figure 10A:
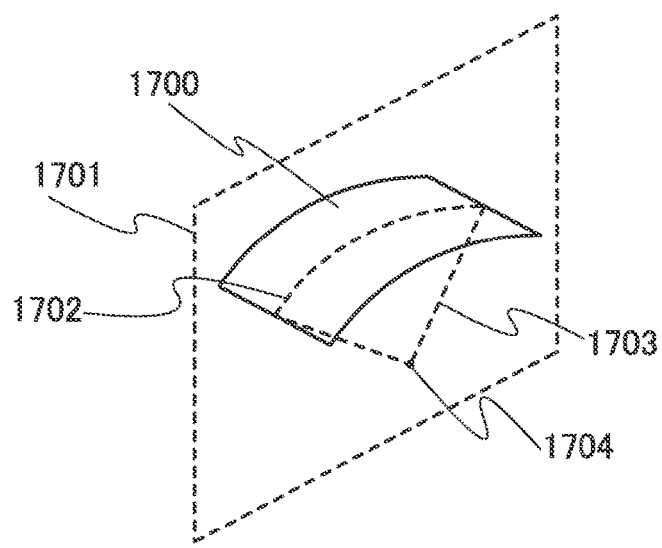
FIGS. 10A to 10C illustrate the radius of curvature of a surface.
Figure 10B:
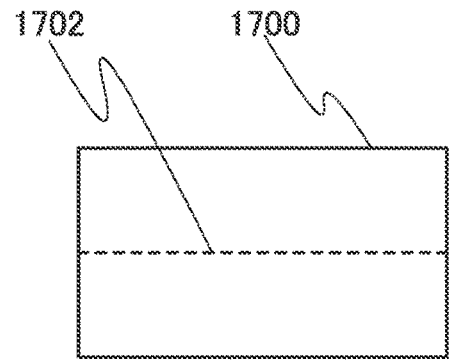
Figure 10C:
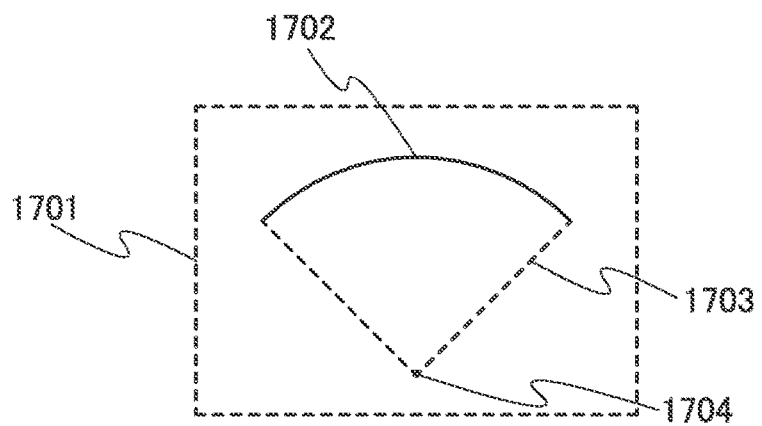

Description will be given of the radius of curvature of a surface with reference to FIGS. 10A to 10C. In FIG. 10A, on a plane 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 10B is a top view of the curved surface 1700. FIG. 10C is a cross-sectional view of the curved surface 1700 taken along the plane 1701. When a curved surface is cut by a plane, the radius of curvature of a curve in a cross section differs depending on the angle between the curved surface and the plane or on the cut position, and the smallest radius of curvature is defined as the radius of curvature of a surface in this specification and the like.

Figure 11A:
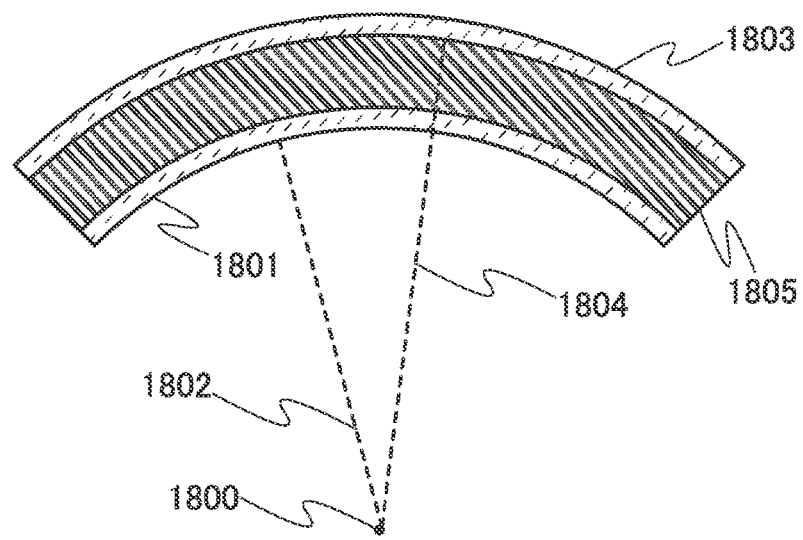
FIGS. 11A to 11D illustrate the radius of curvature of a film.
Figure 11B:
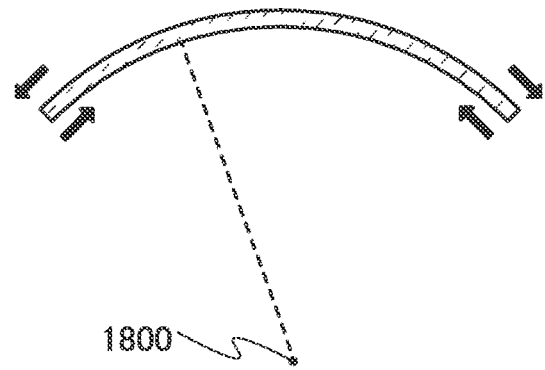

In the case of bending a storage battery in which a component 1805 including electrodes and an electrolytic solution is sandwiched between two films as exterior bodies, a radius 1802 of curvature of a film 1801 close to a center 1800 of curvature of the storage battery is smaller than a radius 1804 of curvature of a film 1803 far from the center 1800 of curvature (FIG. 11A). When the storage battery is curved and has an arc-shaped cross section, compressive stress is applied to a surface of the film on the side closer to the center 1800 of curvature and tensile stress is applied to a surface of the film on the side farther from the center 1800 of curvature (FTS. 11B). However, by forming a pattern including projections or depressions on surfaces of the exterior bodies, the influence of a strain can be reduced to be acceptable even when compressive stress and tensile stress are applied. For this reason, the storage battery can change its form such that the exterior body on the side closer to the center of curvature has the curvature radius greater than or equal to 30 mm, preferably greater than or equal to 10 mm.

Figure 11C:
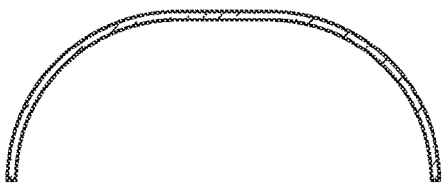
Figure 11D:
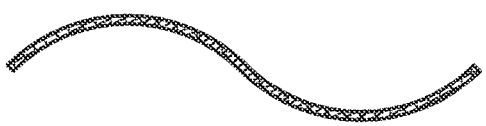

Note that the cross-sectional shape of the storage battery is not limited to a simple arc shape, and the cross section can be partly arc-shaped; for example, a shape illustrated in FIG. 11C, a wavy shape illustrated in FIG. 11D, or an S shape can be used. When the curved surface of the storage battery has a shape with a plurality of centers of curvature, the storage battery can change its form such that a curved surface with the smallest radius of curvature among radii of curvature with respect to the plurality of centers of curvature, which is a surface of the exterior body on the side closer to the center of curvature, has the curvature radius, for example, greater than or equal to 30 mm, preferably greater than or equal to 10 mm.

[Thin Storage Battery 2]

Figure 12A:
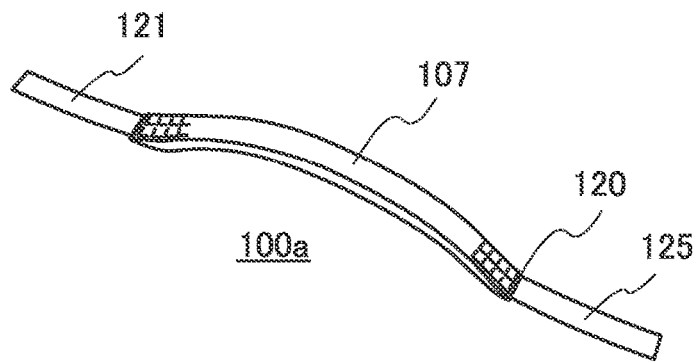
FIGS. 12A to 12C are a perspective view, a top view, and a cross-sectional view illustrating a structure example of a secondary battery.
Figure 12B:
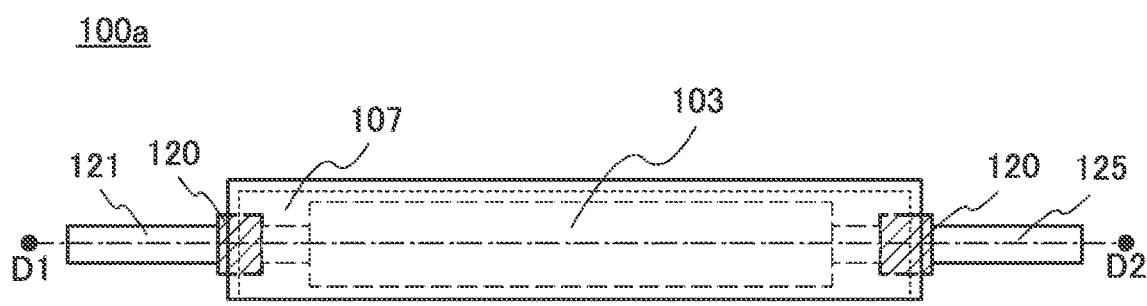
Figure 12C:
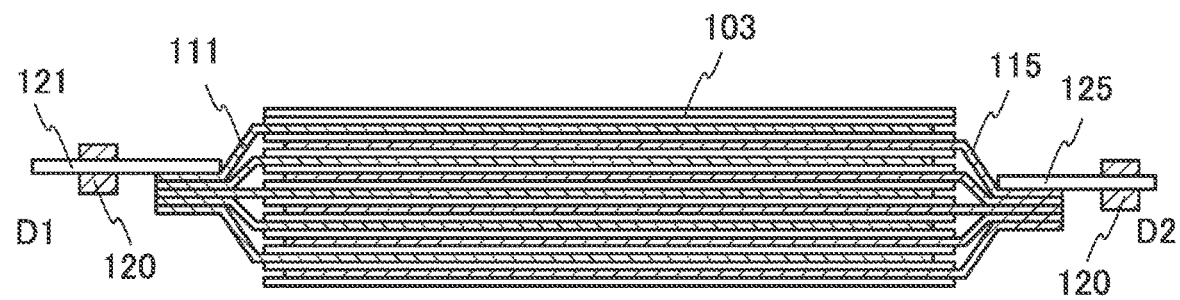

FIGS. 12A to 12C illustrate a storage battery 100a, which is an example of a thin storage battery different from that illustrated in FIG. 5. FIG. 12A is a perspective view of the storage battery 100a, and FIG. 12B is a top view thereof. FIG. 12C is a cross-sectional view taken along dashed-dotted line D1-D2 in FIG. 12B. In FIG. 12C, a positive electrode 111, a negative electrode 115, a separator 103, a positive electrode lead 121, a negative electrode lead 125, and a sealing layer 120 are selectively illustrated for the sake of clarity.

Here, some steps in a method for fabricating the storage battery 100a illustrated tin 12A to 12C will be described with reference to FIGS. 13A to 13D.

First, the negative electrode 115 is positioned over the separator 103 (FIG. 13A) such that the negative electrode active material layer of the negative electrode 115 overlaps with the separator 103.

Then, the separator 103 is folded to overlap with the negative electrode 115. Next, the positive electrode 111 overlaps with the separator 103 (FIG. 13B) such that the positive electrode active material layer of the positive electrode 111 overlaps with the separator 103 and the negative electrode active material layer. Note that in the case of using an electrode in which one surface of a current collector is provided with an active material layer, the positive electrode active material layer of the positive electrode 111 and the negative electrode active material layer of the negative electrode 115 are positioned to face each other with the separator 103 provided therebetween.

Figure 13A:
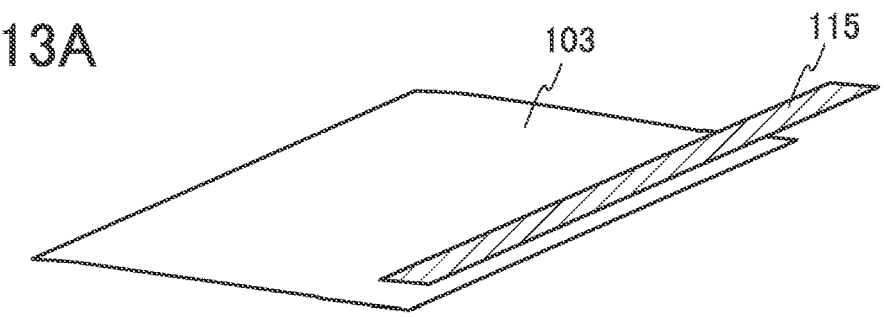
FIGS. 13A to 13D illustrate an example of a method for manufacturing a secondary battery.
Figure 13B:
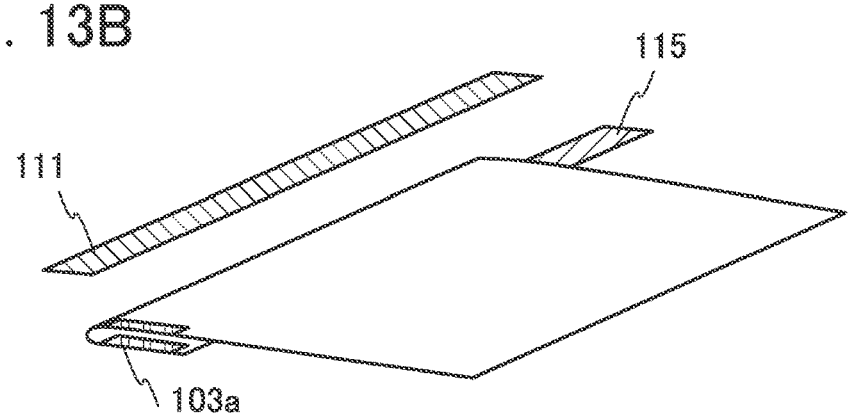

In the case where the separator 103 is formed using a material that can be thermally5 welded, such as polypropylene, a region where the separator 103 overlaps with itself is thermally welded and then another electrode overlaps with the separator 103, whereby the slippage of the electrode in the fabrication process can be suppressed. Specifically, a region which does not overlap with the negative electrode 115 or the positive electrode 111 and in which the separator 103 overlaps with itself, e.g., a region denoted as 103a in FIG. 13B, is preferably thermally welded.

Figure 13C:
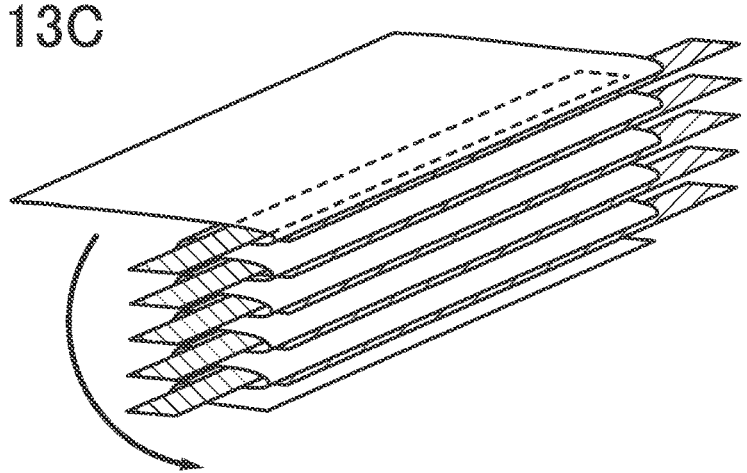

By repeating the above steps, the positive electrode 111 and the negative electrode 115 can overlap with each other with the separator 103 provided therebetween as illustrated in FIG. 13C.

Note that a plurality of positive electrodes 111 and a plurality of negative electrodes 115 may be placed to be alternately sandwiched by the separator 103 that is repeatedly folded in advance.

Then, as illustrated in FIG. 13C, a plurality of positive electrodes 111 and a plurality of negative electrodes 115 are covered with the separator 103.

Figure 13D:
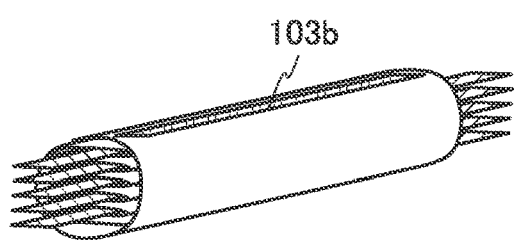

Furthermore, the region where the separator 103 overlaps with itself, e.g., a region 103b in FIG. 13D, is thermally welded as illustrated in FIG. 13D, whereby a plurality of positive electrodes 111 and a plurality of negative electrodes 115 are covered with and tied with the separator 103.

Note that a plurality of positive electrodes 111, a plurality of negative electrodes 115, and the separator 103 may be tied with a binding material Since the positive electrodes 111 and the negative electrodes 115 are stacked in the above process, one separator 103 has a region sandwiched between the positive electrode 111 and the negative electrode 115 and a region covering a plurality of positive electrodes 111 and a plurality of negative electrodes 115.

In other words, the separator 103 included in the storage battery 100a in FIGS. 12A to 12C is a single separator which is partly folded. In the folded regions of the separator 103, a plurality of positive electrodes 111 and a plurality of negative electrodes 115 are provided.

The description in Embodiment 1 can be referred to for the structures of the storage battery 100a except bonding regions of an exterior body 107, the shapes of the positive electrodes 111, the negative electrodes 115, the separator 103, and the exterior body 107, and the positions of the positive electrode lead 121 and the negative electrode lead 125. The fabricating method described in other Embodiments can be referred to for the steps other than the steps of stacking the positive electrodes 111 and the negative electrodes 115 in the fabricating method for the storage battery 100a.

[Thin Storage Battery 3]

FIGS. 14A to 14D illustrate a storage battery 100b, which is an example of a thin storage battery different from that illustrated in FIGS. 12A to 12C. FIG. 14A is a perspective view of a storage battery 100b, and FEG. 14B is a top view thereof. FIG. 14C1 is a cross-sectional view of a first electrode assembly 130, and FIG. 14C2 is a cross-sectional view of a second electrode assembly 131. FIG. 14D is a cross-sectional view taken along dashed-dotted line E1-E2 in FIG. 14B. In FIG. 14D, the first electrode assembly 130, the second electrode assembly 131, and the separator 103 are selectively illustrated for the sake of clarity.

The storage battery 100b illustrated in FIGS. 14A to 14D is different from the storage battery 100a illustrated in FIGS. 12A to 12C in the positions of the positive electrodes 111, the negative electrodes 115, and the separator 103.

As illustrated in FIG. 14D, the rage battery 100b includes a plurality of first electrode assemblies 130 and a plurality of second electrode assemblies 131.

As illustrated in FIG. 14C1, in each of the first electrode assemblies 130, a positive electrode 111a including positive electrode active material layers on both surfaces of a positive electrode current collector, the separator 103, a negative electrode 115a including negative electrode active material layers on both surfaces of a negative electrode current collector, the separator 103, and the positive electrode 111a including positive electrode active material layers on both surfaces of a positive electrode current collector are stacked in this order. As illustrated in FIG. 14C2, in each of the second electrode assemblies 131, the negative electrode 115a including negative electrode active material layers on both surfaces of a negative electrode current collector, the separator 103, the positive electrode 111a including positive electrode active material layers on both surfaces of a positive electrode current collector, the separator 103, and the negative electrode 115a including negative electrode active material layers on both surfaces of a negative electrode current collector are stacked in this order.

As illustrated in FIG. 14D, the plurality of first electrode assemblies 130 and the plurality of second electrode assemblies 131 are covered with the wound separator 103.

Here, some steps in the method for fabricating the storage battery 100b illustrated in 14A to 14D will be described with reference to FIGS. 15A to 15D.

Figure 15A:
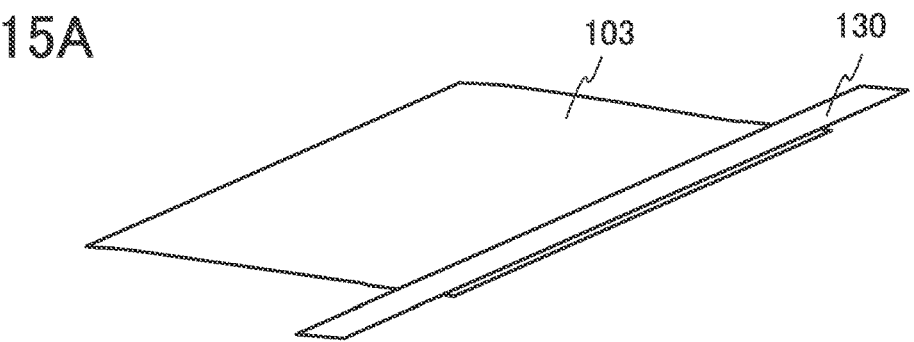
FIGS. 15A to 15D illustrate an example of a method for manufacturing a secondary battery.

First, the first electrode assembly 130 is positioned over the separator 103 (FIG. 15A).

Figure 15B:
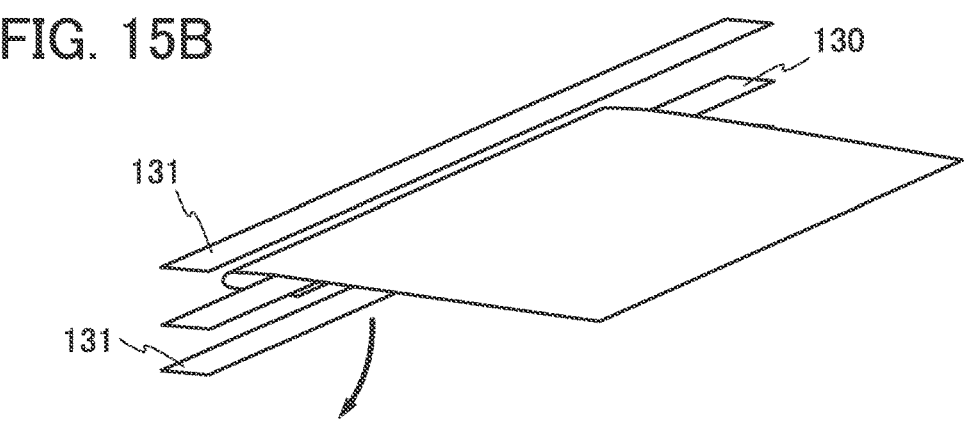

Then, the separator 103 is folded to overlap with the first electrode assembly 130. After that, two second electrode assemblies 131 are positioned over and under the first electrode assembly 130 with the separator 103 positioned between each of the second electrode assemblies 131 and the first electrode assembly 130 (FIG. 15B).

Figure 15C:
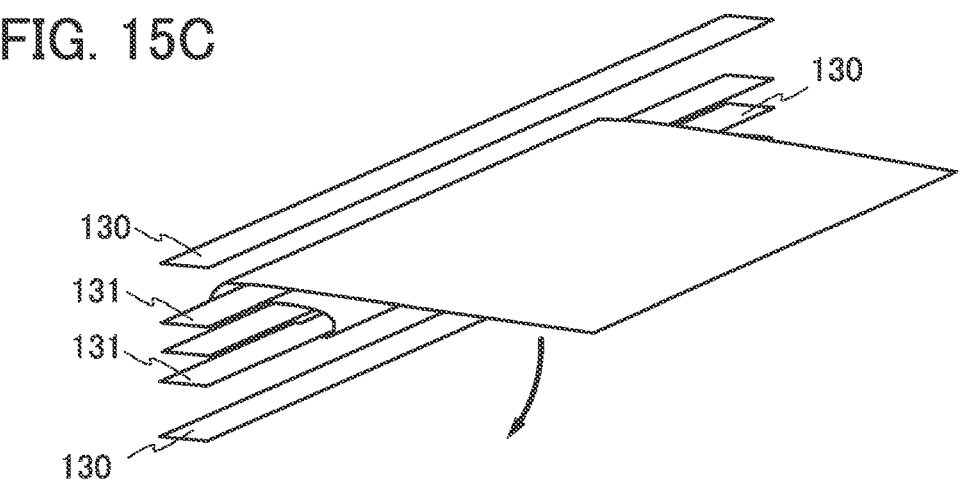

Then, the separator 103 is wound to cover the two second electrode assemblies 131. Moreover, two first electrode assemblies 130 are positioned over and under the two second electrode assemblies 131 with the separator 103 positioned between each the first electrode assemblies 130 and each of the second electrode assemblies 131 (FIG. 15C).

Figure 15D:
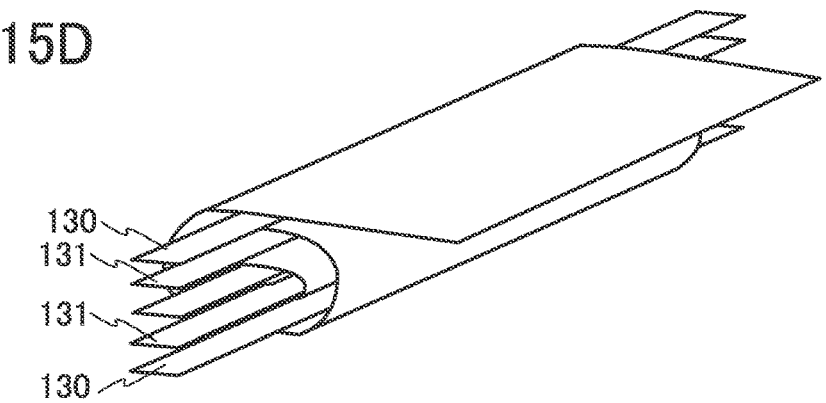

Then, the separator 103 is wound to cover the two first electrode assemblies 130 (FIG. 15D).

Since a plurality of first electrode assemblies 130 and a plurality of second electrode assemblies 131 are stacked in the above process, these electrode assemblies are each positioned surrounded with the spirally wound separator 103.

It is preferable that the positive electrode 111a of the first electrode assembly 130 that is positioned on the outermost side not include the positive electrode active material layer on the outer side.

Although FIGS. 14C1 and 14C2 each illustrate a structure in which the electrode assembly includes three electrodes and two separators, one embodiment be present invention is not limited to this structure. The electrode assembly may include four or more electrodes and three or more separators. A larger number of electrodes lead to higher capacity of the storage battery 100b. Alternatively, the electrode assembly may include two electrodes and one separator. A smaller number of electrodes enable higher resistance of the storage battery 100b against bending. Although FIG. 14D illustrates the structure in which the storage battery 100b includes three first electrode assemblies 130 and two second electrode assemblies 131, one embodiment of the present invention is not limited to this structure. The number of the electrode assemblies may be increased. A larger number of electrode assemblies lead to higher capacity of the storage battery 100b. The number of the electrode assemblies may be decreased. A smaller number of electrode assemblies enable higher resistance of the storage battery 100b to bending.

The description of FIGS. 12A to 12C can be referred to for structures other than the positions of the positive electrodes 111a, the negative electrodes 115a, and the separator 103 of the storage battery 100b.

<Coin-Type Storage Battery>

Figure 16A:
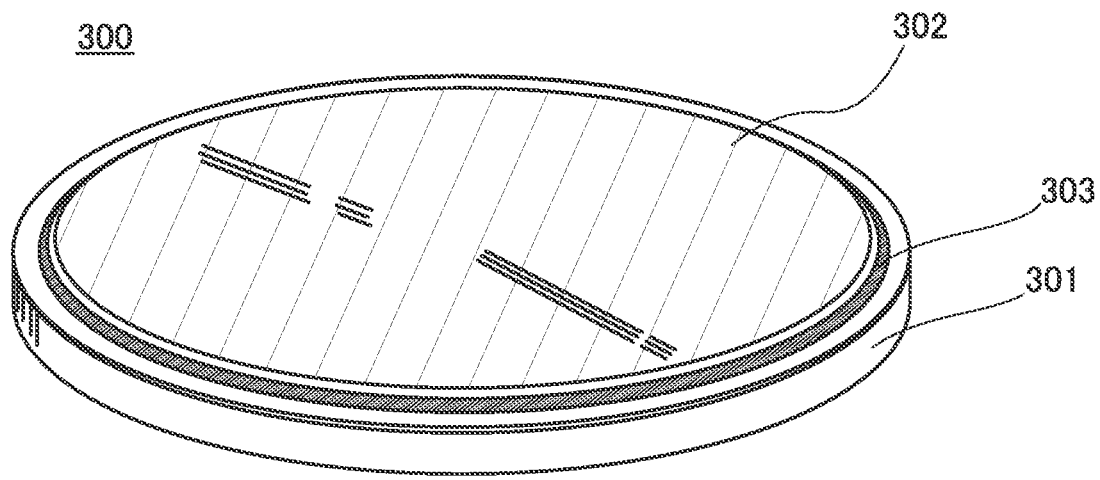
FIGS. 16A and 16B illustrate a coin-type storage battery.
Figure 16B:
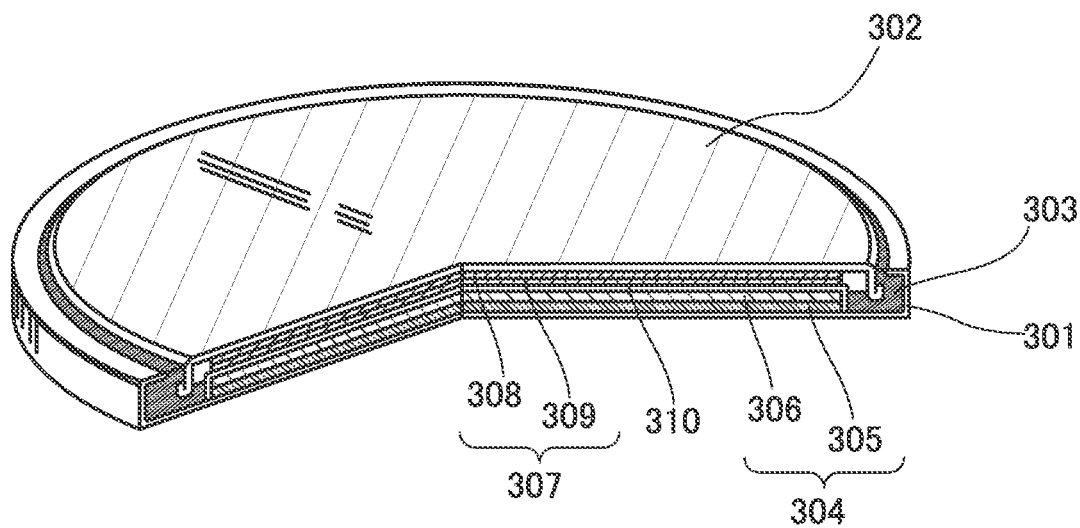

Next, an example of a coin-type storage battery will be described as an example of a power storage device with reference to FIGS. 16A and 16B. FIG. 16A is an external view of a coin-type (single-layer flat type) storage battery, and FIG. 16B is a cross-sectional view thereof.

In a coin-type storage battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The description of the positive electrode active material layer 502 can be referred to for the positive electrode active material layer 306.

A negative electrode 307 includes a negative electrode current collector 308 and a negative electrode active material layer 309 provided in contact with the negative electrode current. collector 308. The description of the negative electrode active material layer 505 can be referred to for the negative electrode active material layer 309. The description of the separator 507 can be referred to for the separator 310. The description of the electrolytic solution 508 can be referred to for the electrolytic solution.

Note that only one surface of each of the positive electrode 304 and the negative electrode 307 used for the coin-type storage battery 300 is provided with an active material layer.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered by nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 16B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type storage battery 300 can be manufactured.

<Cylindrical Storage Battery>

Figure 17A:
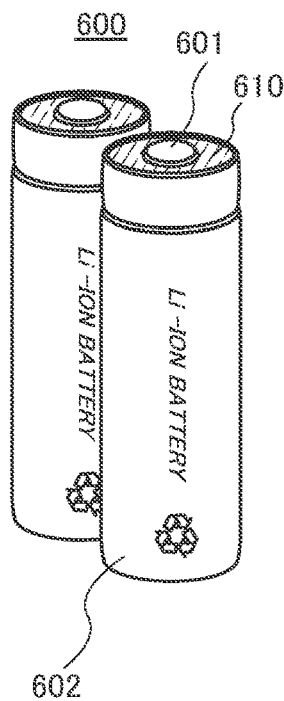
FIGS. 17A and 17B illustrate a cylindrical storage battery.

Next, an example of a cylindrical storage battery will be described as an example of a power storage device with reference to FIGS. 17A and 17B. As illustrated in FIG. 17A, a cylindrical storage battery 600 includes a positive electrode cap (battery cap) 601 on the top surface and a battery can (outer can) 602 on the side surface and bottom surface.

The positive electrode cap 601 and the battery can 602 are insulated from each other by a gasket (insulating gasket) 610.

Figure 17B:
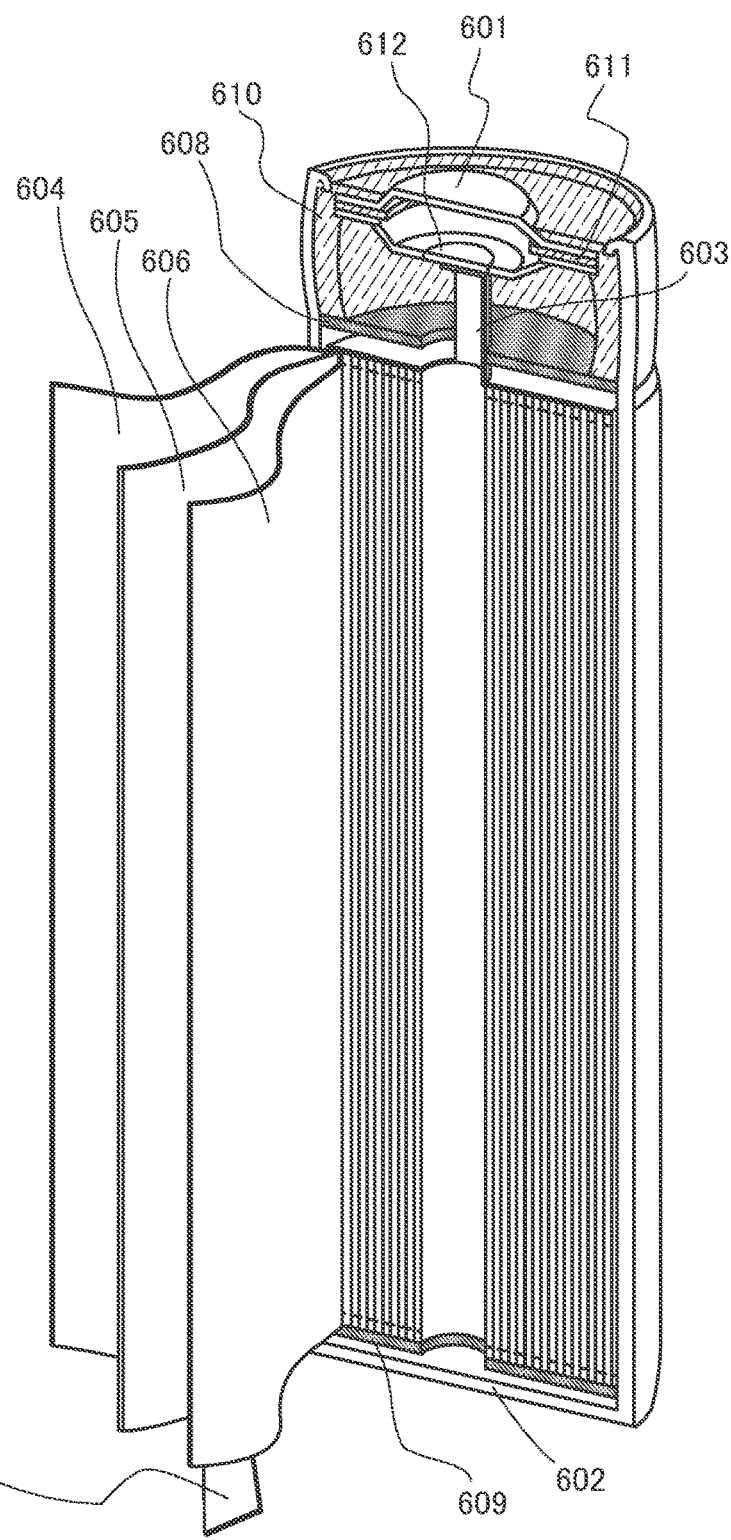

FIG. 17B is a diagram schematically illustrating a cross section of the cylindrical storage battery. Inside the battery can 602 having a hollow cylindrical shape, a battery element in which a strip-like positive electrode 604 and a strip-like negative electrode 606 are wound with a stripe-like separator 605 interposed therebetween is provided. Although not illustrated, the battery element is wound around a center pin. One end of the battery can 602 is close and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered by nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to those of the coin-type storage battery can be used.

The positive electrode 604 can be fabricated in a manner similar to that of the positive electrode of the thin storage battery described above. The negative electrode 606 can be fabricated in a manner similar to that of the negative electrode of the thin storage battery described above. Since the positive electrode and the negative electrode of the cylindrical storage battery are wound, active materials are preferably formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the storage battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

In the case where an electrode is wound as in the cylindrical storage battery illustrated in FIGS. 17A and 17B, a great stress is caused at the time of winding the electrode. In addition, an outward stress from an axis of winding is applied to the electrode all the time in the case where a wound body of the electrode is provided in a housing. However, the active material can be prevented from being cleaved even when such a great stress is applied to the electrode.

Note that in this embodiment, the coin-type storage battery, the cylindrical storage battery, and the thin storage battery are given as examples of the storage battery; however, any of storage batteries with a variety of shapes, such as a sealed storage battery and a square-type storage battery, can be used. Furthermore, a structure in which a plurality of positive electrodes, a plurality of negative electrodes, and a plurality of separators are stacked or wound may be employed. For example, FIGS. 18A to 18C to FIGS. 22A and 22B illustrate examples of other storage batteries.

<Structural Example of Storage Battery>

FIGS. 18A to 18C and FIGS. 19A to 19C illustrate structural examples of thin storage batteries. A wound body 993 illustrated in FIG. 18A includes a negative electrode 994, a positive electrode 995, and a separator 996.

The wound body 993 is obtained by winding a sheet of a stack in which the negative electrode 994 overlaps with the positive electrode 995 with the separator 996 therebetween. The wound body 993 is covered by a rectangular sealed container or the like; thus, a rectangular storage battery is fabricated.

Note that the number of stacks each including the negative electrode 994, the positive electrode 995, and the separator 996 is determined as appropriate depending on capacity and element volume which are required. The negative electrode 994 is connected to a negative electrode current collector (not illustrated) via one of a lead electrode 997 and a lead electrode 998. The positive electrode 995 is connected to a positive electrode current collector (not illustrated) via the other of the lead electrode 997 and the lead electrode 998.

Figure 18A:
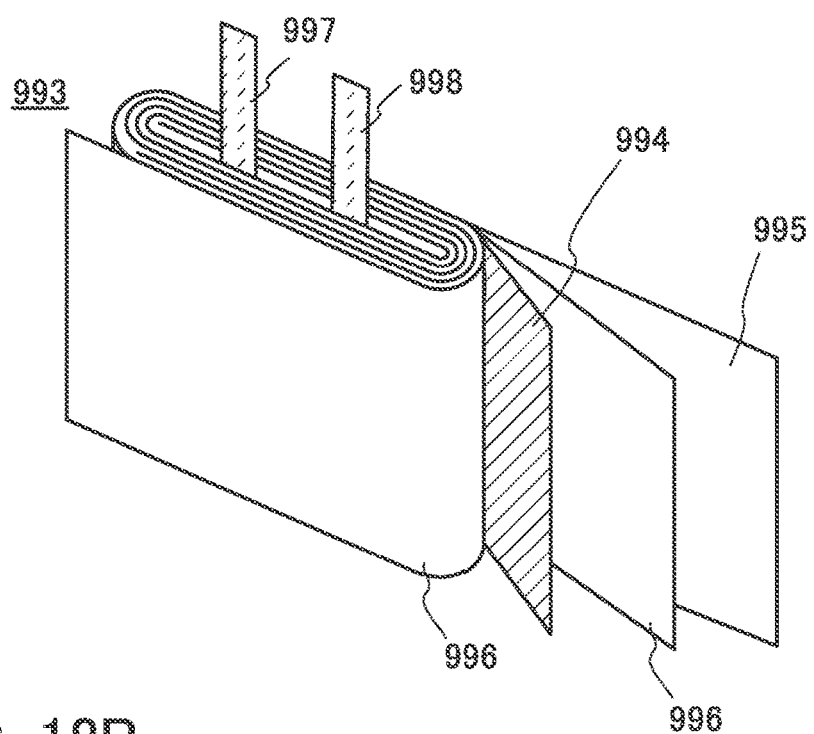
FIGS. 18A to 18C illustrate an example of a power storage device.
Figure 18B:
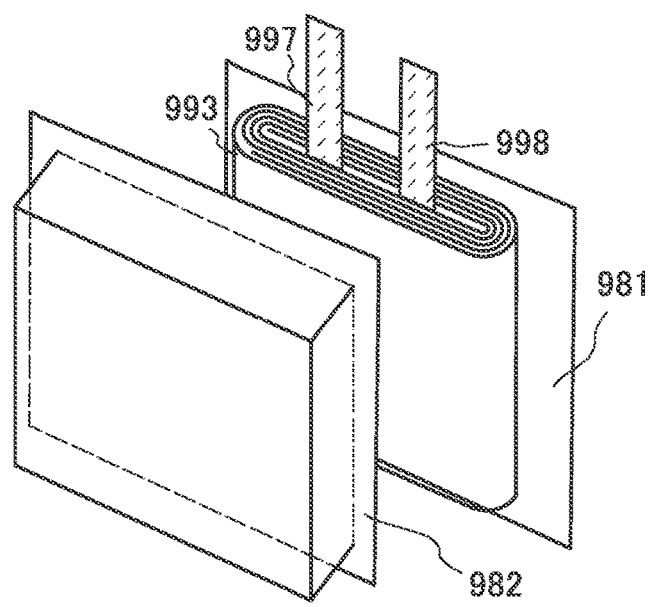
Figure 18C:
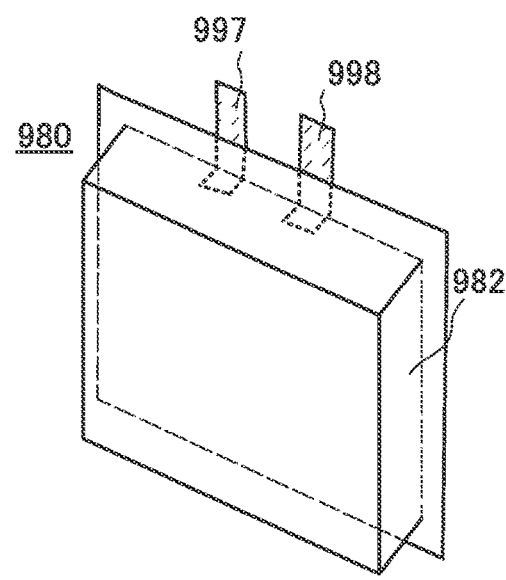

In a storage battery 990 illustrated in FIGS. 18B and 18C, the wound body 993 is packed in a space formed by bonding a film 981 and a film 982 having a depressed portion that serve as exterior bodies by thermocompression bonding or the like. The wound body 993 includes the lead electrode 997 and the lead electrode 998, and is soaked in an electrolytic solution inside a space surrounded by the film 981 and the film 982 having a depressed portion.

For the film 981 and the film 982 having a depressed portion, a metal material such as aluminum or a resin material can be used, for example. With the use of a resin material for the film 981 and the film 982 having a depressed portion, the film 981 and the film 982 having a depressed portion can be changed in their forms when external force is applied; thus, a flexible storage battery can be fabricated.

Although FIGS. 18B and 18C illustrate an example where a space is formed by two films, the wound body 993 may be placed in a space formed by bending one film.

Furthermore, in fabricating a flexible power storage device that is not a one in which only a thin storage battery is flexible, a resin material or the like can be used for an exterior body and a sealed container of the power storage device. In that case, a resin material or the like is used for the exterior body and the sealed container. Note that in the case where a resin material is used for the exterior body and the sealed container, a conductive material is used for a portion connected to the outside.

For example, FIGS. 19B and 19C illustrate another example of a flexible thin storage battery. The wound body 993 illustrated in FIG. 19A is the same as that illustrated in FIG. 18A, and the detailed description thereof is omitted.

In the storage battery 990 illustrated in FIGS. 19B and 19C, the wound body 993 is packed in an exterior body 991. The wound body 993 includes the lead electrode 997 and the lead electrode 998, and is soaked in an electrolytic solution inside a space surrounded by the exterior body 991 and an exterior body 992. For example, a metal material such as aluminum or a resin material can be used for the exterior bodies 991 and 992. With the use of a resin material for the exterior bodies 991 and 992, the exterior bodies 991 and 992 can be changed in their forms when external force is applied; thus, a flexible thin storage battery can be fabricated.

When the electrode including the active material of one embodiment of the present invention is used in the flexible thin storage battery, the active material can be prevented from being cleaved even if a stress caused by repeated bending of the thin storage battery is applied to the electrode.

When the active material in which at least part of the cleavage plane is covered with graphene is used for an electrode as described above, a decrease in the voltage and discharge capacity of a battery can be prevented. Accordingly, the cycle performance of the battery can be improved.

<Structural Example of Power Storage System>

Structural examples of power storage systems will be described with reference to FIGS. 20A and 20B to FIGS. 22A and 22B. Here, a power storage system refers to, for example, a device including a power storage device.

Figure 20A:
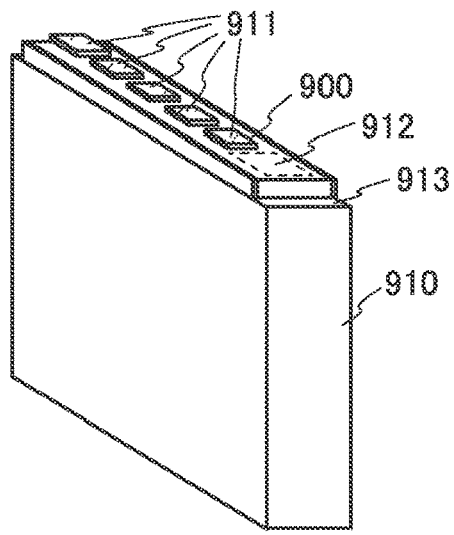
FIGS. 20A and 20B illustrate an example of a power storage device.
Figure 20B:
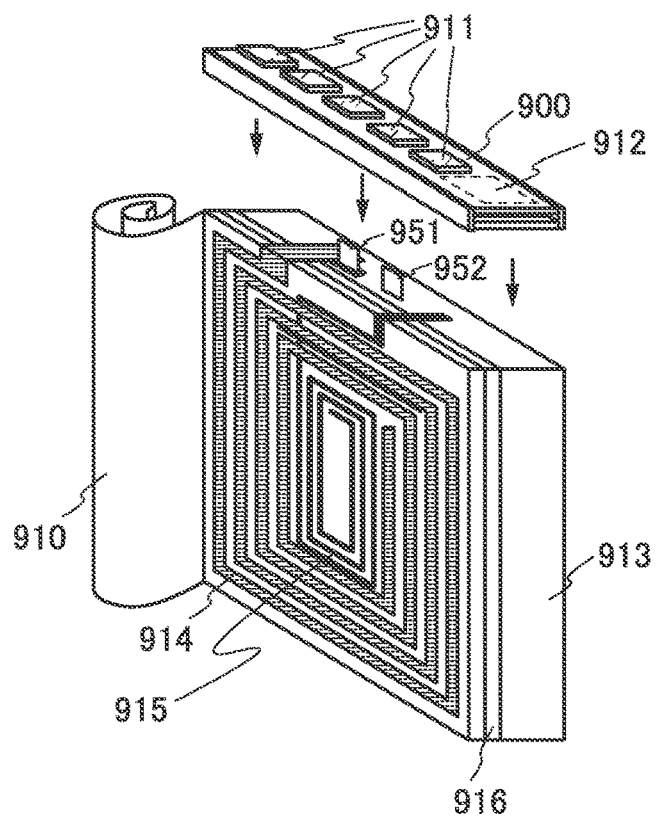

FIGS. 20A and 20B are external views of a power storage system. The power storage system includes a circuit board 900 and a storage battery 913, A label 910 is attached to the storage battery 913. As shown in FIG. 20B, the power storage system further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may further be provided.

The circuit 912 may be provided on the rear surface of the circuit board 900. The shape of each of the antennas 914 and 915 is not limited to a coil shape and may be a linear shape or a plate shape. Further, a planar antenna, an aperture antenna, a traveling-wave antenna, an EH antenna, a magnetic-field antenna, or a dielectric antenna may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage system includes a layer 916 between the storage battery 913 and the antennas 914 and 915. The layer 916 may have a function of blocking an electromagnetic field by the storage battery 913. As the layer 916, for example, a magnetic body can be used.

Note that the structure of the power storage system is not limited to that shown in FIGS. 20A and 2013.

For example, as shown in FIGS. 21A1 and 21A2, two opposite surfaces of the storage battery 913 in FIGS. 20A and 20B may be provided with respective antennas. FIG. 21A1 is an external view showing one side of the opposite surfaces, and FIG. 21A2 is an external view showing the other side of the opposite surfaces. For portions similar to those in FIGS. 20A and 20B, the description of the power storage system illustrated in FIGS. 20A and 20B can be referred to as appropriate.

As illustrated in FIG. 21A1, the antenna 914 is provided on one of the opposite surfaces of the storage battery 913 with the layer 916 interposed therebetween, and as illustrated in FIG. 21A2, the antenna 915 is provided on the other of the opposite surfaces of the storage battery 913 with a layer 917 interposed therebetween. The layer 917 may have a function of preventing an adverse effect on an electromagnetic field by the storage battery 913. As the layer 917, for example, a magnetic body can be used.

With the above structure, both of the antennas 914 and 915 can be increased in size.

Alternatively, as illustrated in FIGS. 21B1 and 21B2, two opposite surfaces of the storage battery 913 in FIGS. 20A and 20B may be provided with different types of antennas. FIG. 21B1 is an external view showing one side of the opposite surfaces, and FIG. 21B2 is an external view showing the other side of the opposite surfaces. For portions similar to those in FIGS. 20A and 20B, the description of the power storage system illustrated in FIGS. 20A and 20B can be referred to as appropriate.

As illustrated in FIG. 21B1, the antenna 914 is provided on one of the opposite surfaces of the storage battery 913 with the layer 916 interposed therebetween, and as illustrated in FIG. 21B2, an antenna 918 is provided on the other of the opposite surfaces of the storage battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage system and another device, a response method that can be used between the power storage system and another device, such as NFC, can be employed.

Figure 22A:
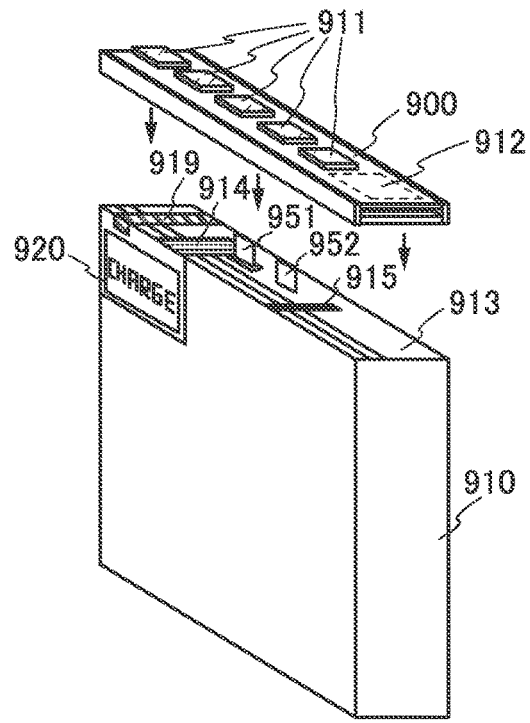
FIGS. 22A and 22B each illustrate an example of a power storage device.

Alternatively, as illustrated in FIG. 22A, the storage battery 913 in FIGS. 20A and 20B may be provided with a display device 920. The display device 920 is electrically connected to the terminal 911 via a terminal 919. It is possible that the label 910 is not provided in a portion where the display device 920 is provided. For portions similar to those in FIGS. 20A and 20B, the description of the power storage system illustrated in FIGS. 20A and 20B can be referred to as appropriate.

The display device 920 can display, for example, an image showing whether charge is being carried out, an image showing the amount of stored power, or the like. As the display device 920, electronic paper, a liquid crystal display device, an electroluminescent (EL) display device, or the like can be used. For example, the us of electronic paper can reduce power consumption of the display device 920.

Figure 22B:
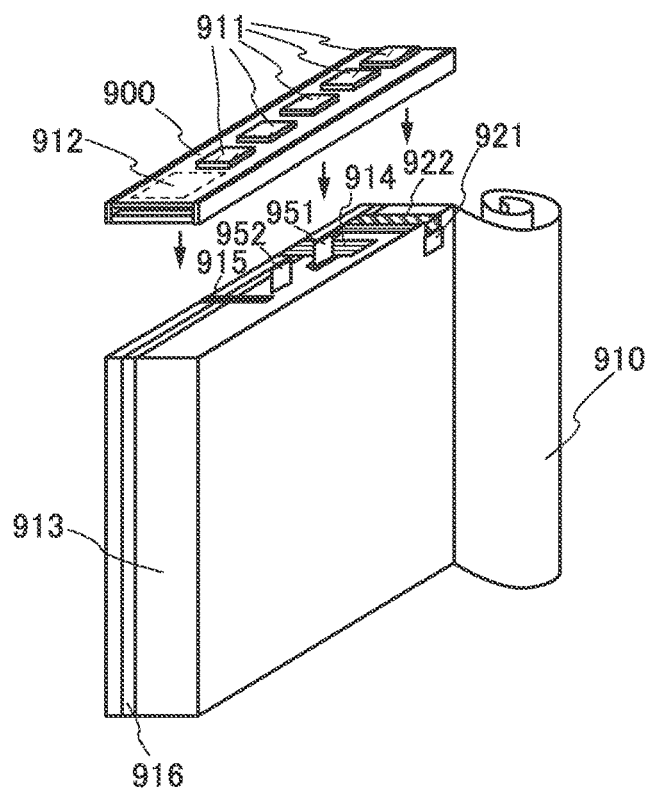

Alternatively, as illustrated in FIG. 22B, the storage battery 913 illustrated in FIGS. 20A and 20B may be provided with a sensor 921. The sensor 921 is electrically connected to the terminal 911 via a terminal 922 For portions similar to those in FIGS. 20A and 20B, the description of the power storage system illustrated in FIGS. 20A and 20B can be referred to as appropriate.

As the sensor 921, a sensor that has a function of measuring, for example, force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. With the sensor 921, for example, data on an environment (e.g., temperature) where the power storage system is placed can be determined and stored in a memory inside the circuit 912.

The electrode of one embodiment of the present invention is used in the storage battery and the power storage system that are described in this embodiment. The capacity of the storage battery and the power storage system can thus be high. Furthermore, energy density can be high. Moreover, reliability can be high, and life can be long.

This embodiment can be implemented in appropriate combination with any of the other embodiments.

Embodiment 3

In this embodiment, an example of an electronic device including a flexible storage battery will be described.

FIGS. 23A to 23G illustrate examples of electronic devices including the flexible storage batteries described in Embodiment 2. Examples of electronic devices each including a flexible storage battery include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible storage battery can be incorporated along a curved inside/outside wall surface of a house or a building or a curved interior/exterior surface of a car.

Figure 23A:
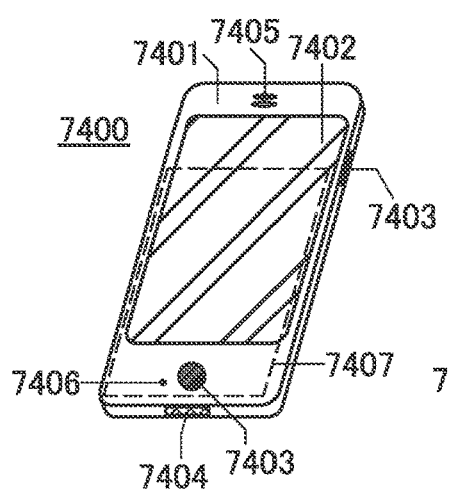
FIGS. 23A to 23G illustrate examples of electronic devices.

FIG. 23A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

Figure 23B:
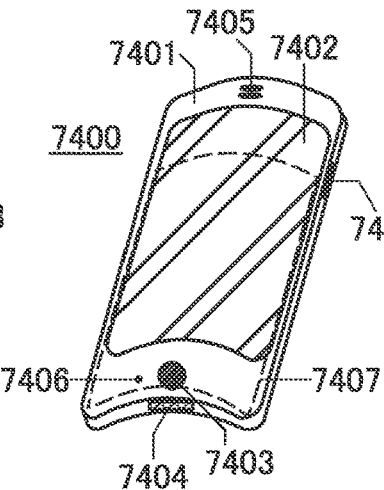
Figure 23C:
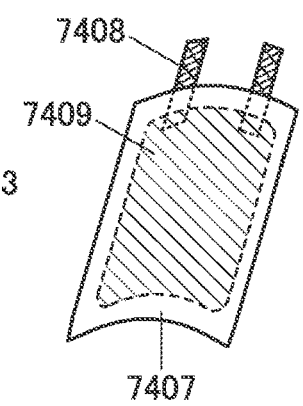

FIG. 23B illustrates the mobile phone 7400 that is bent. When the whole mobile phone 7400 is bent by the external force, the power storage device 7407 included in the mobile phone 7400 is also bent. FIG. 23C illustrates the bent power storage device 7407. The power storage device 7407 is a thin storage battery. The power storage device 7407 is fixed in a state of being bent. Note that the power storage device 7407 includes a lead electrode 7408 electrically connected to a current collector 7409. The current collector 7409 is, for example, copper foil, and partly alloyed with gallium; thus, adhesion between the current collector 7409 and an active material layer in contact with the current collector 7409 is improved and the power storage device 7407 can have high reliability even in the state of being bent.

Figure 23D:
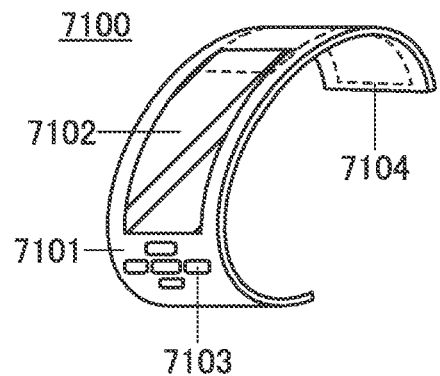
Figure 23E:
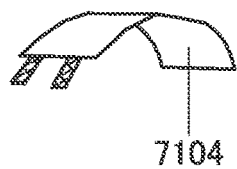

FIG. 23D illustrates an example of a bangle display device. A portable display device 7100 includes a housing 7101, a display portion 7102, an operation button 7103, and a power storage device 7104. FIG. 23E illustrates the bent power storage device 7104. When the display device is worn on a user's arm while the power storage device 7104 is bent, the housing changes its form and the curvature of a part or the whole of the power storage device 7104 is changed. Note that the radius of curvature of a curve at a point refers to the radius of the circular arc that best approximates the curve at that point. The reciprocal of the radius of curvature is curvature. Specifically, a part or the whole of the housing or the main surface of the power storage device 7104 is changed in the range of radius of curvature from 40 mm to 150 mm inclusive. When the radius of curvature at the main surface of the power storage device 7104 is greater than or equal to 40 mm and less than or equal to 150 mm, the reliability can be kept high.

Figure 23F:
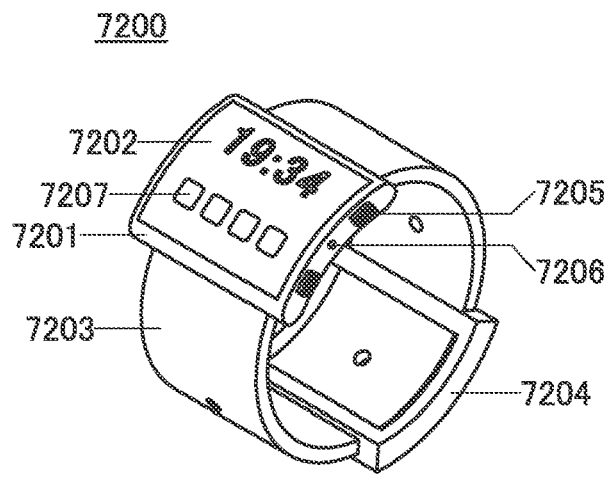

FIG. 23F illustrates an example of a watch-type portable information terminal. A portable information terminal 7200 includes a housing 7201, a display portion 7202, a band 7203, a buckle 7204, an operation button 7205, an input output terminal 7206, and the like.

The portable information terminal 7200 is capable of executing a variety of applications such as mobile phone calls, e-mailing, viewing and editing texts, music reproduction, Internet communication, and a computer game.

The display surface of the display portion 7202 is curved, and images can be displayed on the curved display surface. In addition, the display portion 7202 includes a touch sensor, and operation can be performed by touching the screen with a finger, a stylus, or the like. For example, by touching an icon 7207 displayed on the display portion 7202, application can be started.

With the operation button 7205, a variety of functions such as time setting, power on/off, on/off of wireless communication, setting and cancellation of a silent mode, and setting and cancellation of a power saving mode can be performed. For example, the functions of the operation button 7205 can be set freely by setting the operation system incorporated in the portable information terminal 7200.

The portable information terminal 7200 can employ near field communication that is a communication method based on an existing communication standard. In that case, for example, mutual communication between portable information terminal 7200 and a headset capable of wireless communication can be performed, and thus hands-free calling is possible.

Moreover, the portable information terminal 7200 includes the input output terminal 7206, and data can be directly transmitted to and received from another information terminal via a connector. In addition, charging via the input output terminal 7206 is possible. Note that the charging operation may be performed by wireless power feeding without using the input output terminal 7206.

The display portion 7202 of the portable information terminal 7200 is provided with a power storage device including the electrode of one embodiment of the present invention. For example, the power storage device 7104 illustrated in FIG. 23E that is in the state of being curved can be provided in the housing 7201. Alternatively, the power storage device 7104 illustrated in FIG. 23E can be provided in the band 7203 such that it can be curved.

Figure 23G:
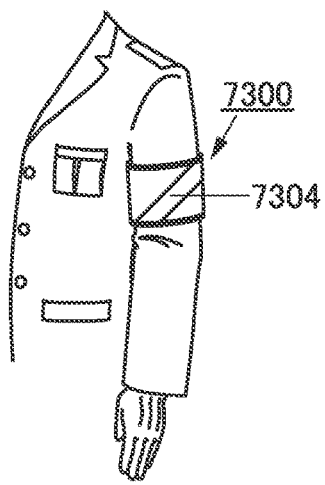

FIG. 23G illustrates an example of an armband display device. A display device 7300 includes a display portion 7304 and the power storage device of one embodiment of the present invention. The display device 7300 can include a touch sensor in the display portion 7304 and can serve as a portable information terminal.

The display surface of the display portion 7304 is bent, and images can be displayed on the bent display surface. A display state of the display device 7300 can be changed by, for example, near field communication, which is a communication method based on an existing communication standard.

The display device 7300 includes an input output terminal, and data can be directly transmitted to and received from another information terminal via a connector. In addition, charging via the input output terminal is possible. Note that the charging operation may be performed by wireless power feeding without using the input output terminal.

This embodiment can be implemented in appropriate combination with any of the other embodiments.

Embodiment 4

In this embodiment, examples of electronic devices that can include power storage devices will be described.

Figure 24A:
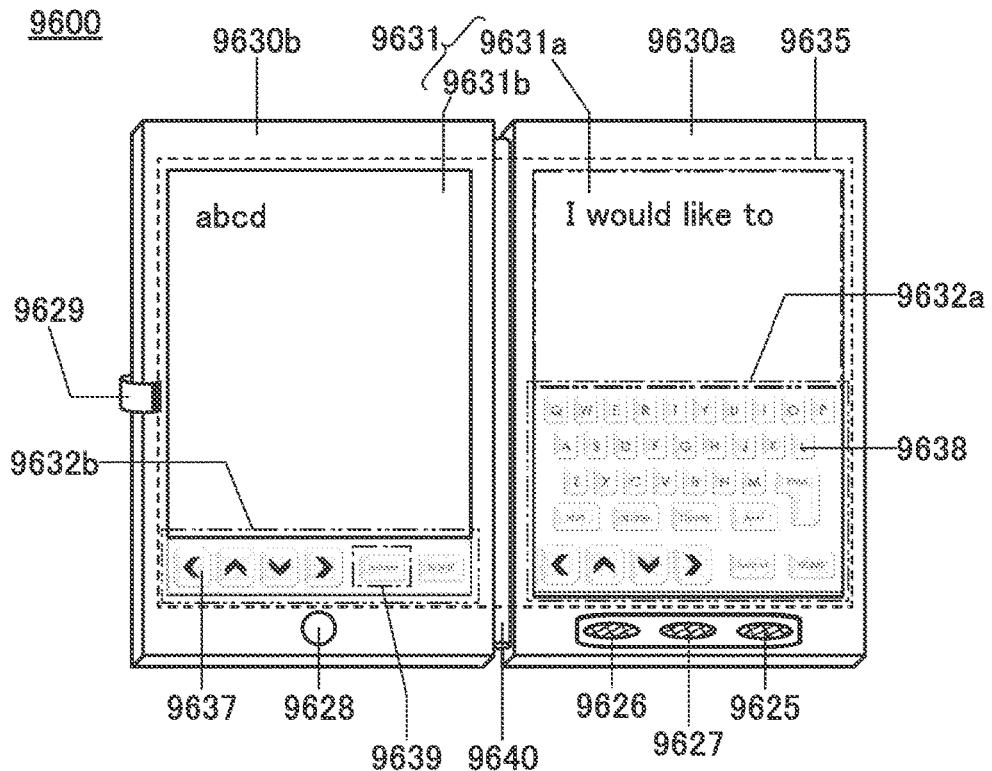
FIGS. 24A to 24C illustrate an examples of an electronic device.
Figure 24B:
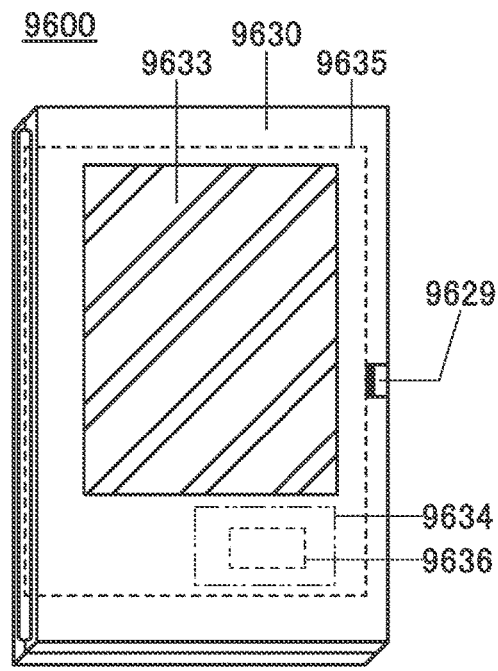

FIGS. 24A and 24B illustrate an example of a tablet terminal that can be folded in half A tablet terminal 9600 illustrated in FIGS. 24A and 248 includes a housing 9630a, a housing 9630b, a movable portion 9640 connecting the housings 9630a and 9630b, a display portion 9631 including a display portion 9631a and a display portion 9631b, a display mode changing switch 9626, a power switch 9627, a power saving mode changing switch 9625, a fastener 9629, and an operation switch 9628. FIG. 24A illustrates the tablet terminal 9600 that is opened, and FIG. 24B illustrates the tablet terminal 9600 that is closed.

The tablet terminal 9600 includes a power storage unit 9635 inside the housings 9630a and 9630b. The power storage unit 9635 is provided across the housings 9630a and 9630b, passing through the movable portion 9640.

Part of the display portion 9631a can be a touch panel region 9632a, and data can be input by touching operation keys 9638 that are displayed. Note that as an example, the structure is shown in which half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display a keyboard and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The display mode changing switch 9626 allows switching between a landscape mode and a portrait mode, color display and black-and-white display, and the like. The power saving mode changing switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Although the display portion 9631a and the display portion 9631b have the same area in FIG. 24A, one embodiment of the present invention is not limited to this example. The display portion 9631a and the display portion 9631b may have different areas or different display quality. For example, one of the display portions 9631a and 9631b may display higher definition images than the other.

The tablet terminal is closed in FIG. 24B. The tablet terminal includes the housing 9630, a solar cell 9633, and a charge and discharge control circuit 9634 including a DCDC converter 9636. The power storage unit of one embodiment of the present invention is used as the power storage unit 9635.

The tablet terminal 9600 can be folded such that the housings 9630a and 9630b overlap with each other when not in use. Thus, the display portions 9631a and 9631b can be protected, which increases the durability of the tablet terminal 9600. In addition, the power storage unit 9635 of one embodiment of the present invention has flexibility and can be repeatedly bent without a significant decrease in charge and discharge capacity. Thus, a highly reliable tablet terminal can be provided.

The tablet terminal illustrated in FIGS. 24A and 24B can also have a function of displaying various kinds of data (e.g., a still image, a moving image, and a text image) on the display portion, a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processing portion, and the like. Note that the solar cell 9633 can be provided on one or both surfaces of the housing 9630 and the power storage unit 9635 can be charged efficiently. The use of a lithium-ion battery as the power storage unit 9635 brings an advantage such as reduction in size.

Figure 24C:
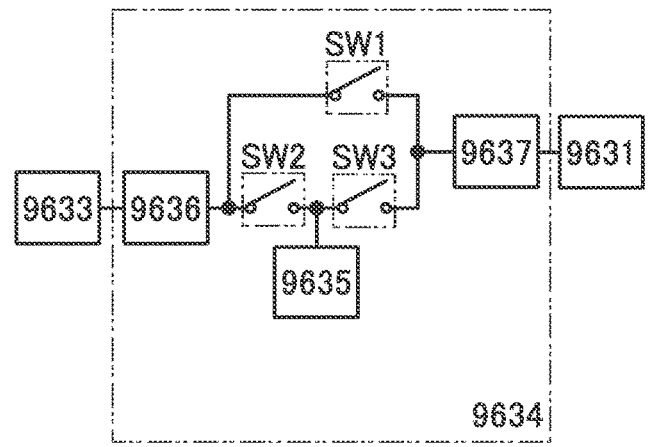

The structure and operation of the charge and discharge control circuit 9634 illustrated in FIG. 24B will be described with reference to a block diagram in FIG. 24C. The solar cell 9633, the power storage unit 9635, the DCDC converter 9636, a converter 9637, switches SW1 to SW3, and the display portion 9631 are illustrated in FIG. 24C, and the power storage unit 9635, the DCDC converter 9636, the converter 9637, and the switches SW1 to SW3 correspond to the charge and discharge control circuit 9634 in FIG. 24B.

First, an example of operation when electric power is generated by the solar cell 9633 using external light will be described. The voltage of electric power generated by the solar cell is raised or lowered by the DCDC converter 9636 to a voltage for charging the power storage unit 9635. When the display portion 9631 is operated with the electric power from the solar cell 9633, the switch SW1 is turned on and the voltage of the electric power is raised or lowered by the converter 9637 to a voltage needed for operating the display portion 9631. When display on the display portion 9631 is not performed, the switch SW1 is turned off and the switch SW2 is turned on, so that the power storage unit 9635 can be charged.

Note that the solar cell 9633 is described as an example of a power generation means; however, one embodiment of the present invention is not limited to this example. The power storage unit 9635 may be charged using another power generation means such as a piezoelectric element or a thermoelectric conversion element (Peltier element). For example, the power storage unit 9635 may be charged with a non-contact power transmission module capable of performing charging by transmitting and receiving electric power wirelessly (without contact), or any of the other charge means used in combination.

Figure 25:
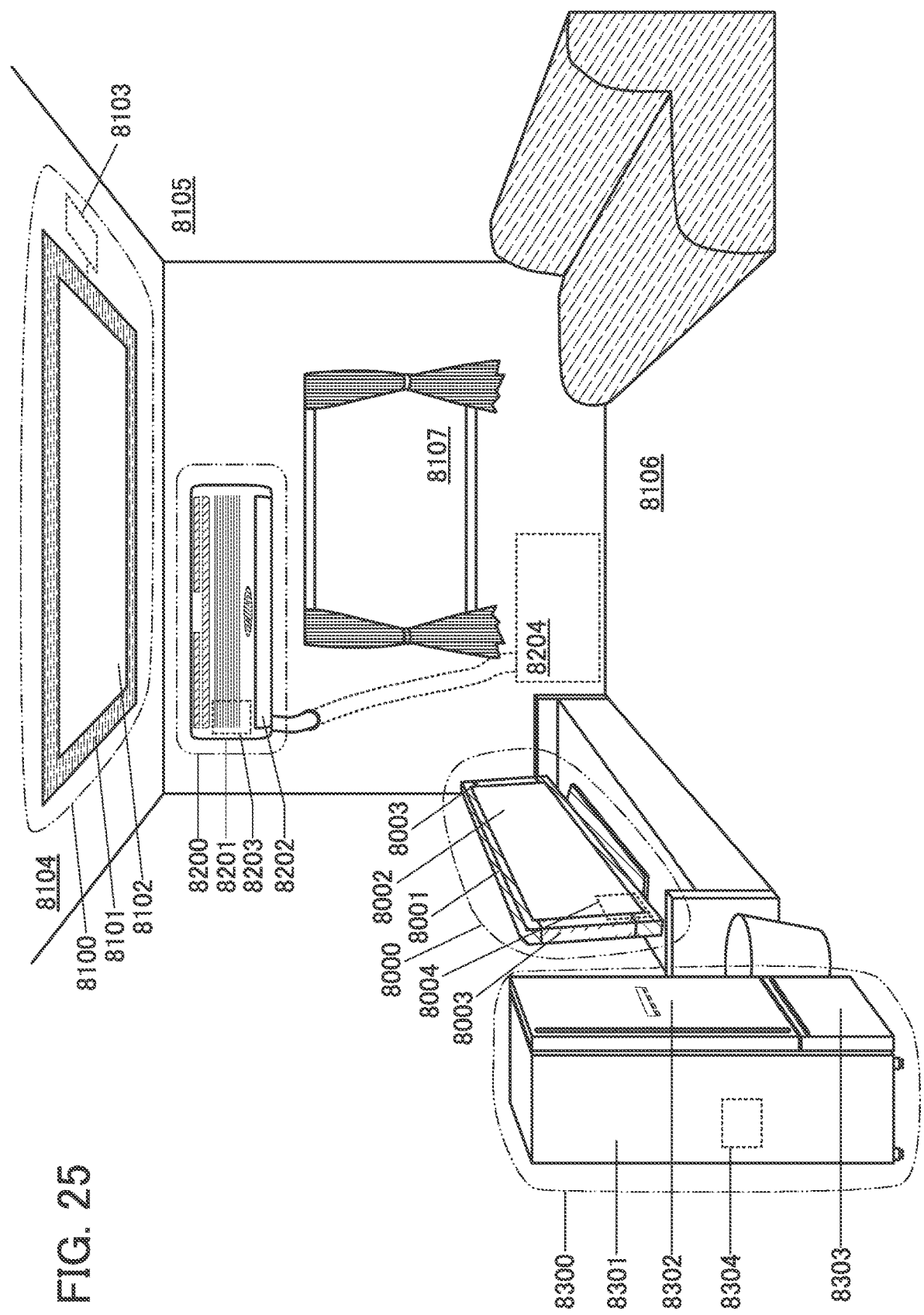
FIG. 25 illustrates examples of electronic devices.

FIG. 25 illustrates other examples of electronic devices. In FIG. 25, a display device 8000 is an example of an electronic device including a power storage device 8004 of one embodiment of the present invention. Specifically, the display device 8000 corresponds to a display device for TV broadcast reception and includes a housing 8001, a display portion 8002, speaker portions 8003, and the power storage device 8004. The power storage device 8004 of one embodiment of the present invention is provided in the housing 8001. The display device 8000 can receive electric power from a commercial power supply. Alternatively, the display device 8000 can use electric power stored in the power storage device 8004. Thus, the display device 8000 can be operated with the use of the power storage device 8004 of one embodiment of the present invention as an uninterruptible power supply even when electric power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 25, an installation lighting device 8100 is an example of an electronic including a power storage device 8103 of one embodiment of the present invention. Specifically, the lighting device 8100 includes a housing 8101, a light source 8102, and the power storage device 8103. Although FIG. 25 illustrates the case where the power storage device 8103 is provided in a ceiling 8104 on which the housing 8101 and the light source 8102 are installed, the power storage device 8103 may be provided in the housing 8101. The lighting device 8100 can receive electric power from a commercial power supply. Alternatively, the lighting device 8100 can use electric power stored in the power storage device 8103. Thus, the lighting device 8100 can be operated with the use of power storage device 8103 of one embodiment of the present invention as an uninterruptible power supply even when electric power cannot be supplied from a commercial power supply due to power failure or the like.

Note that although the installation lighting device 8100 provided in the ceiling 8104 is illustrated in FIG. 25 as an example, the power storage device of one embodiment of the present invention can be used in an installation lighting device provided in, for example, a wall 8105, a floor 8106, a window 8107, or the like other than the ceiling 8104. Alternatively, the power storage device of one embodiment of the present invention can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 25, an air conditioner including an indoor unit 8200 and an outdoor unit 8204 is an example of an electronic device including a power storage device 8203 of one embodiment of the present invention. Specifically, the indoor unit 8200 includes a housing 8201, an air outlet 8202, and the power storage device 8203. Although FIG. 25 illustrates the case where the power storage device 8203 is provided in the indoor unit 8200, the power storage device 8203 may be provided in the outdoor unit 8204. Alternatively, the power storage devices 8203 may be provided in both the indoor unit 8200 and the outdoor unit 8204. The air conditioner can receive electric power from a commercial power supply. Alternatively, the air conditioner can use electric power stored in the power storage device 8203. Particularly in the case where the power storage devices 8203 are provided in both the indoor unit 8200 and the outdoor unit 8204, the air conditioner can be operated with the use of the power storage device 8203 of one embodiment of the present invention as an uninterruptible power supply even when electric power cannot be supplied from a commercial power supply due to power failure or the like.

Note that although the split-type air conditioner including the indoor unit and the outdoor unit is illustrated in FIG. 25 as an example, the power storage device of one embodiment of the present invention can be used in an air conditioner in which the functions of an indoor unit and an outdoor unit are integrated in one housing.

In FIG. 25, an electric refrigerator-freezer 8300 is an example of an electronic device including a power storage device 8304 of one embodiment of the present invention. Specifically, the electric refrigerator-freezer 8300 includes a housing 8301, a door for a refrigerator 8302, a door for a freezer 8303, and the power storage device 8304. The power storage device 8304 is provided in the housing 8301 in FIG. 25. The electric refrigerator-freezer 8300 can receive electric power from a commercial power supply. Alternatively, the electric refrigerator-freezer 8300 can use electric power stored in the power storage device 8304. Thus, the electric refrigerator-freezer 8300 can be operated with the use of the power storage device 8304 of one embodiment of the present invention as an uninterruptible power supply even when electric power cannot be supplied from a commercial power supply due to power failure or the like.

Note that among the electronic devices described above, a high-frequency heating apparatus such as a microwave oven and an electronic device such as an electric rice cooker require high power in a short time. The tripping of a breaker of a commercial power supply in use of an electronic device can be prevented by using the power storage device of one embodiment of the present invention as an auxiliary power supply for supplying power which cannot be supplied enough by a commercial power supply.

In addition, in a time period when electronic devices are not used, particularly when the proportion of the amount of electric power which is actually used to the total amount of electric power which can be supplied from a commercial power supply source (such a proportion referred to as a usage rate of electric power) is low, electric power can be stored in the power storage device, whereby the usage rate of electric power can be reduced in a time period when the electronic devices are used. For example, in the case of the electric refrigerator-freezer 8300, electric power can be stored in the power storage device 8304 in night time when the temperature is low and the door for a refrigerator 8302 and the door for a freezer 8303 are not often opened or closed. On the other hand, in daytime when the temperature is high and the door for a refrigerator 8302 and the door for a freezer 8303 are frequently opened and closed, the power storage device 8304 is used as an auxiliary power supply; thus, the usage rate of electric power in daytime can be reduced.

This embodiment can be implemented in combination with any of the other embodiments as appropriate.

Embodiment 5

In this embodiment, examples of vehicles using power storage devices will be described.

The use of power storage devices in vehicles enables production of next-generation clean energy vehicles such as hybrid electric vehicles (REVs), electric vehicles (EVs), and plug-in hybrid electric vehicles (PHEVs).

Figure 26A:
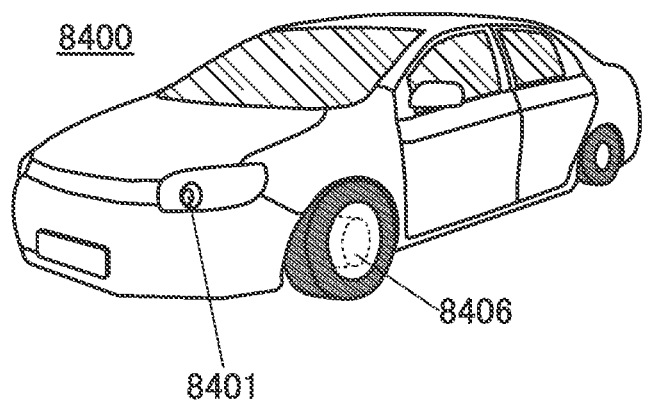
FIGS. 26A and 26B illustrate examples of electronic devices.
Figure 26B:
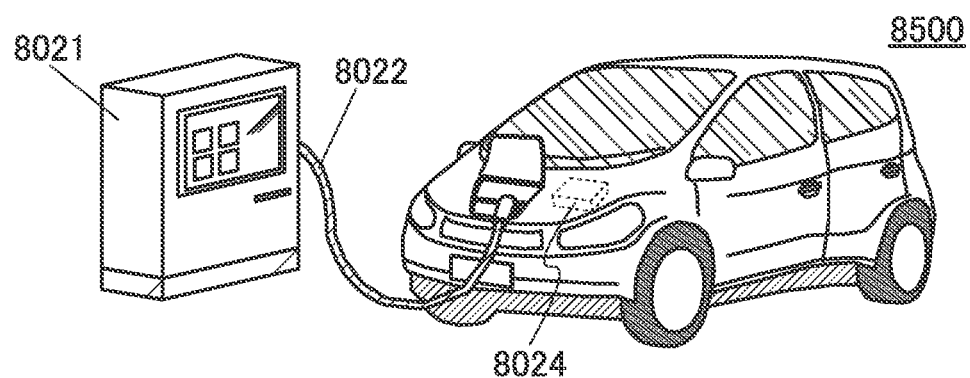

FIGS. 26A and 26B each illustrate an example of a vehicle using one embodiment of the present invention. An automobile 8400 illustrated in FIG. 26A is an electric vehicle that runs on the power of an electric motor. Alternatively, the automobile 8400 is a hybrid electric vehicle capable of driving appropriately using either an electric motor or an engine. One embodiment of the present invention can provide a high-mileage vehicle. The automobile 8400 includes the power storage device. The power storage device is used not only for driving the electric motor 8406, but also for supplying electric power to a light-emitting device such as a headlight 8401 or a room light (not illustrated).

The power storage device can also supply electric power to a display device of a speedometer, a tachometer, or the like included in the automobile 8400. Furthermore, the power storage device can supply electric power to a semiconductor device included in the automobile 8400, such as a navigation system.

FIG. 26B illustrates an automobile 8500 including the power storage device. The automobile 8500 can be charged when the power storage device is supplied with electric power through external charging equipment by a plug-in system, a contactless power feeding system, or the like. in FIG. 26B, a power storage device 8024 included in the automobile 8500 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The ground-based charging apparatus 8021 may be a charging station provided in a commerce facility or a power source in a house. For example, with the use of a plug-in technique, the power storage device 8024 included in the automobile 8500 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior o the automobile o charge the power storage device when the automobile stops or moves. To supply electric power in such a contactless manner, an electromagnetic induction method or a magnetic resonance method can be used.

According to one embodiment of the present invention, the power storage device can have improved cycle characteristics and reliability. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Embodiment 6

A battery management unit (BMU) that can be used in combination with battery cells each including the materials described in the above embodiment and transistors that are suitable for a circuit included in the battery management unit will be described with reference to FIG. 27 to FIG. 33. In this embodiment, in particular, a battery management unit of a power storage device including battery cells connected in series will be described.

When the plurality of battery cells connected in series repeatedly charged and discharged, there occur variations in charge and discharge characteristics among the battery cells, which causes variations in capacity (output voltage) among the battery cells. The discharge capacity of all the plurality of battery cells connected in series depends on the capacity of the battery cell that is low. The variations in capacity among the battery cells reduce the discharge capacity of all the battery cells. Furthermore, when charge is performed based on the capacity of the battery cell that is low, the battery cells might be undercharged. In contrast, when charge is performed based on the capacity of the battery cell that is high, the battery cells might be overcharged Thus, the battery management unit of the power storage device including the battery cells connected in series has a function of reducing variations in capacity among the battery cells, which cause an undercharge and an overcharge. Examples of a circuit configuration for reducing variations in capacity among battery cells include a resistive type, a capacitive type, and an inductive type, and a circuit configuration that can reduce variations in capacity among battery cells using transistors with a low off-state current will be explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of charge that leaks from a battery cell can be reduced, and reduction in capacity with the lapse of time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, more preferably greater than or equal to 1 and less than or equal to 6, and $z_1/y_1$ is preferably greater than or equal to ⅓ and less than or equal to 6, more preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

A CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in the direction substantially parallel to the sample surface, metal atoms are arranged in a layered manner in the crystal parts. Each metal atom layer reflects unevenness of a surface over which the CAAC-OS film is formed (hereinafter, a surface over which the CAAC-OS film is formed is referred to as a formation surface) or the top surface of the CAAC-DS film, and is arranged parallel to the formation surface or the top surface of the CAAC-OS film.

On the other hand, according to the plan high-resolution TEM image of the CAAC-OS film observed in the direction substantially perpendicular to the sample surface, metal atoms are arranged in a triangular or hexagonal arrangement in the crystal parts. However, there is no regularity of arrangement of metal atoms between different crystal parts.

For example, when the structure of a CAAC-OS including an $InGaZnO_4$ crystal is analyzed by an out-of-plane method using an X-ray diffraction (XL) apparatus, a peak may appear at a diffraction angle (2θ) of around 31°. This peak is derived from the (009) plane of the $InGaZnO_4$ crystal, which indicates that crystals in the CAAC-OS film have c-axis alignment, and that the c-axes are aligned in the direction substantially perpendicular to the formation surface or the top surface of the CAAC-OS film.

Note that in analysis of the CAAC-OS film by an out-of-plane method, another peak may appear when 2θ is around 36°, in addition to the peak at 2θ of around 31°. The peak at 2θ of around 36° indicates that a crystal having no c-axis alignment is included in part of the CAAC-OS film. It is preferable that in the CAAC-OS film, a peak appear when 2θ is around 31° and that a peak not appear when 2θ is around 36°.

The CAAC-OS film is an oxide semiconductor film with low impurity concentration. The impurity is an element other than the main components of the oxide semiconductor film, such as hydrogen, carbon, silicon, or a transition metal element. In particular, an element (specifically, silicon or the like) having higher strength of bonding to oxygen than a metal element included in an oxide semiconductor film extracts oxygen from the oxide semiconductor film, which results in disorder of the atomic arrangement and reduced crystallinity of the oxide semiconductor film. Furthermore, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor might serve as a carrier trap or a carrier generation source.

The CAAC-OS film is an oxide semiconductor having a low density of defect states. In some cases, oxygen vacancies in the oxide semiconductor film serve as carrier traps or serve as carrier generation sources when hydrogen is captured therein, for example.

The state in which impurity concentration is low and density of defect states is low (the number of oxygen vacancies is small) is referred to as a "highly purified intrinsic" or "substantially intrinsic" state. A highly purified intrinsic or substantially intrinsic oxide semiconductor has few carrier generation sources, and thus can have a low carrier density. Therefore, a transistor including the oxide semiconductor film rarely has negative threshold voltage (is rarely normally on). The highly purified intrinsic or substantially intrinsic oxide semiconductor film has few carrier traps. Accordingly, the transistor including the oxide semiconductor film has little variation in electrical characteristics and high reliability. Charge trapped by the carrier traps in the oxide semiconductor film takes a long time to be released and might behave like fixed charge. Thus, the transistor including the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 27:
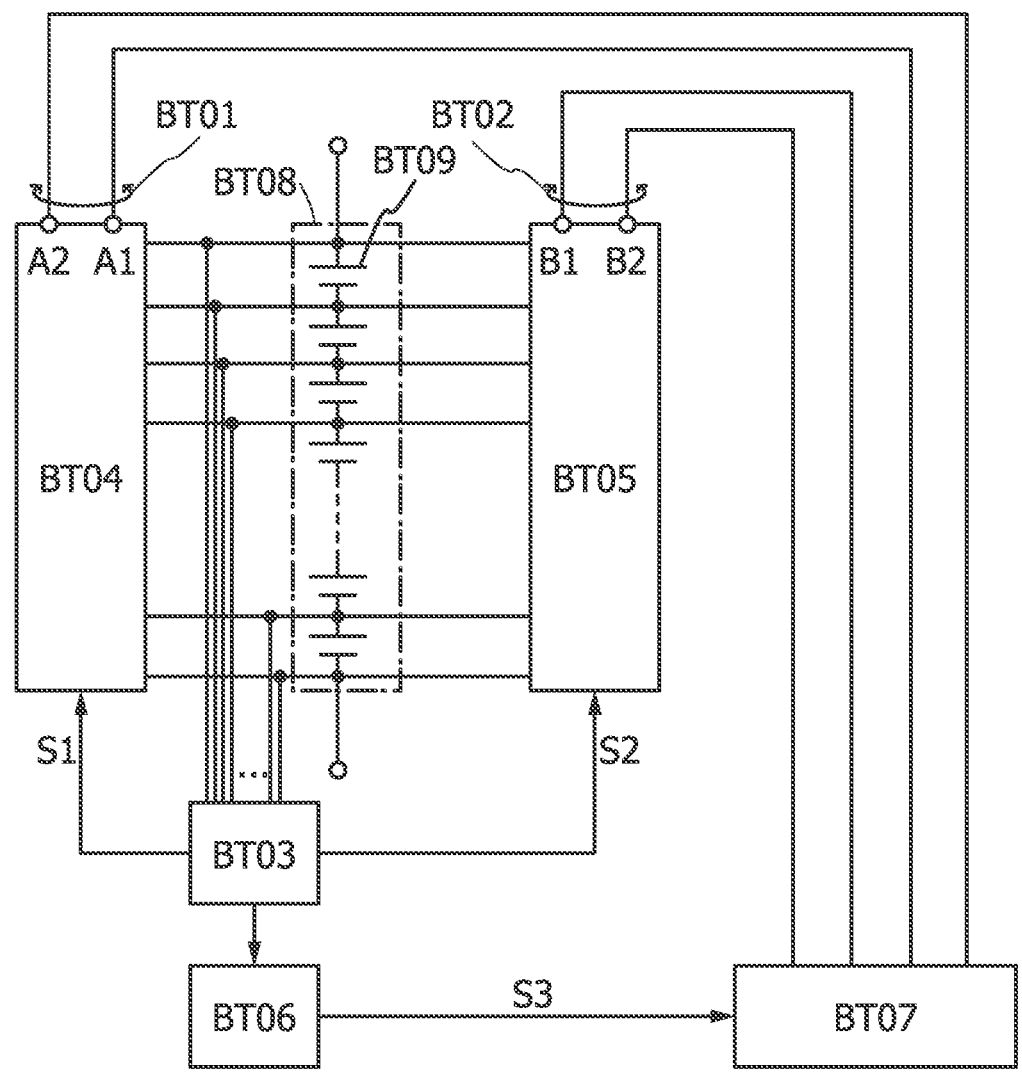
FIG. 27 is a block diagram illustrating one embodiment of the present invention.

FIG. 27 is an example of a block diagram of the power storage device. A power storage device BT00 illustrated in FIG. 27 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 27, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. in addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of the connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

The operations of the switching control circuit BT03 will be described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of the battery cell BT09 having the highest voltage or the lowest voltage among the plurality of battery cells BT09. In this case, the switching control circuit BT03 can determine whether each battery cell BT09 is a high-voltage cell or a low-voltage cell by, for example, determining whether or not the ratio of the voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select the battery cells BT09 which are almost overcharged or over-discharged as the discharge battery cell group or the charge battery cell group.

Figure 28A:
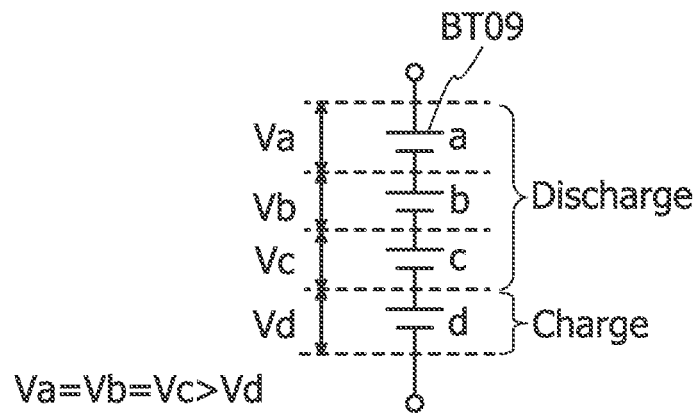
FIGS. 28A to 28C are schematic views each illustrating one embodiment of the present invention.
Figure 28B:
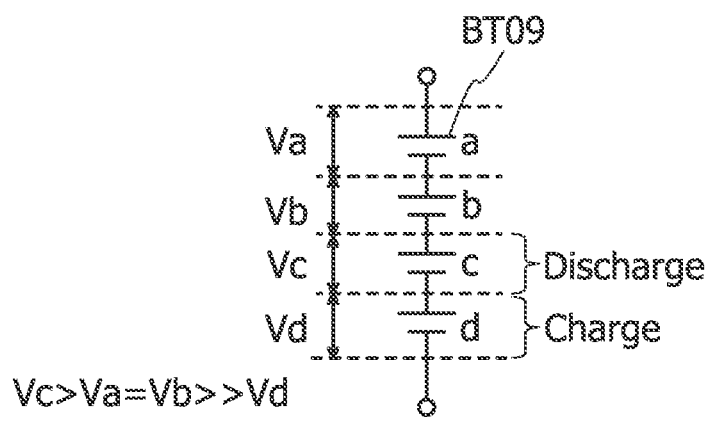
Figure 28C:
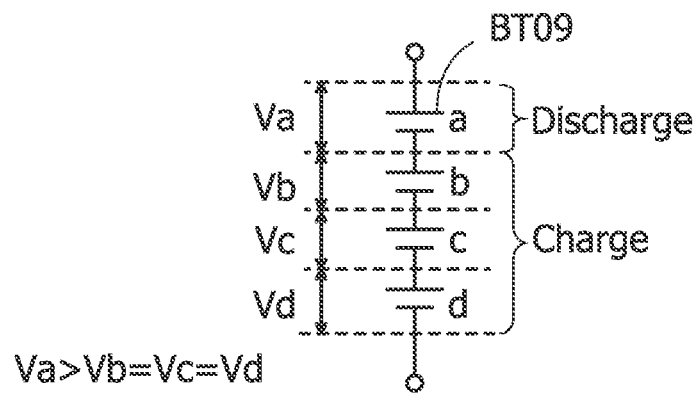

Here, operation pies of the switching control circuit BT03 in this embodiment will be described with reference to FIGS. 28A to 28C. FIGS. 28A to 28C illustrate the operation examples of the switching control circuit BT03. Note that FIGS. 28A to 28C each illustrate the case where four battery cells BT09 are connected in series as an example for convenience of explanation.

FIG. 28A shows the case where the relation of voltages Va, Vb, VC, and Vd is Va=Vb=Vc>Vd where the voltages Va, Vb, Vc, and Vd are the voltages of a battery cell a, a battery cell b, a battery cell c, and a battery cell d of BT09, respectively. That is, a series of three high-voltage cells a to c and one low-voltage cell d are connected in series. In this case, the switching control circuit BT03 selects the series of three high-voltage cells a to c as the discharge battery cell group. In addition, the switching control circuit BT03 selects the low voltage cell d as the charge battery cell up.

Next, FIG. 28B shows the case here the relation of the voltages is Vc>Va=Vb>>Vd. That is, a series of two low-voltage cells a and b, one high-voltage cell c, and one low-voltage cell d which is almost over-discharged are connected in series. In this case, the switching control circuit BT03 selects the high-voltage cell c as the discharge battery cell group. Since the low-voltage cell d is almost over-discharged, the switching control circuit BT03 preferentially selects the low-voltage cell d as the charge battery cell group instead of the series of two low-voltage cells a and b.

Lastly, FIG. 28C shows the case where the relation of the voltages is Va>Vb Vc=Vd. That is, one high-voltage cell a and a series of three low-voltage cells b to d are connected in series. In this case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 28A to 28C, the switching control circuit BT03 outputs the control signal S1 and the control signal S2 to the switching circuit BT04 and the switching circuit BT05, respectively. Information showing the discharge battery cell group, which is the connection destination of the switching circuit BT04, is set in the control signal S1. Information showing the charge battery cell group, which is the connection destination of the switching circuit BT05 is set in the control signal S2.

The above is the detailed description of the operations of the switching control circuit BT03.

The switching circuit BT04 sets the connection destination of the terminal pair BT01 at the discharge battery cell group selected by the switching control circuit BT03, in response to the control signal S1 output from the switching control circuit BT03.

The terminal pair BT01 includes a pair of terminals A1 and A2. The switching circuit BT04 connects one of the pair of terminals A1 and A2 to a positive electrode terminal of the battery cell BT09 positioned on the most upstream side (on the high potential side) of the discharge battery cell group, and the other to a negative electrode terminal of the battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the connection destination of the terminal pair BT02 at the charge battery cell group selected by the switching control circuit BT03, in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of the battery cell BT09 positioned on the most upstream side (on the high potential side) of the charge battery cell group, and the other to a negative electrode terminal of the battery cell BT09 positioned on the most downstream side (on the low potential side) of the charge battery cell group. Note that the switching circuit BT05 can recognize the position of the charge battery cell group on the basis of the information set in the control signal S2.

Figure 29:
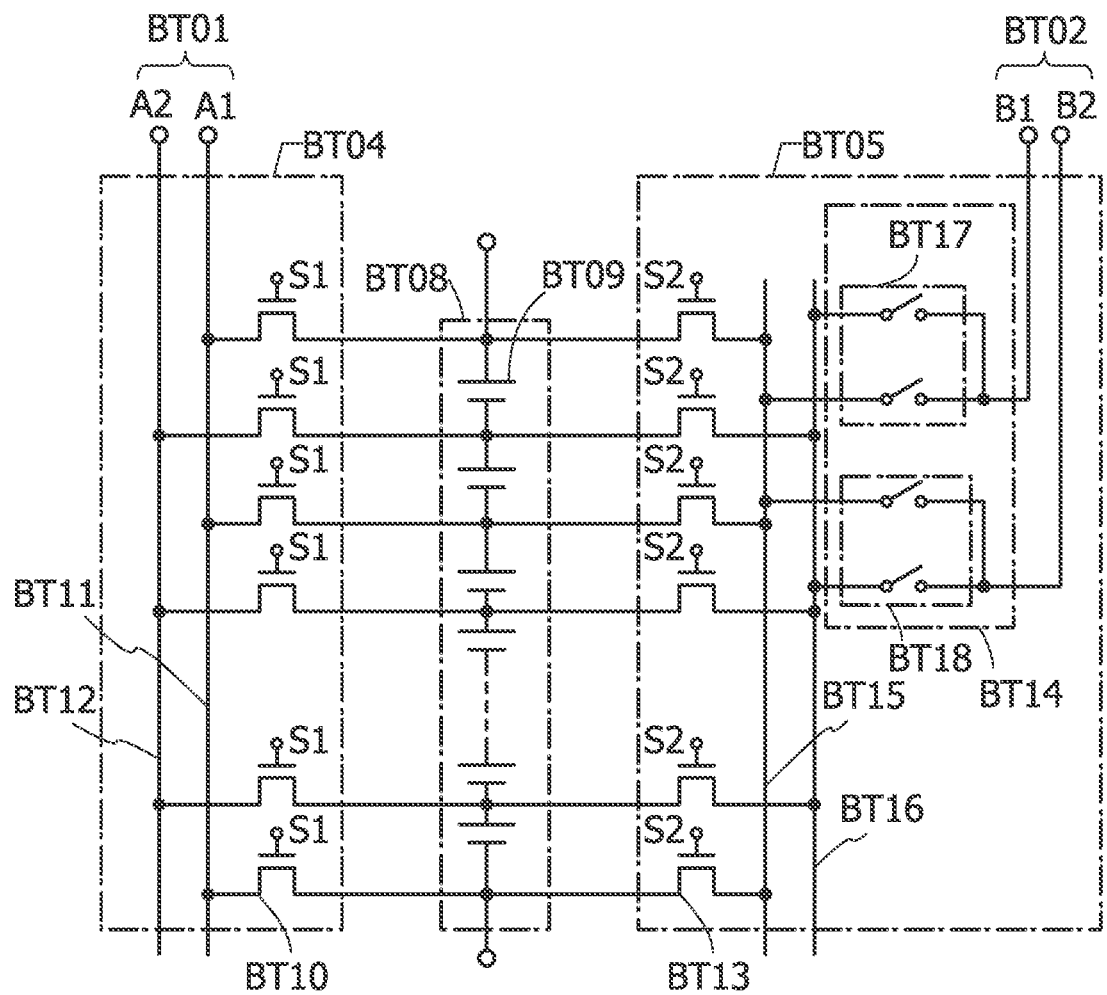
FIG. 29 is a circuit diagram illustrating one embodiment of present invention.
Figure 30:
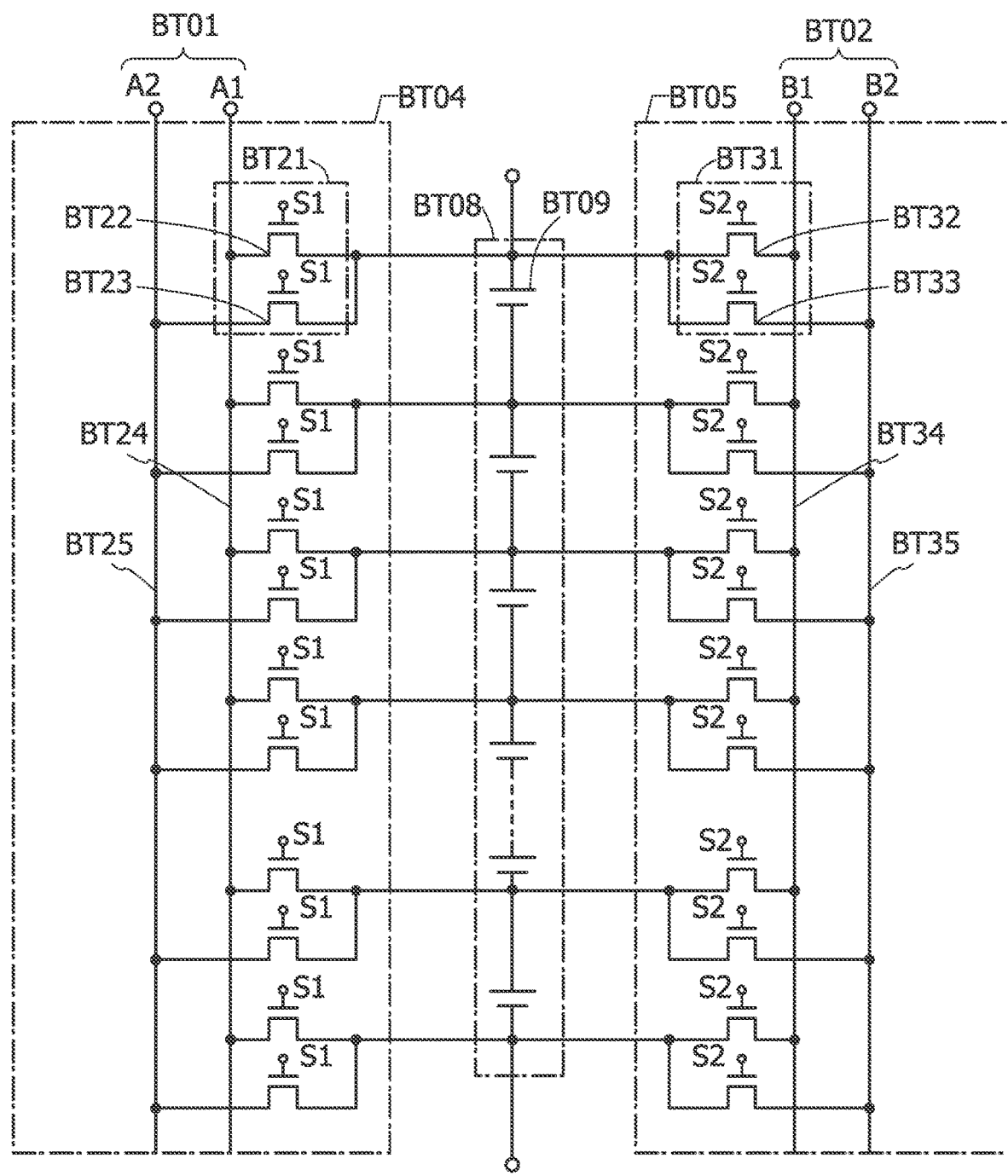
FIG. 30 is a circuit diagram illustrating one embodiment of the present invention.

FIG. 29 and FIG. 30 are circuit diagrams showing configuration examples of the circuits BT04 and BT05.

In FIG. 29, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. The sources or drains which are not connected to the bus BT11 and the bus BT12 of the plurality of transistors BT10 are each connected between two adjacent battery cells BT09.

The source or drain of the transistor BT10 on the most upstream side of the plurality of transistors BT10 is connected to the positive electrode terminal of the battery cell BT09 on the most upstream side of the battery portion BT08. The source or drain of the transistor BT10 on the most downstream side of the plurality of transistors BT10 is connected to the negative electrode terminal of the battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of charge that leaks from the battery cell which does not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when the output voltage of the discharge battery cell group is high.

In FIG. 29, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. The sources or drains which are not connected to the bus BT15 and the bus BT16 of the plurality of transistors BT13 are each connected between two adjacent battery cells BT09.

The source or drain of the transistor BT13 on the most upstream side of the plurality of transistors BT13 is connected to the positive electrode terminal of the battery cell BT09 on the most upstream side of the battery portion BT08. The source or a drain of the transistor BT13 on the most downstream side of the plurality of transistors BT13 is connected to the negative electrode terminal of the battery cell BT09 on the most downstream side of the battery portion BT08.

An OS transistor is preferably used as the transistors BT13 like the transistors BT10. Since the off-state current of the OS transistor is low, the amount of charge that leaks from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. Terminals on one end of the switch pair BT17 are connected to the terminal B1. Terminals on the other end of the switch pair BT17 branch off from two switches. One switch is connected to the bus BT15, and the other switch is connected to the bus BT16. Terminals on one end of the switch pair BT18 are connected to the terminal B2. Terminals on the other end of the switch pair BT18 extend from two switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of the battery cell BT09 on the most upstream side of the charge battery cell group into an on state in response to the control signal S2 supplied to gates of the plurality of transistors BT13. In addition, the switching circuit BT05 brings a transistor BT13 connected to the negative electrode terminal of the battery cell BT09 on the most downstream side of the charge battery cell group into an on state in response to the control signal S2 supplied to the gates of the plurality of transistors BT13.

The polarities of voltages applied to the terminal pair BT02 can vary in accordance with the configurations of the voltage transformer circuit BT07 and the discharge battery cell group connected to the terminal pair BT01. In order to supply a current in the direction for charging the charge battery cell group, terminals with the same polarity of the terminal pair BT02 and the charge battery cell group are required to be connected to each other. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode will be described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of e switching circuit BT05, the switching circuit BT04 may include the current control switch BT14.

FIG. 30 is a circuit diagram illustrating configuration examples of the switching circuit BT04 and the switching circuit BT05 which are different from those of FIG. 29.

In FIG. 30, the switching circuit BT04 includes a plurality of transistor pairs BT21, a bus BT24, and a bus BT25. The bus BT24 is connected to the terminal A1. The bus BT25 is connected to the terminal A2. Terminals on one end of each of the plurality of transistor pairs BT21 branch off from a transistor BT22 and a transistor BT23. Sources or drains of the transistors B122 are connected to the bus BT24. Sources or drains of the transistors BT23 are connected to the bus BT25. In addition, terminals on the other end of each of the plurality of transistor pairs BT21 are connected between two adjacent battery cells BT09. The terminals on the other end of the transistor pair BT21 on the most upstream side of the plurality of transistor pairs BT21 are connected to the positive electrode terminal of the battery cell BT09 on the most upstream side of the battery portion BT08. The terminals on the other end of the transistor pair BT21 on the most downstream side of the plurality of transistor pairs BT21 are connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. Terminals on one end of each of the plurality of transistor pairs BT31 branch off from a transistor BT32 and a transistor B133. One terminal extending from the transistor BT32 is connected to the bus BT34. The other terminal extending from the transistor BT33 is connected to the bus BT35. Terminals on the other end of each of the plurality of transistor pairs BT31 are connected between two adjacent battery cells BT09. The terminal on the other end of the transistor pair BT31 on the most upstream side of the plurality of transistor pairs BT31 is connected to the positive electrode terminal of the battery cell BT09 on the most upstream side of the battery portion BT08. The terminal on the other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two tray tor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in the direction for charging the charge battery cell group.

The voltage transformation control circuit BT06 controls the operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a charging voltage necessary for charging the charge battery cell group needs to be ensured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 31A:
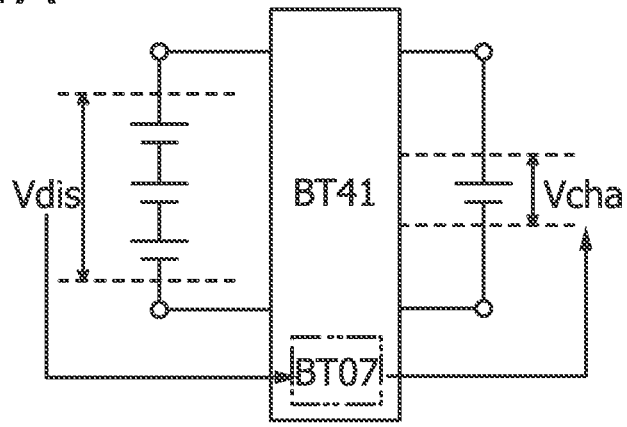
FIGS. 31A to 31C are schematic views each illustrating one embodiment of the present: invention.
Figure 31B:
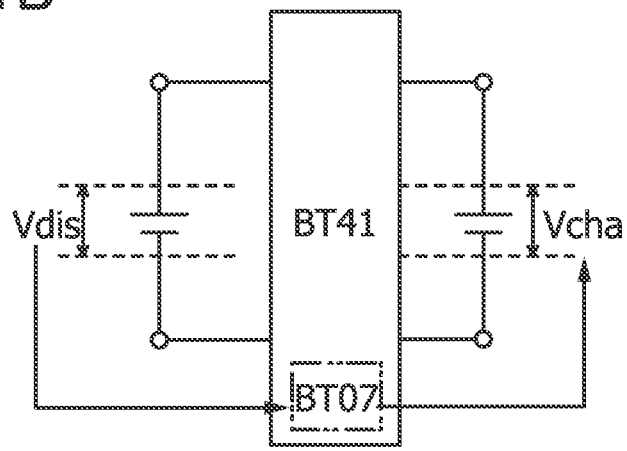
Figure 31C:
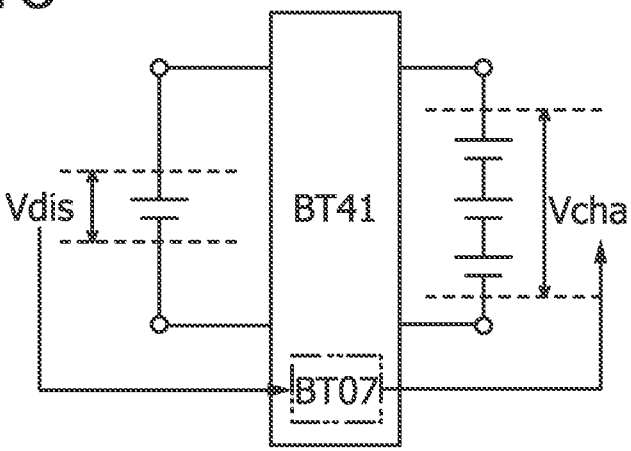

Here, operation examples of the voltage transformation control circuit BT06 in this embodiment will be described with reference to FIGS. 31A to 31C. FIGS. 31A to 31C are conceptual diagrams for explaining the operation examples of the voltage transformation control circuits BT06 for the discharge battery cell groups and the charge battery cell groups described in FIGS. 28A to 28C. FIGS. 31A to 31C each illustrate a battery control unit BT41. The battery control unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 31A, the series of three high-voltage cells a to c and one low-voltage cell d are connected in series as described in FIG. 28A. In this case, as described using FIG. 28A, the switching control circuit BT03 determines the high-voltage cells a to c as the discharge battery cell group, and determines the low-voltage cell d as the charge battery cell group. The voltage transformation control circuit BT06 calculates a conversion ratio N for converting the discharging voltage (Vdis) into the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, an overvoltage may be applied to the battery cells BT09 included in the charge battery cell group through the terminal pair BT02. Thus, in the case of FIG. 31A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N for raising or lowering voltage larger than the ratio of the number of the battery cells BT09 included in the charge battery cell group to the number of the battery cells BT09 included in the discharge battery cell group.

Thus, the voltage transformation control circuit BT06 preferably sets the conversion ratio N for raising or lowering voltage larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N for raising or lowering voltage in order to make the voltage of the charge battery cell group equal to the charging voltage. The value of the current is set by the voltage transformation control circuit BT06.

In the example illustrated in FIG. 31A, since the number of the battery cells BT09 included in the discharge battery cell group is three and the number of the battery cells BT09 included in the charge battery cell group is one, the voltage transformation control circuit BT06 calculates a value which is slightly larger than 1/3 as the conversion ratio N for raising or lowering voltage. Then, the voltage transformation control circuit BT06 outputs the voltage transformation signal S3, which lowers the discharging voltage in accordance with the conversion ratio N for raising or lowering voltage and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 31B and 31C, the conversion ratio N for raising or lowering voltage is calculated in a manner similar to that of FIG. 31A. In each of the examples illustrated in FIGS. 31B and 31C, since the number of the battery cells BT09 included in the discharge battery cell group is less than or equal to the number of the battery cells BT09 included in the charge battery cell group, the conversion ratio N for raising or lowering voltage is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage in response to the voltage transformation signal S3. The voltage transformer circuit BT07 applies the charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the bate cell BT09 on the most downstream side of the charge battery cell group. Furthermore, the voltage transformer circuit BT07 converts the discharging voltage, which is the total voltage of the discharge battery cell group, into the charging voltage in response to the voltage transformation signal S3 as described above.

An insulated direct current (DC)-DC converter or the like can be used in the voltage transformer circuit BT07. In that case, the voltage transformation control circuit BT06 controls the charging voltage convened by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 32:
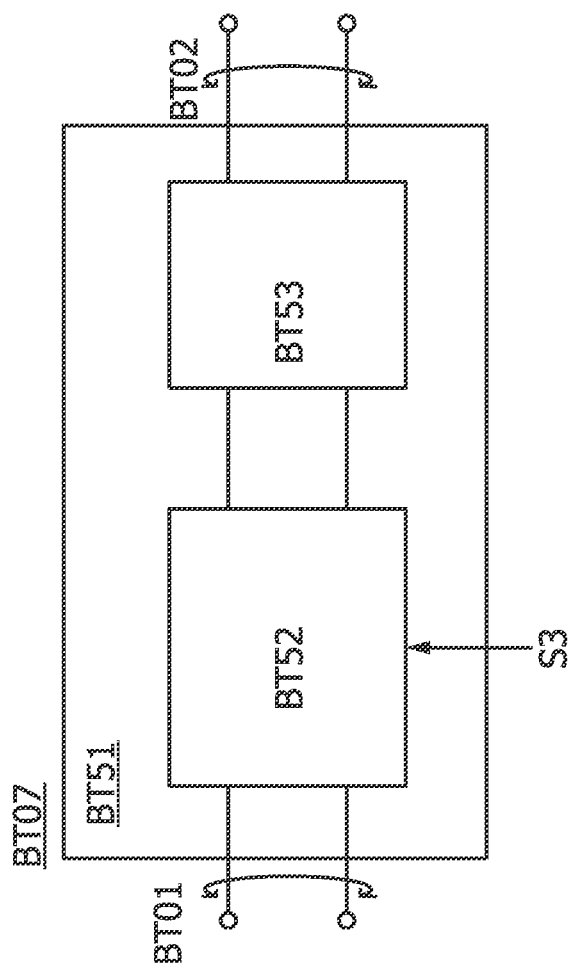
FIG. 32 is a block diagram illustrating one embodiment of the present invention.

The configuration of the voltage transformer circuit BT07 including the insulated DC-DC converter is illustrated in FIG. 32. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in response to the voltage transformation signal S3 for controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 33:
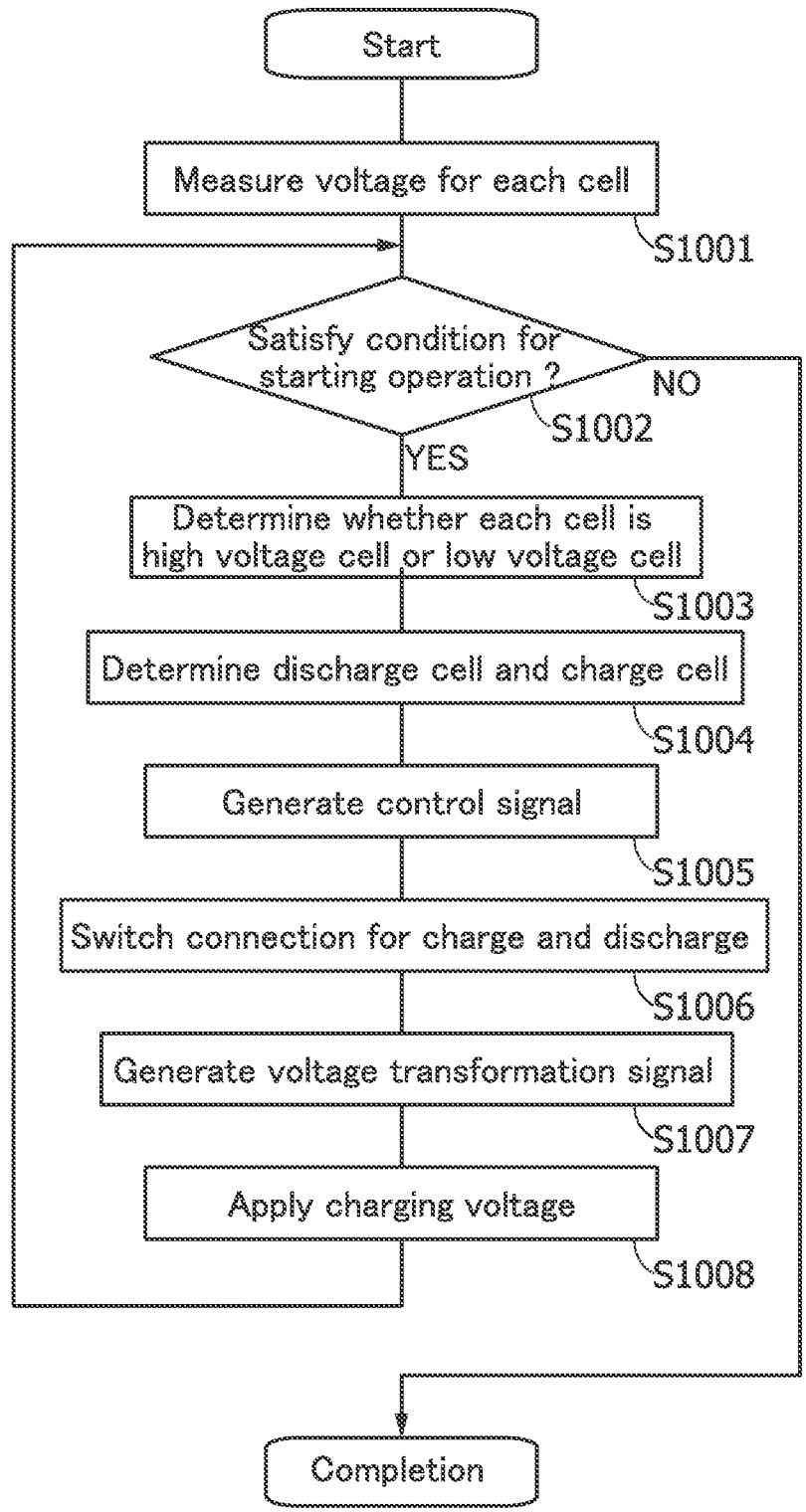
FIG. 33 is a flow chart showing one embodiment of the present invention.

A flow of operations of the power storage device BT00 in this embodiment will be described with reference to FIG. 33. FIG. 33 is a flow chart showing the flow of the operations of the power storage device BT00.

First, the power storage device BT00 obtains a voltage measured for each of the plurality of battery cells BT09 (step S1001). Then, the power storage device BT00 determines whether or not the condition for starting the operation of reducing variations in voltage of the plurality of battery cells BT09 is satisfied (step S1002). For example, the condition that the difference between the maximum value and the minimum value of the voltage measured for each of the plurality of battery cells BT09 is higher than or equal to the predetermined threshold value can be used. In the case where the condition is not satisfied (step S1002: NO), the power storage device BT00 does not perform the following operation because voltages of the battery cells BT09 are well balanced. In contrast, in the case where the condition is satisfied (step S1002: YES), the power storage device BT00 performs the operation of reducing variations in the voltage of the battery cells BT09. In this operation, the power storage device BT00 determines whether each battery cells BT09 is a high voltage cell or a low voltage cell on the basis of the measured voltage of each cell (step S1003). Then, the power storage device BT00 determines a discharge battery cell group and a charge battery cell group on the basis of the determination result (step S1004). In addition, the power storage device BT00 generates the control signal S1 for setting the connection destination of the terminal pair BT01 to the determined discharge battery cell group, and the control signal S2 for setting the connection destination of the terminal pair BT02 to the determined charge battery cell group (step S1005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S1006). The power storage device BT00 generates the voltage transformation signal S3 based on the number of the battery cells BT09 included in the discharge battery cell group and the number of the battery cells BT09 included in the charge battery cell group (step S1007). Then, the power storage device BT00 converts, in response to the voltage transformation signal S3, the discharging voltage applied to the terminal pair BT01 into a charging voltage and applies the charging voltage to the terminal pair BT02 (step S1008). In this way, charge of the discharge battery cell group is transferred to the charge battery cell group.

Although the plurality of steps are shown in order in the flow chart the order of performing the steps is not limited to the order.

According to the above embodiment, when charge is transferred from the discharge battery cell group to the charge battery cell group, a structure where charge from the discharge battery cell group is temporarily stored, and the stored charge is sent to the charge battery cell group is unnecessary, unlike in the a capacitive type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, charge can be transferred without any problems regardless of how the battery cells BT09 are selected as the discharge battery cell group and the charge battery cell group.

Furthermore, the use of OS transistors as the transistor BT10 and the transistor BT13 can reduce the amount of charge that leaks from the battery cells BT09 not belonging to the charge battery cell group or the discharge battery cell group. Accordingly, a decrease in capacity of the battery cells BT09 which do not contribute to charging or discharging can be suppressed. In addition, the variations in characteristics of the OS transistor due to heat are smaller than those of a S1 transistor. Accordingly, even when the temperature of the battery cells BT09 is increased, an operation such as turning on or off the transistors in response to the control signals S1 and S2 can be performed normally.

Example 1

In this example, a lithium-manganese composite oxide covered with a carbon-containing layer was formed by the method described in Embodiment 1, and cycle performance was measured.

(Synthesis of Lithium-Manganese Composite Oxide)

Starting materials $Li_2CO_3$, $MnCO_3$, and NiO were weighed such that the molar ratio of $Li_2CO_3$ to $MnCO_3$ and NiO was 0.84: 0.8062: 0.318. Next, ethanol was added to the powder of these materials, and then, they were mixed in a bead mill to prepare mixed powder.

After that, heating was performed to evaporate ethanol, so that a mixed material was obtained.

Then, the mixed material was put in a crucible, and was tired at 1000° C. in the air for 10 hours to synthesize a novel material. The flow rate of the air was 10 L/min.

Then, the fired particles were classified according to the particle diameter, using a spray dryer. As a result, a lithium-manganese composite oxide was obtained. The sample obtained hem is referred to as Sample X.

(Covering with Carbon-Containing Layer)

Graphene oxide (0.0303 g) and water (1.05 g) were mixed to form an aqueous dispersion of graphene oxide. In the first mixing, one third of the total amount of water was used, another one third thereof was added in the second mixing, and the other one third thereof was added in the third mixing. Five-minute mixing was performed at 2000 rpm three times.

Then, the lithium-manganese composite oxide obtained by the synthesis (Sample X) was added to the formed aqueous dispersion. The amount of Sample X was set such that the amount of graphene oxide was 2 wt % of the amount of Sample X. The mixture was kneaded in a mixer at 2000 rpm six times. Time for one kneading was 5 minutes.

The obtained mixture was dried under reduced pressure in a bell jar at 50° C. and then ground in an alumina mortar, so that the lithium-manganese composite oxide covered with graphene oxide was obtained.

(Reduction of Graphene Oxide)

The graphene oxide covering the surface of the lithium-manganese composite oxide was reduced. Ascorbic acid was used as a reducing agent, and an 80 vol % ethanol solution was used as a solvent. Ascorbic acid (13.5 g) and lithium hydroxide (3.12 g) were put in 1 L of 80 vol % ethanol solution to form a reducing solution. The obtained powder was put in the solution and reduction was performed at 60° C. for 3 hours.

Then, the obtained solution was filtrated by suction filtration. For the filtration, filter paper with a particle retention capability of 1 μm was used. Then, washing with pure water was performed using a centrifugal separator, and drying was performed using a spray dryer. After that, drying was performed at 170° C. under reduced pressure for 10 hours. The powder obtained here is referred to as Sample A.

(Fabrication of Electrode)

An electrode was fabricated using Sample A as a positive electrode active material. Sample A was mixed with graphene oxide, acetylene black (AB) and vapor-grown carbon fiber (VGCF (registered trademark)) as conductive additives, PVdF as a resin, and NMP as a polar solvent to give an electrode mixture paste. In the electrode mixture paste, the weight ratio of Sample A to the graphene oxide, the AB, the VGCF (registered trademark), and PVdF is 92.2:0.8:1:1:5. Then, the paste was applied to a current collector and dried. Note that 20-μm-thick aluminum foil was used as the current collector, and a surface of the current collector was treated with an undercoat in advance. The thickness of the paste was adjusted such that the loading of the active material in the electrode was 7.0 g/cm$^2$.

The obtained electrode was soaked in ethanol (99.5 wt %) at 60° C. for 10 minutes and then taken out from the ethanol, and excess ethanol was evaporated in an air atmosphere. After that, as heat treatment, heat drying was performed at 250° C. in a vacuum atmosphere for 10 hours.

The electrode formed through the above steps is referred to as Electrode A. An electrode formed through the steps except adding graphene oxide and soaking the electrode in ethanol in the fabrication process Electrode A is referred to as Comparative Electrode B. An electrode formed through the steps except soaking the electrode in ethanol in the fabrication process of Electrode A is referred to as Comparative Electrode C.

(Measurement of Cycle Performance)

Half cells were fabricated using Electrode A, Comparative Electrode B, and Comparative Electrode C. Lithium was used for counter electrodes of the half cells. An electrolytic solution was formed by dissolving LiPF$_6$ as an electrolyte in a mixed solution containing ethylene carbonate and diethyl carbonate, which are aprotic organic solvents, at a volume ratio of 1:1. As a separator, polypropylene (PP) was used.

Figure 34:
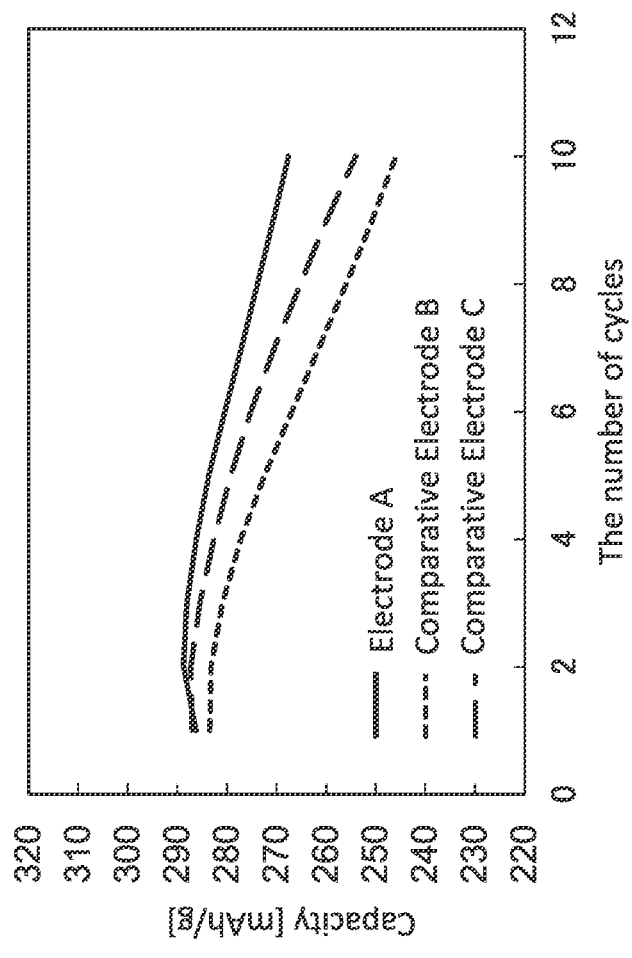
FIG. 34 is a graph showing the relation between the number of charge and discharge cycles and discharge capacity.

FIG. 34 shows measurement results of cycle performance. The vertical axis represents capacity normalized by the weight of the positive electrode active material (mAh/g), and the horizontal axis represents the number of cycles. Charging was performed at a constant current until the voltage reached a termination voltage of 4.1 V. Discharging was performed at a constant current until the voltage reached an end voltage of 2.0 V. The current densities for charging and discharging are equal to each other. As can be seen from FIG. 34, the cycle performance of the cell using Electrode A was better than that of the cell using Comparative Electrode B formed through the steps except adding graphene oxide and soaking the electrode in ethanol in the fabrication process of Electrode A and that of the cell using Comparative Electrode C formed through the steps except soaking the electrode in ethanol in the fabrication process of Electrode A.

This application is based on Japanese Patent Application serial no. 2015-168082 filed with Japan Patent Office on Aug. 27, 2015, the entire contents of which are hereby incorporated by reference.

What is claimed is:

1. A method for manufacturing an electrode, comprising:
    mixing a first particle and a first piece of graphene oxide to form a second particle, the second particle covered with the first piece of graphene oxide;
    reducing the first piece of graphene oxide to form a third particle, the third particle covered with a first piece of graphene oxide being reduced,
    forming an active material layer over a current collector, the active material layer comprising the third particle and a second piece of graphene oxide;
    impregnating the active material layer with alcohol; and
    performing heat treatment on the active material layer after impregnating the active material layer,
    wherein the third particle comprises an inner region and a surficial region after the heat treatment,
    wherein the inner region comprises a crystal having a layered rock-salt crystal structure,
    wherein the surficial region comprises a crystal having a spinel crystal structure, wherein the surficial region is in contact with a second piece of graphene oxide being reduced, and
    wherein the heat treatment is performed at a temperature higher than or equal to 250° C. and lower than or equal to 300° C.

2. The method for manufacturing an electrode, according to claim 1, wherein the third particle has a cleavage plane.

3. The method for manufacturing an electrode, according to claim 1,
    wherein a composition of the first particle is represented by formula of LiaMnbMcOd,
    wherein, in the formula, a/(b+c) is larger than or equal to 0 and less than 2, c is larger than 0, and (b+c)/d is larger than or equal to 0.26 and less than 0.5, and
    wherein the element M is any one of chromium, cobalt, aluminum, nickel, iron, magnesium, molybdenum, zinc, indium, gallium, copper, titanium, niobium, silicon and phosphorus.

4. The method for manufacturing an electrode, according to claim 3, wherein the element M is nickel.

5. The method for manufacturing an electrode, according to claim 1, wherein the alcohol is any one of methanol, ethanol, 1-propanol, 2-propanol, 1-butanol, 2-butanol, isobutyl alcohol and tert-butyl alcohol.

6. A method for manufacturing an active material, comprising:
   forming an active material particle covered with a first piece of graphene oxide being reduced;
   forming an active material layer over a current collector, the active material layer comprising the active material particle and a second piece of graphene oxide,
   impregnating the active material layer with alcohol; and
   performing heat treatment on the active material layer after impregnating the active material layer,
   wherein the active material particle comprises an inner region and a surficial region after the heat treatment,
   wherein the inner region comprises a crystal having a layered rock-salt crystal structure,
   wherein the surficial region comprises a crystal having a spinel crystal structure,
   wherein the surficial region is in contact with a second piece of graphene oxide being reduced, and
   wherein the heat treatment is performed at a temperature higher than or equal to 250° C. and lower than or equal to 300° C.

7. The method for manufacturing an active material, according to claim 6, wherein the active material particle has a cleavage plane.

8. The method for manufacturing an active material, according to claim 6,
   wherein a composition of the active material particle is represented by formula of $Li_aMn_bM_cO_d$,
   wherein, in the formula, a/(b+c) is larger than or equal to 0 and less than 2, c is larger than 0, and (b+c)/d is larger than or equal to 0.26 and less than 0.5, and
   wherein the element M is any one of chromium, cobalt, aluminum, nickel, iron, magnesium, molybdenum, zinc, indium, gallium, copper, titanium, niobium, silicon and phosphorus.

9. The method for manufacturing an active material, according to claim 6, wherein the alcohol is any one of methanol, ethanol, 1-propanol, 2-propanol, 1-butanol, 2-butanol, isobutyl alcohol and tert-butyl alcohol.

10. The method for manufacturing an active material, according to claim 6, further comprising:
   wherein the first piece of graphene oxide being reduced is formed by reduction of a first piece of graphene oxide, and
   wherein the reduction is performed by a reducing agent.

* * * * *